US012677020B2

(12) United States Patent (10) Patent No.: US 12,677,020 B2
Araumi et al. (45) Date of Patent: Jul. 7, 2026

(54) MANAGEMENT SYSTEM, REMOTE OPERATION METHOD, PROCESSING METHOD, AND COMMUNICATION MANAGEMENT METHOD

(71) Applicants: Yuichi Araumi, Tokyo (JP); Yasuhiro Tomii, Kanagawa (JP)

(72) Inventors: Yuichi Araumi, Tokyo (JP); Yasuhiro Tomii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/121,591

(22) Filed: Mar. 15, 2023

(65) Prior Publication Data

US 2023/0308705 A1 Sep. 28, 2023

(30) Foreign Application Priority Data

Mar. 22, 2022 (JP) ................................ 2022-046050
Mar. 22, 2022 (JP) ................................ 2022-046051
Mar. 22, 2022 (JP) ................................ 2022-046052

(51) Int. Cl.
*H04N 21/41* (2011.01)
*H04N 21/218* (2011.01)

(52) U.S. Cl.
CPC ... *H04N 21/41265* (2020.08); *H04N 21/2181* (2013.01)

(58) Field of Classification Search
CPC ......... H04N 21/41265; H04N 21/2181; H04N 5/23238; H04N 5/45; H04N 5/272; H04N 5/23203; H04N 5/23299; H04N 5/247; H04N 13/183; H04N 13/204
See application file for complete search history.

(56) References Cited

U.S. PATENT DOCUMENTS

| | | | | |
|---|---|---|---|---|
| 2018/0373852 A1* | 12/2018 | Tsubota | ............... | G05D 1/0055 |
| 2020/0036892 A1* | 1/2020 | Araumi | ............... | H04N 23/661 |
| 2022/0078344 A1 | 3/2022 | Araumi et al. | | |

FOREIGN PATENT DOCUMENTS

| | | | |
|---|---|---|---|
| JP | H06-164742 A | 6/1994 |
| JP | H08-274888 A | 10/1996 |
| JP | 2005184304 A | 7/2005 |
| JP | 2009200973 A | 9/2009 |
| JP | 2015-082778 A | 4/2015 |
| JP | 2017-034530 A | 2/2017 |
| JP | 2019-008585 A | 1/2019 |
| JP | 2020-017829 | 1/2020 |

(Continued)

OTHER PUBLICATIONS

Office Action issued Jan. 6, 2026 in corresponding Japanese Patent Application No. 2022-046050.

(Continued)

*Primary Examiner* — Yassin Alata

(74) *Attorney, Agent, or Firm* — XSENSUS LLP

(57) ABSTRACT

A communication terminal for remotely operating a mobile apparatus, includes circuitry that receives a remote operation to be performed on an operation target of the mobile apparatus, and transmits operation information indicating the remote operation to be performed on the operation target to remotely operate the operation target, the operation target being a target to which an operation right that is exclusive is to be applied.

14 Claims, 34 Drawing Sheets

(56) References Cited

FOREIGN PATENT DOCUMENTS

| | | |
|---|---|---|
| JP | 2020-022152 | 2/2020 |
| JP | 2021-136679 | 9/2021 |
| JP | 2021-197688 | 12/2021 |

OTHER PUBLICATIONS

Office Action issued Dec. 16, 2025 in corresponding Japanese Patent Application No. 2022-046052.
Office Action issued on Sep. 30, 2025, in corresponding Japanese patent Application No. 2022-046051, 8 pages.

* cited by examiner

FIG. 2C-1          FIG. 2C-2
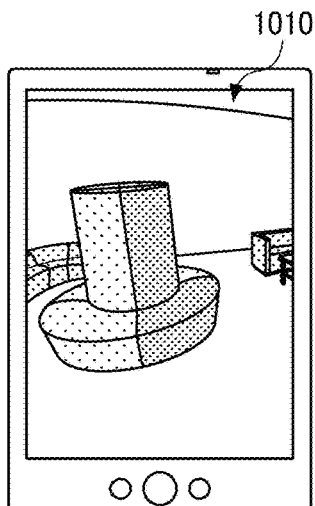
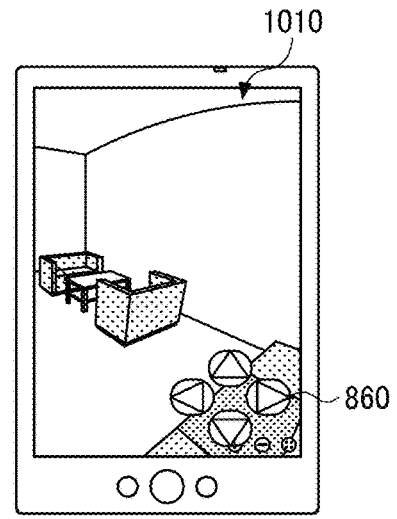
FIG. 3
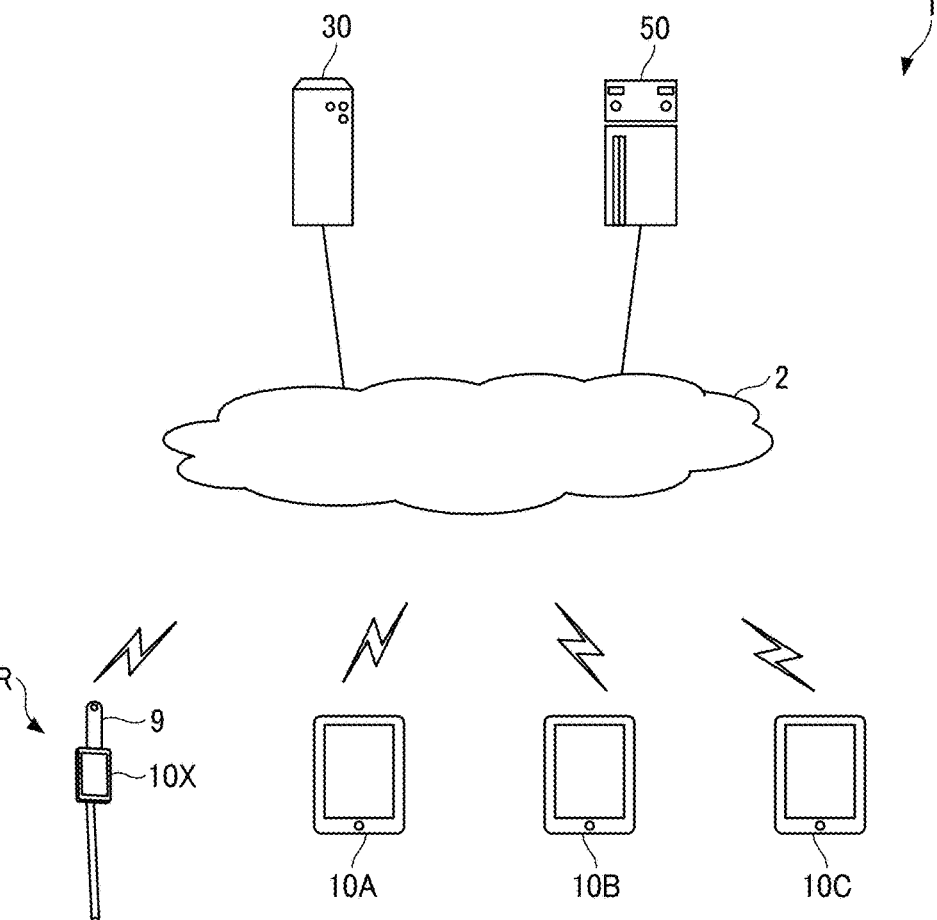

EQUIRECTANGULAR
PROJECTION IMAGE EC

SPHERICAL IMAGE CE

VIRTUAL
CAMERA IC      SPHERE CS

PREDETERMINED-AREA VIDEO Q
(PREDETERMINED AREA T)

VIRTUAL CAMERA IC

SPHERE CS

PREDETERMINED-AREA VIDEO Q′
(PREDETERMINED AREA T′ )

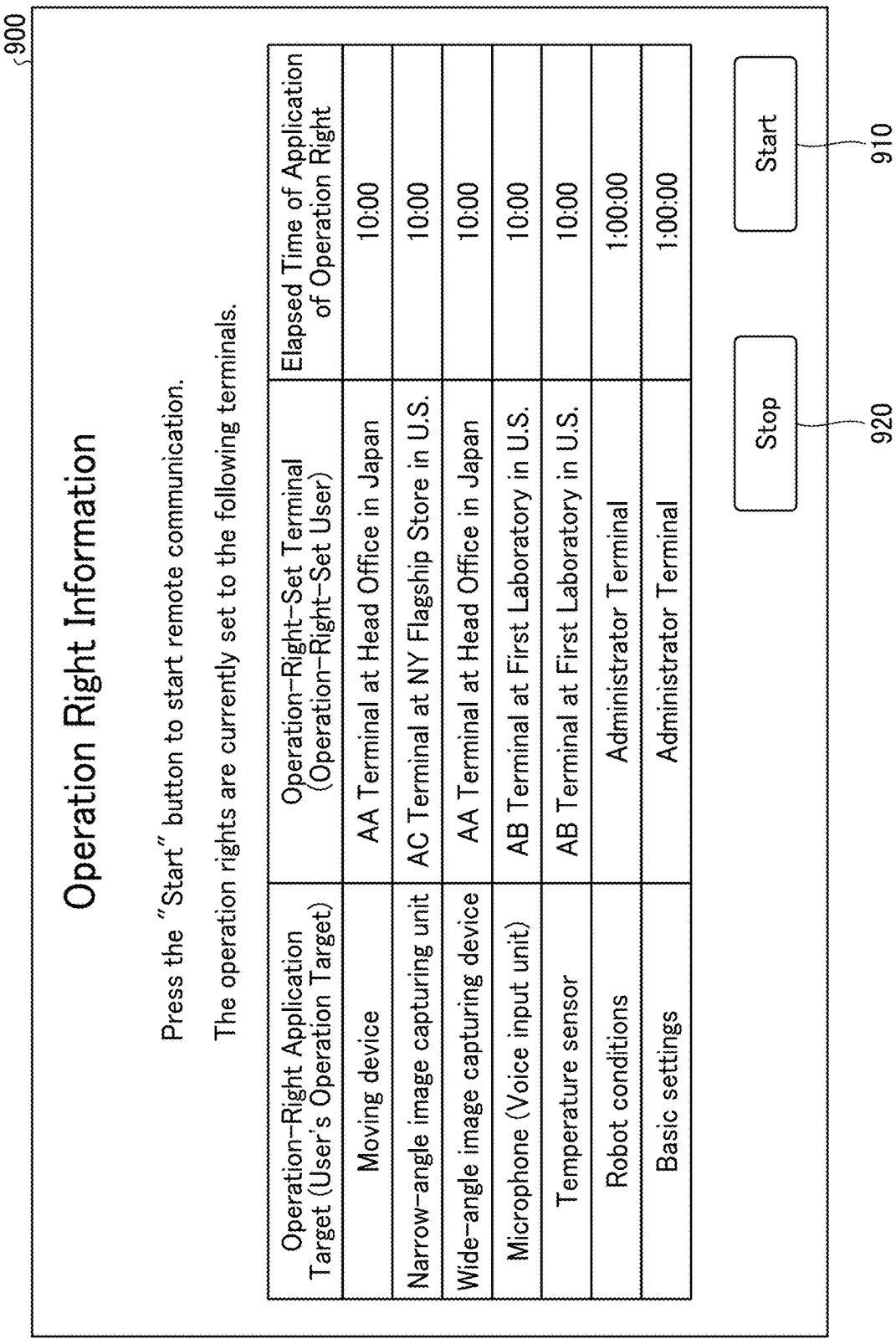

Operation Right Information

Press the "Start" button to start remote communication.

The operation rights are currently set to the following terminals.

| Operation-Right Application Target (User's Operation Target) | Operation-Right-Set Terminal (Operation-Right-Set User) | Elapsed Time of Application of Operation Right |
|---|---|---|
| Moving device | AA Terminal at Head Office in Japan | 10:00 |
| Narrow-angle image capturing unit | AC Terminal at NY Flagship Store in U.S. | 10:00 |
| Wide-angle image capturing device | AA Terminal at Head Office in Japan | 10:00 |
| Microphone (Voice input unit) | AB Terminal at First Laboratory in U.S. | 10:00 |
| Temperature sensor | AB Terminal at First Laboratory in U.S. | 10:00 |
| Robot conditions | Administrator Terminal | 1:00:00 |
| Basic settings | Administrator Terminal | 1:00:00 |

Stop 920

Start 910

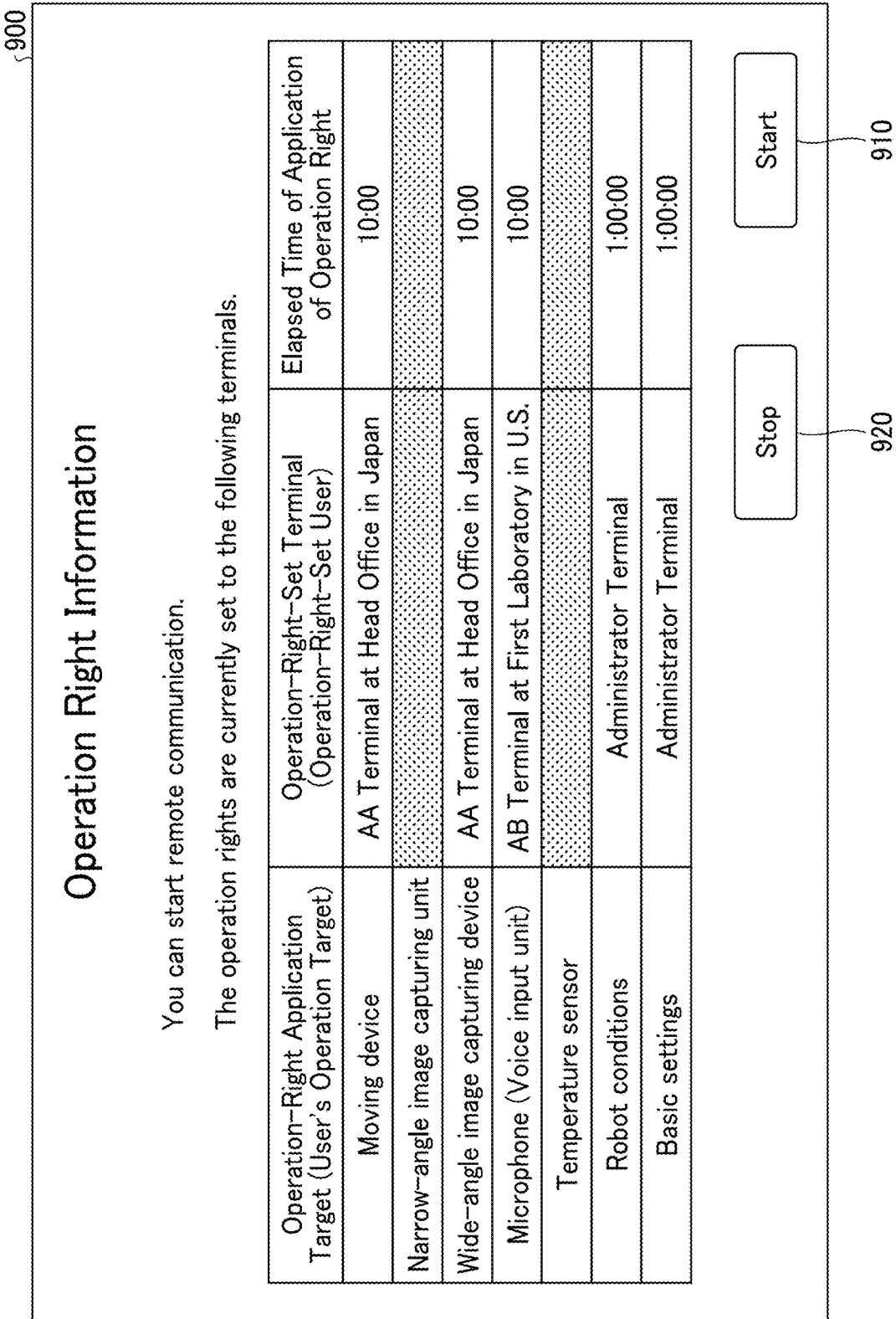

Operation Right Information

You can start remote communication.

The operation rights are currently set to the following terminals.

| Operation-Right Application Target (User's Operation Target) | Operation-Right-Set Terminal (Operation-Right-Set User) | Elapsed Time of Application of Operation Right |
|---|---|---|
| Moving device | AA Terminal at Head Office in Japan | 10:00 |
| Narrow-angle image capturing unit | | |
| Wide-angle image capturing device | AA Terminal at Head Office in Japan | 10:00 |
| Microphone (Voice input unit) | AB Terminal at First Laboratory in U.S. | 10:00 |
| Temperature sensor | | |
| Robot conditions | Administrator Terminal | 1:00:00 |
| Basic settings | Administrator Terminal | 1:00:00 |

Start — 910

Stop — 920

900

TELEPRESENCE ROBOT R

TELEPRESENCE ROBOT R

FIG. 27

Operation-Right Transfer Request

The operation rights are currently set to the following terminals (users).

Select an operation-right application target and then press the "Request" button to start an operation-right transfer request.

| Designation Field | Operation-Right Application Target (User's Operation Target) | Operation-Right-Set Terminal (Operation-Right-Set User) | Elapsed Time of Application of Operation Right |
|---|---|---|---|
| ✓ | Moving device | AA Terminal at Head Office in Japan | 10:00 |
| | Narrow-angle image capturing unit | AC Terminal at NY Flagship Store in U.S. | 10:00 |
| ✓ | Wide-angle image capturing device | AA Terminal at Head Office in Japan | 10:00 |
| | Microphone (Voice input unit) | AB Terminal at First Laboratory in U.S. | 10:00 |
| | Temperature sensor | AB Terminal at First Laboratory in U.S. | 10:00 |
| | Robot conditions | Administrator Terminal | 1:00:00 |
| | Basic settings | Administrator Terminal | 1:00:00 |

Stop — 420          Request — 410

Transferability of Operation Rights

A request for transferring your operation right has been received from "AB Terminal at First Laboratory in U.S."

Select an operation-right application target for which the operation right transfer is permitted and then press the "Set" button. (If none of the operation rights is to be transferred, press the "Set" button without selecting an application target.

| Designation Field | Operation-Right Application Target (User's Operation Target) | Operation-Right-Set Terminal (Operation-Right-Set User) | Elapsed Time of Application of Operation Right |
|---|---|---|---|
| ✓ | Moving device | AA Terminal at Head Office in Japan | 11:00 |
|  | Wide-angle image capturing device | AA Terminal at Head Office in Japan | 11:00 |

Cancel all      Set

Result of Operation-Right Transfer Request

Results of the operation-right transfer request are presented.

Finally, press the "Confirm" button.

| Results | Operation-Right Application Target (User's Operation Target) | Operation-Right-Set Terminal (Operation-Right-Set User) | Elapsed Time of Application of Operation Right |
|---------|---------------------------------------------|------------------------------------------------|---------------------------------------|
| BAD | Moving device | AA Terminal at Head Office in Japan | 12:00 |
| GOOD | Wide-angle image capturing device | AB Terminal at First Laboratory in U.S. | 00:00 |

Confirm

Operation-Right Setting Request

The operation rights are currently set to the following terminals (users).

Select an operation-right application target and then press the "Request" button to start an operation-right setting request.

| Designation Field | Operation-Right Application Target (User's Operation Target) | Operation-Right-Set Terminal (Operation-Right-Set User) | Elapsed Time of Application of Operation Right |
|---|---|---|---|
| – | Moving device | AA Terminal at Head Office in Japan | 10:00 |
| ✓ | Narrow-angle image capturing unit | | |
| – | Wide-angle image capturing device | AA Terminal at Head Office in Japan | 10:00 |
| – | Microphone (Voice input unit) | AB Terminal at First Laboratory in U.S. | 10:00 |
| ✓ | Temperature sensor | | |
| – | Robot conditions | Administrator Terminal | 1:00:00 |
| – | Basic settings | Administrator Terminal | 1:00:00 |

Request     410A

Stop     420A

Permissibility to Set Operation Rights

A request for setting the operation rights for the following application targets has been received from "AA Terminal at Head Office in Japan".
Leave an application target for which the setting request is permitted unchanged, and uncheck an application target for which the setting request is rejected, before pressing the "Set" button.

| Designation Field | Operation-Right Application Target (User's Operation Target) | Operation-Right-Set Terminal (Operation-Right-Set User) | Elapsed Time of Application of Operation Right |
|---|---|---|---|
| – | Moving device | AA Terminal at Head Office in Japan | 10:00 |
| ✓ | Narrow-angle image capturing unit | | |
| – | Wide-angle image capturing device | AA Terminal at Head Office in Japan | 10:00 |
| – | Microphone (Voice input unit) | AB Terminal at First Laboratory in U.S. | 10:00 |
| – | Temperature sensor | | |
| – | Robot conditions | Administrator Terminal | 1:00:00 |
| – | Basic settings | Administrator Terminal | 1:00:00 |

Cancel all        Set 470A            460A

FIG. 34

Results of Operation-Right Setting Request

Results of the operation-right setting request are presented.

Finally, press the "Confirm" button.

| Results | Operation-Right Application Target (User's Operation Target) | Operation-Right-Set Terminal (Operation-Right-Set User) | Elapsed Time of Application of Operation Right |
|---|---|---|---|
| GOOD | Narrow-angle image capturing unit | AA Terminal at Head Office in Japan | 00:00 |
| BAD | Temperature sensor | – | – |

Confirm

MANAGEMENT SYSTEM, REMOTE OPERATION METHOD, PROCESSING METHOD, AND COMMUNICATION MANAGEMENT METHOD

CROSS-REFERENCE TO RELATED APPLICATIONS

This patent application is based on and claims priority pursuant to 35 U.S.C. § 119(a) to Japanese Patent Application No. 2022-046051, filed on Mar. 22, 2022, Japanese Patent Application No. 2022-046050, filed on Mar. 22, 2022, and Japanese Patent Application No. 2022-046052, filed on Mar. 22, 2022, in the Japan Patent Office, the entire disclosure of which is hereby incorporated by reference herein.

BACKGROUND

Technical Field

The present disclosure relates to a communication terminal, a communication management system, a remotely-operable mobile apparatus, a communication system, a remote operation method, a communication management method, a control method, a communication method, a processing method, and a recording medium.

Related Art

Communication systems are becoming widespread. In the communication systems, communication terminals communicate with each other via a communication network such as the Internet or a local area network (LAN) across a plurality of sites to transmit and receive video and/or audio to and from each other. Such a communication system allows remote users to communicate with each other to have a teleconference, for example.

Also known is a telepresence robot (hereinafter referred to as a "robot") that combines teleconferencing and robotics with remote control technology. Telepresence is technology that combines remote control and robotic technology and allows a user to remotely operate a robot to make the robot behave in such a manner that the user can feel as if the user were present at a certain place through the robot.

The robot is typically equipped with a display. The robot includes a teleconferencing device using the display, and has an ability to move by remote operation. While the user is on a teleconference with a personal computer (PC), a smartphone, or a tablet terminal, the user remotely controls the robot, which is located at a place other than the user's true location such as a counterpart site, to make their own decision as to whom to communicate with and where to visit. Unlike the existing teleconferencing technology, the telepresence technology enables the robot to play a role as an avatar of the user to move to a location other than the user's true location or hold a conversation with a remote person. As a result, the remote person can feel the presence of the user in an unprecedented way.

Some facilities, such as museums and art museums, show things valuable to specific fields, scientific materials, works of art, and so on to visitors in the form of an exhibition. With the recent decline in the number of visitors due to the movement restrictions brought about by COVID-19, services such as online experience tours have started to be provided. There is a movement to introduce such services into company showrooms.

Such a service launches a demonstration experiment for introducing a remote tour utilizing a robot to allow remote users to freely tour the facility online. The remote tour presents a video captured by the robot to a plurality of remote users to provide a simulated experience in which the remote users can tour the facility. The remote tour also enables each user to remotely operate the robot to tour the facility freely.

However, the example described above is based on the assumption that one user occupies and controls a remotely-operable mobile apparatus such as the robot. In remote tours or other services in which a plurality of users are viewing a video captured by a remotely-operable mobile apparatus, accordingly, it is desirable to appropriately manage control of remote operations to be performed on the remotely-operable mobile apparatus.

SUMMARY

A communication terminal for remotely operating a mobile apparatus, includes circuitry that receives a remote operation to be performed on an operation target of the mobile apparatus, and transmits operation information indicating the remote operation to be performed on the operation target to remotely operate the operation target, the operation target being a target to which an operation right that is exclusive is to be applied.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 2A, 2B, and 2C (2C-1, 2C-2) are views illustrating examples of the display of a spherical video captured by a wide-angle image capturing device according to an embodiment of the present disclosure;

FIG. 3 is a diagram illustrating an example configuration of a communication system according to an embodiment of the present disclosure;

FIG. 15 is a functional block diagram of devices and a system of the communication system according to an embodiment of the present disclosure;

FIG. 19A is a view illustrating a screen that displays operation right information according to an embodiment of the present disclosure;

FIG. 19B is a view illustrating a screen that displays operation right information according to an embodiment of the present disclosure;

FIG. 27 is a view illustrating a screen for an operation-right transfer request according to an embodiment of the present disclosure;

FIG. 28 is a view illustrating a screen for the transferability of operation rights according to an embodiment of the present disclosure;

FIG. 29 is a view illustrating a screen for a result of the operation-right transfer request according to an embodiment of the present disclosure;

FIG. 32 is a view illustrating a screen for an operation-right setting request according to an embodiment of the present disclosure;

FIG. 33 is a view illustrating a screen for the permissibility to set operation rights according to an embodiment of the present disclosure;

FIG. 34 is a view illustrating a screen that displays a result of the operation-right setting request according to an embodiment of the present disclosure.

Figure 1A:
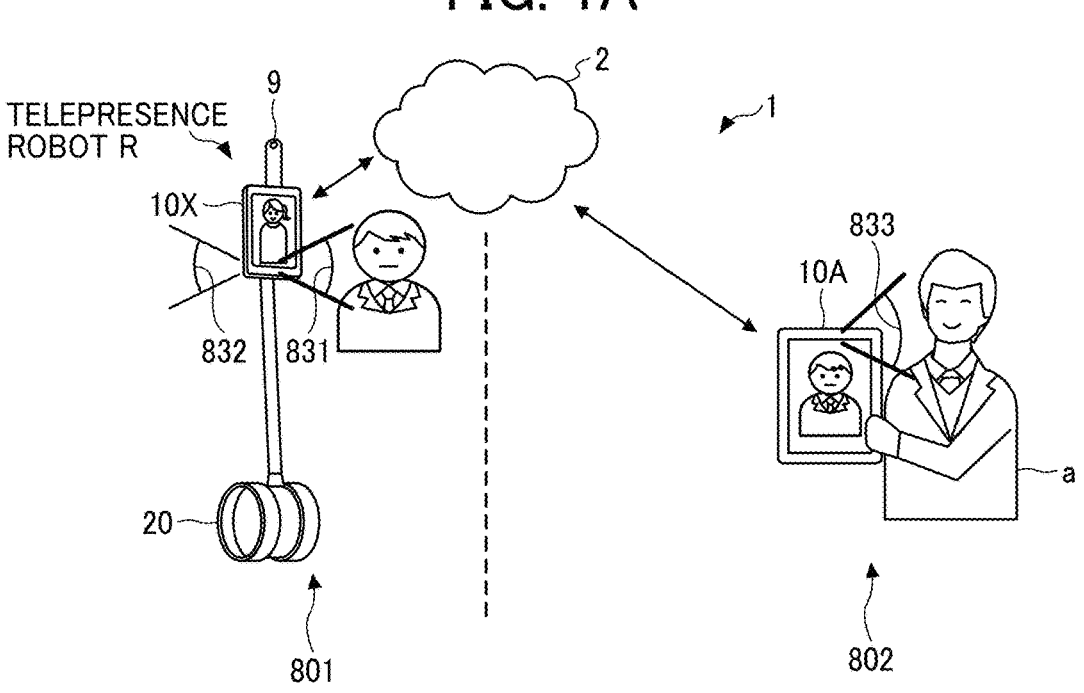
FIGS. 1A, 1B, and 1C are diagrams illustrating examples of an overview of a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

Overview of Communication System

An overview of a communication system 1 will be described with reference to FIGS. 1A to 1C. FIG. 1A illustrates an example schematic configuration of the communication system 1. The communication system 1 illustrated in FIG. 1A includes a telepresence robot (hereinafter referred to as a "robot") R.

The robot R mainly includes a wide-angle image capturing device 9, a communication terminal 10X, and a moving device 20 that moves the robot R. The robot R is an example of a remotely-operable mobile apparatus. The remotely-operable mobile apparatus is an apparatus that moves on the ground, in the air, in space, on water, in water, or underground by remote operation. The remotely-operable mobile apparatus includes an autonomous mobile apparatus. The remotely-operable mobile apparatus includes a remotely-operable traveling apparatus with traveling performance. The autonomous mobile apparatus includes an autonomous traveling apparatus with traveling performance. The robot R is a type of remotely-operable traveling apparatus or autonomous traveling apparatus. The robot R is provided with an environmental sensor such as a temperature sensor, a humidity sensor, an oxygen sensor, or a carbon dioxide sensor, and an illumination device or the like that illuminates the periphery of the robot R.

For example, the robot R is placed in a company 801, and an operator 810 is located at home 802. The operator 810 is, for example, a user (user a). In the robot R, the communication terminal 10X and the wide-angle image capturing device 9 are mounted on the moving device 20. In FIG. 1B, a user a has a communication terminal 10A. The user a may be a remote operator. A user b has a communication terminal 10B. The user b may be a remote operator. A user c has a communication terminal 10C. The user c may be a remote operator.

Figure 1B:
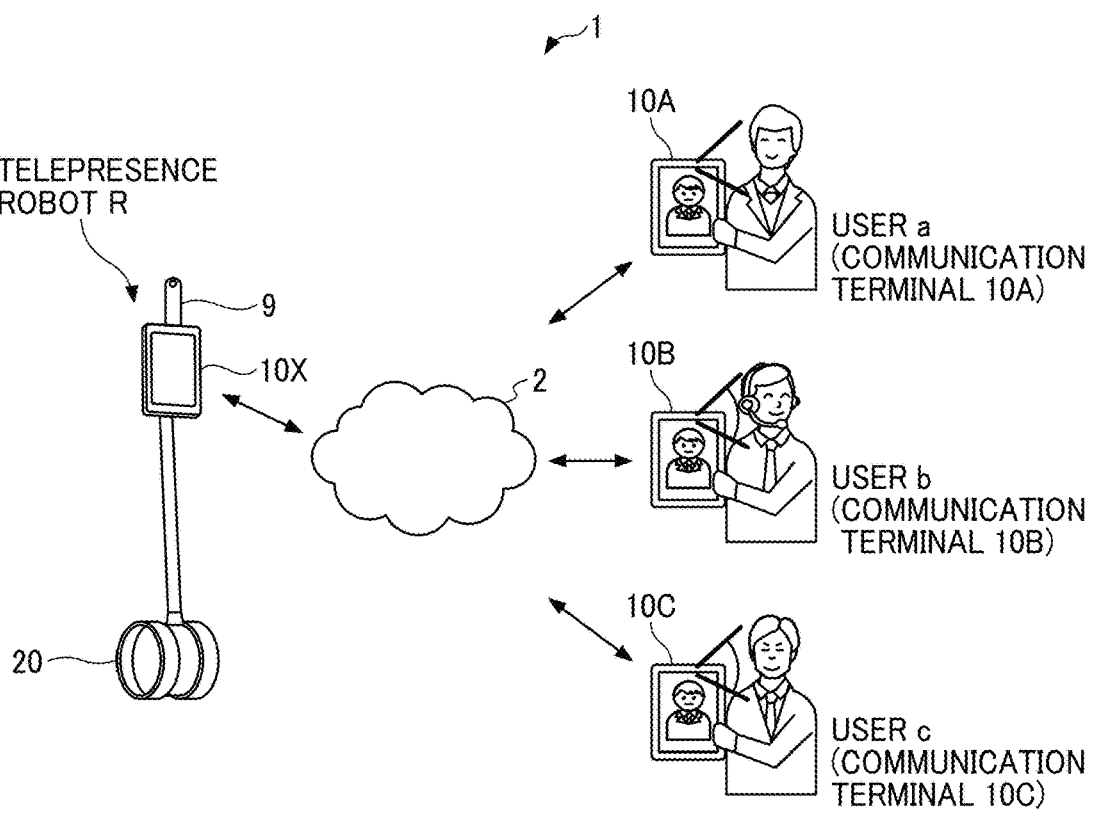

In the situation illustrated in FIG. 1B, three users and three communication terminals are presented. In an example, four or more users and four or more communication terminals may be used. In another example, one user and one communication terminal or two users and two communication terminals may be used.

Figure 1C:
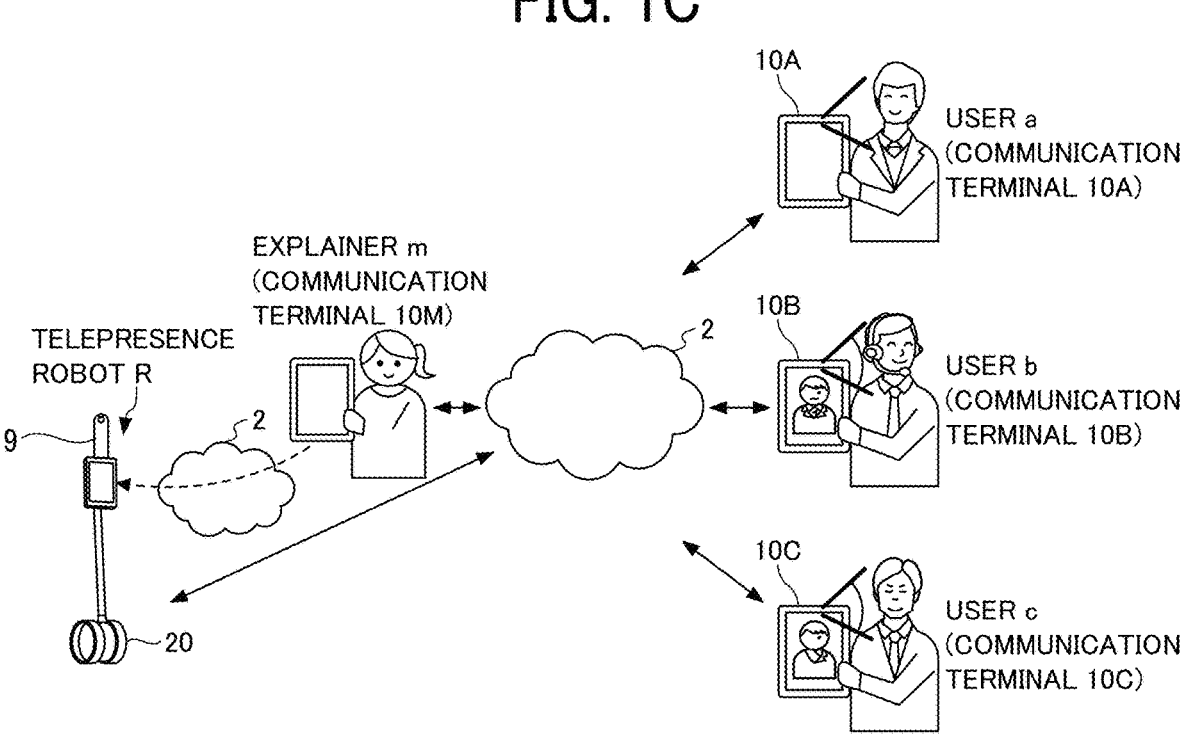

As a non-limiting example, as illustrated in FIG. 1C, an explainer m who explains is located in the place (or site) where the robot R is placed. The explainer m may use a dedicated communication terminal 10M to have a teleconference with the users a, b, and c at the respective other sites. In an example, the robot R notifies the users a, b, and c at the respective sites of the local situation via video and audio, and the explainer m accompanies the robot R to help the robot R do this job. The communication terminal 10M has functions equivalent to those of the other communication terminals 10A, 10B, and 10C, and a description thereof will thus be omitted.

The wide-angle image capturing device 9 transmits a spherical video (an example of a second video) described below to the communication terminal 10X. The communication terminals 10A, 10B, and 10C each include a narrow-angle image capturing unit 14 described below and a microphone, and transmit and receive video and audio to and from one another. The communication terminal 10X transmits the spherical video and at least one of a front video 831 and a back video 832 to the communication terminals 10A, 10B, and 10C. The communication terminals 10A, 10B, and 10C transmit front videos 831 of the users a, b, and c to the communication terminal 10X.

In the communication terminals 10A, 10B, and 10C, application programs (hereinafter referred to as "apps") for accepting an operation related to movement of the moving device 20 operate. The users a, b, and c input operation instructions while checking the video transmitted from the communication terminal 10X. Operation information indicating a remote operation (operation instruction) input by the operator 810 is transmitted from the communication terminal 10A to the communication terminal 10X via a communication network 2.

The communication terminal 10X and the moving device 20 can communicate with each other via short-range wireless communication such as Bluetooth®. The communication terminal 10X controls the moving device 20 in accordance with an operation instruction given by a specific user having an operation right. In an example, the specific user (located at the home 802) remotely controls the moving device 20 to move.

The operation right is a right (operation right that is exclusive) granted to a specific user (including a specific communication terminal) among a plurality of users (including communication terminals) such that the specific user can exclusively perform a remote operation on each operation target (such as the narrow-angle image capturing unit 14 and the moving device 20) of the robot R. A different operation right is set for each operation target. The operation right may also be referred to as a special right that allows a specific user to perform a remote operation. In other words, a user who does not have the operation rights is unable to perform remote operations on the respective operation targets of the robot R. Examples of the user include people and organizations such as departments and companies.

If the narrow-angle image capturing unit 14 incorporated in the communication terminal 10X is capable of capturing only a scene in front of or behind the moving device 20, it is difficult for the user to check the situation around the moving device 20 (e.g., the situation under or to the left or right of the moving device 20). Thus, the wide-angle image capturing device 9 capable of capturing an image of 360 degrees around the moving device 20 is mounted on the communication terminal 10X. The wide-angle image capturing device 9 may be mounted on the communication terminal 10X or may be mounted on the moving device 20. The wide-angle image capturing device 9, which is capable of capturing an image of a wide-angle range, is disposed in an upper part of the robot R, for example, to capture surroundings without being blocked by obstacles. In FIGS. 1A to 1C, the wide-angle image capturing device 9 is disposed in the upper part of the communication terminal 10X. In an example, the wide-angle image capturing device 9 is disposed in a left or right part of the communication terminal 10X. In another example, the wide-angle image capturing device 9 is disposed in a pole portion of the moving device 20. In an example, the wide-angle image capturing device 9 is incorporated in the communication terminal 10X. In another example, the wide-angle image capturing device 9 is externally attached to the communication terminal 10X.

Display of Spherical Video

Figures 2A, 2B:
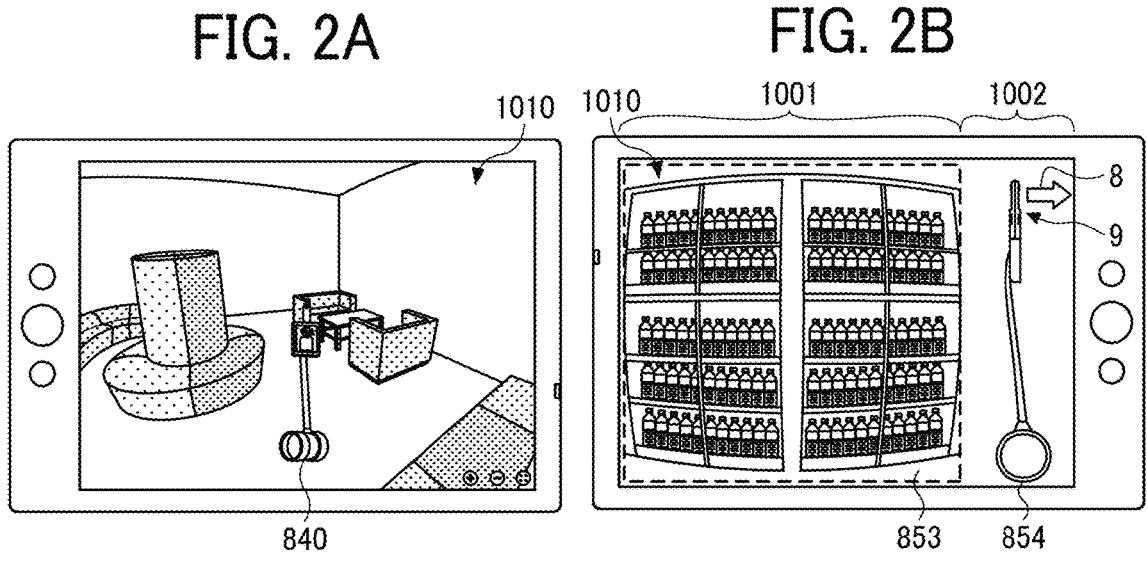

An example of the display of a spherical video in which objects in 360 degrees around the wide-angle image capturing device 9 appears will be described with reference to FIGS. 2A to 2C. In the example illustrated in FIGS. 2A to 2C, the spherical video is displayed such that a user viewing a certain direction in the spherical video can grasp the direction in which the moving device 20 is facing. FIGS. 2A, 2B, and 2C are views illustrating an example of the display of predetermined-area videos. The predetermined-area videos are part of a spherical video captured by the wide-angle image capturing device 9. This embodiment presents three display patterns that allow a user (e.g., the user a) who is an operator to grasp the direction in which the moving device 20 is facing.

Since the moving device 20 has the same orientation as the robot R, the moving device 20 and the robot R may be regarded as the same in terms of orientation. The orientation of the moving device 20 is the direction in which the moving device 20 is facing. In an example, the orientation of the moving device 20 is a front direction or a forward movement direction. The orientation of the moving device 20 may be lateral, upward, downward, or the like as long as the user can grasp the direction in which the moving device 20 is facing.

FIG. 2A illustrates an example of a spherical video display screen 1010 on which a spherical video is displayed in pattern 1. In the pattern 1, an image 840 of the robot R is displayed in such a manner as to be superimposed on a spherical video currently viewed by the user to allow the user to grasp the orientation of the moving device 20. The user can understand the direction of viewing relative to the orientation of the moving device 20. The image 840 of the robot R is represented in such a manner as to allow the user to understand the orientation of the robot R.

The user causes the communication terminal 10A to display a predetermined-area video. The video displayed on the spherical video display screen 1010 is a predetermined-area video. In FIG. 2A, a portion of an open living room is displayed. The predetermined-area video is part of the spherical video and is a video of an area displayed on a display device (a display unit 109 described below) of the communication terminal 10A. The display unit 109 provides an area, and the user displays a predetermined-area video in the area. The spherical video is displayed such that the object to be captured is distorted (see FIG. 9C). The predetermined-area video (see FIG. 12B or 12D), which is a partial area of the spherical video, is displayed to facilitate the user's viewing.

As described above, the direction of viewing by the user does not necessarily match the front direction of the moving device 20. The communication terminal 10A rotates the robot R based on a difference between the front direction of the moving device 20 and an imaging direction defining the predetermined-area video, and displays the rotated robot R in the spherical video. The imaging direction is a direction pointing to the center of the predetermined-area video. The displayed image 840 of the robot R is not an image of the robot R in real space, but is an image created by computer graphics (CG). The CG is an image rendered by a computer. While two-dimensional CGs and three-dimensional CGs are mainly available, three-dimensional CGs are used in this embodiment.

It is possible to understand in which direction the robot R (the moving device 20) is facing in the spherical video. In the example illustrated in FIG. 2A, the robot R is facing slightly to the right of the user a. Viewing the image 840 of the robot R enables the operator to easily determine in which direction the robot R will move if the operator moves the robot R forward.

In FIG. 2A, for convenience of description, the entire image 840 of the robot R is displayed. Preferably, the image 840 of the robot R is displayed further toward the point of view (i.e., toward the viewer) because the spherical video is captured by the wide-angle image capturing device 9 disposed in the upper part of the robot R. Accordingly, in an example, the entire image 840 of the robot R does not appear.

Next, pattern 2 will be described. FIG. 2B illustrates an example of a spherical video display screen 1010 on which a spherical video is displayed in pattern 2. The pattern 2 displays a predetermined-area video 853, which is part of the spherical video viewed by the operator 810, and also displays the direction of viewing by the operator 810 relative to the robot R. Specifically, an image 854 of the robot R and an arrow 8 indicating the imaging direction are displayed.

As illustrated in FIG. 2B, the communication terminal 10A displays the predetermined-area video 853 in a spherical video field 1001 in accordance with an operation performed by the user a. In FIG. 2B, displayed products appear. The communication terminal 10A displays a display field 1002 for the robot R in addition to the spherical video field 1001. The display field 1002 for the robot R displays the arrow 8 indicating the imaging direction. The arrow 8 indicates the direction of the predetermined-area video 853 as viewed from the robot R. That is, the arrow 8 indicates, in a three-dimensional form, the imaging direction that is the direction of viewing by the user a. The term "three-dimensional form" refers to having information on an azimuth angle and an elevation angle. The displayed image 854 of the robot R is not an image of the robot R in real space, but is an image created by CG. The same applies to the arrow 8 indicating the imaging direction. In FIG. 2B, the front direction of the robot R is the imaging direction.

As described above, the user can grasp the direction in which the spherical video is viewed from the robot R. The user can also grasp the direction in which the robot R is facing. The example illustrated in FIG. 2B indicates that the robot R approaches the products as the robot R moves forward. Compared to the pattern 1, the pattern 2 has an advantage in that the image 854 of the robot R does not overlap the spherical video.

FIG. 2C illustrates an example of a spherical video display screen 1010 on which a spherical video is displayed in pattern 3. The video displayed on the spherical video display screen 1010 is a predetermined-area video. In the pattern 3, the communication terminal 10A displays an operation button 860 when the direction of the center of the predetermined-area video (the imaging direction described above) and the front direction of the robot R substantially match. In a left view c-1 illustrated in FIG. 2C, the operation button 860 is not displayed because the imaging direction and the front direction of the robot R do not substantially match. In a right view c-2 illustrated in FIG. 2C, the operation button 860 is displayed because the imaging direction and the front direction of the robot R substantially match. The term "substantially matching" refers to matching to an extent that does not hinder the movement of the moving device 20. If the operation button 860 is displayed only when the imaging direction and the front direction of the robot R exactly match, the operation button 860 is rarely displayed and is difficult to operate to remotely operate the robot R. Thus, the determination is made based on matching to an extent that does not reduce the operability. For example, a deviation of about ±10 to 20 degrees in each of the horizontal direction and the elevation-angle direction may be permissible. The deviation may be set by the operator 810.

In the pattern 3, the operation button 860 is displayed when the imaging direction and the front direction of the robot R substantially match. Thus, if the operation button 860 is displayed as a result of the user's action of changing the predetermined-area video, the user can determine that the imaging direction and the front direction of the robot R substantially match. Accordingly, the imaging direction and the direction of viewing in the spherical video by the user can be made to match each other. Since the operation button 860 is displayed when the imaging direction and the direction of viewing in the spherical video by the user match, the user can grasp where the robot R will move if the robot R moves forward.

System Configuration

FIG. 3 is a diagram illustrating an example configuration of the communication system 1 according to an embodiment of the present disclosure. The communication system 1 includes the plurality of communication terminals (10A, 10B, 10C, and 10X), the moving device 20, a relay device 30, and a communication management system 50. In the following description, any communication terminal among the plurality of communication terminals (10A, 10B, 10C, and 10X) is referred to as a "communication terminal 10". Further, any communication terminal among the user-side communication terminals (10A, 10B, and 10C) is referred to as a "communication terminal 10α". The number of communication terminals 10 illustrated in FIG. 3 is an example.

The communication terminal 10 is communicably connected to the other communication terminals 10 via the communication network 2. The relay device 30 is communicably connected to other relay devices via the communication network 2, and the communication management system 50 is communicably connected to other communication management systems via the communication network 2. The communication network 2 may include, for example, a LAN, the Internet, a mobile phone network, or a dedicated line.

The communication terminal 10 is, for example, a general-purpose information processing apparatus such as a tablet terminal, a smartphone, or a PC, or a dedicated communication terminal such as a teleconferencing apparatus. In an example, the communication terminal 10 transmits and receives video and/or audio to and from one or more of the other communication terminals 10 to perform a teleconference. The teleconference is an example of a video conversation. The video conversation includes, but is not limited to, conferencing. The video conversation is an example of video distribution. The video distribution includes, but is not limited to, a voice conversation.

The communication terminal 10α executes an application corresponding to the communication system 1 to have a teleconference with the communication terminal 10X and remotely operate the moving device 20 via the communication terminal 10X. In an example, in response to operation of the operation button 860 displayed on a display screen for the teleconference, the communication terminal 10α moves the moving device 20 including the communication terminal 10X forward, backward, leftward, of rightward, for example. The communication terminal 10α may activate browser software, and the browser software may display a video and accept an operation of the moving device 20 on the browser software.

In the example illustrated in FIG. 1C, the communication terminal 10M has the same basic communication function as the communication terminal 10α. The communication terminal 10M is a terminal for accepting a request for setting an operation right, which will be described below, from the communication terminal 10α such that the explainer m inputs information indicating whether the setting is permissible.

The moving device 20 of the robot R is a device having a traveling function. For example, the moving device 20 has a plurality of wheels that are driven to perform movement such as forward movement, backward movement, right turn, or left turn in accordance with control from the communication terminal 10X attached to the moving device 20. When the user gives an instruction to move the moving device 20 to the left or right by remote operation, the moving device 20 moves forward after turning to the right or left. The external appearance of the moving device 20 illustrated in FIG. 3 is an example. The moving device 20 is movable together with the communication terminal 10X in accordance with an operation instruction from the communication terminal 10X mounted on the moving device 20.

The relay device 30 is, for example, an information processing apparatus or a system including one or more information processing apparatuses. The relay device 30 relays content data (including video and audio) transmitted and received between the plurality of communication terminals 10. The audio includes voice, noise, and the like. The plurality of communication terminals 10 may directly transmit and receive content data to and from each other without the intervention of the relay device 30.

The communication management system 50 is, for example, an information processing apparatus or a system including one or more information processing apparatuses. The communication management system 50 performs operations, for example, login authentication from the communication terminal 10, management of the communication state of the communication terminal 10, management of a counterpart list and the like, and control of a session for communication between the plurality of communication terminals 10 via the relay device 30.

In one embodiment, a session is implemented by the relay device 30 relaying content data including video and/or audio between the plurality of communication terminals 10.

In the configuration described above, for example, the user a of the communication terminal 10A communicates with the communication terminal 10X to move the communication terminal 10X and the moving device 20 by remote operation. As a result, in an example, the user a of the communication terminal 10A moves the communication terminal 10X and the moving device 20 to a location close to any party and have a teleconference with the party.

Hardware Configuration

Hardware Configuration of Communication Terminal

Figure 4:
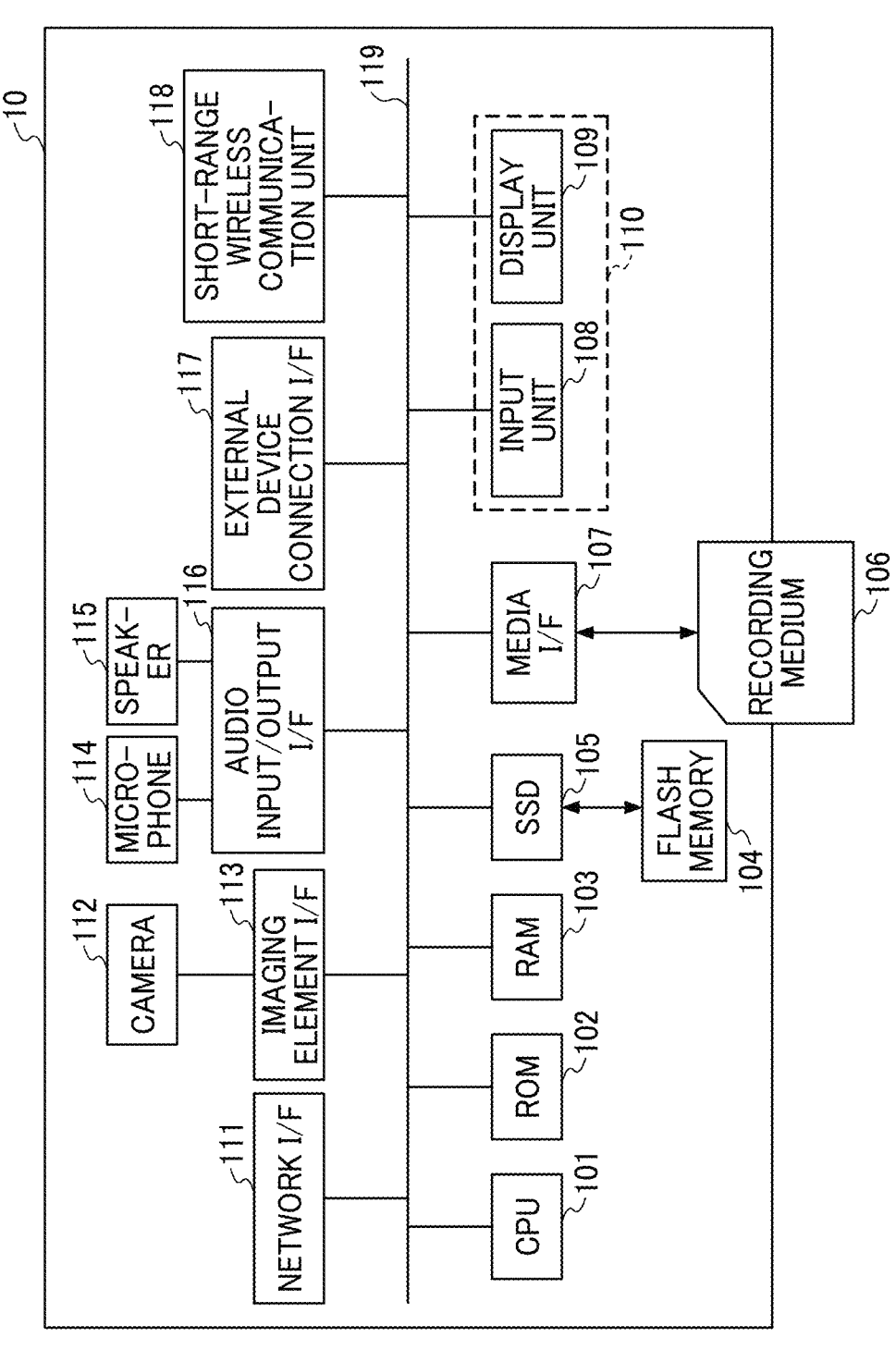
FIG. 4 is a diagram illustrating an example hardware configuration of a communication terminal according to an embodiment of the present disclosure.

FIG. 4 is a diagram illustrating an example hardware configuration of the communication terminal 10 according to an embodiment of the present disclosure. The communication terminal 10 has the configuration of a typical computer and includes, for example, a central processing unit (CPU) 101, a read-only memory (ROM) 102, a random access memory (RAM) 103, a flash memory 104, and a solid state drive (SSD) 105. The communication terminal 10 further includes a media interface (I/F) 107, an input unit 108, a display unit 109, a network I/F 111, a camera 112, an imaging element I/F 113, a microphone 114, a speaker 115, and an audio input/output I/F 116. The communication terminal 10 further includes an external device connection I/F 117, a short-range wireless communication unit 118, and a bus 119.

The CPU 101 is an arithmetic unit that reads a program or data from, for example, the ROM 102, the flash memory 104, or the like and executes a process to implement each function of the communication terminal 10. The ROM 102 is a non-volatile memory that stores a program used to activate the CPU 101, such as an initial program loader (IPL). The RAM 103 is a volatile memory used as a work area or the like for the CPU 101.

The flash memory 104 is a non-volatile storage device that stores, for example, an operating system (OS), a program of application software, and various data. The SSD 105 controls reading or writing of various data from or to the flash memory 104 under the control of the CPU 101. The media I/F 107 controls reading or writing (storing) of data from or to a recording medium 106 such as a memory card. In an example, the recording medium stores a computer-readable program for controlling the communication terminal 10.

The input unit 108 is an input device for accepting an input operation from an operator. Examples of the input unit 108 include a touch panel, a keyboard, and a pointing device. Audio input may be received. The display unit 109 is a display device that provides various types of display to the operator. The input unit 108 and the display unit 109 may be included in a display input unit 110. In an example, the display input unit 110 is a touch panel display having a touch panel and a display. The display unit 109 is not limited to a display of the communication terminal 10. In an example, the display unit 109 may be a display external to the communication terminal 10, a display of another communication terminal different from the communication terminal 10, or a screen (including an object to be displayed in projection mapping) projected by a projector.

The network I/F 111 is a communication interface for the communication terminal 10 to transmit and receive data using the communication network 2. The camera 112 includes an imaging element for imaging an object under the control of the CPU 101. The imaging element I/F 113 controls imaging by the camera 112 and converts captured data into predetermined image data. The camera 112 is a narrow-angle image capturing device that captures an image at an angle of view narrower than that of the wide-angle image capturing device 9. The camera 112 has a higher resolution than the wide-angle image capturing device 9. The resolution is a degree of detail of a digital image. The resolution is expressed by quantifying how close individual unit points (dots or pixels) of the digital image can be to each other. The resolution is typically expressed in dots. The resolution of a typical display is represented by the number of dots arranged in a matrix of horizontal and vertical dots, such as 1024 dots×768 dots. When compared in the same imaging range, the number of dots of the wide-angle image capturing device 9 is smaller than the number of dots of the camera 112.

The microphone 114 converts a recorded sound into audio data. The speaker 115 converts audio data into a sound and outputs the sound. The audio input/output I/F 116 controls input and output of sound between the microphone 114 and the speaker 115.

The external device connection I/F 117 is an interface for connecting an external device such as a Universal Serial Bus (USB) device. Examples of the external device include the moving device 20 illustrated in FIG. 3.

The short-range wireless communication unit 118 is a communication interface for communicating with an external device (e.g., the moving device 20) via short-range wireless communication such as Bluetooth® or Bluetooth® Low Energy. The bus 119 is connected to the components described above in common and configured to transmit an address signal, a data signal, various control signals, and the like.

Hardware Configuration of Communication Management System

Figure 5:
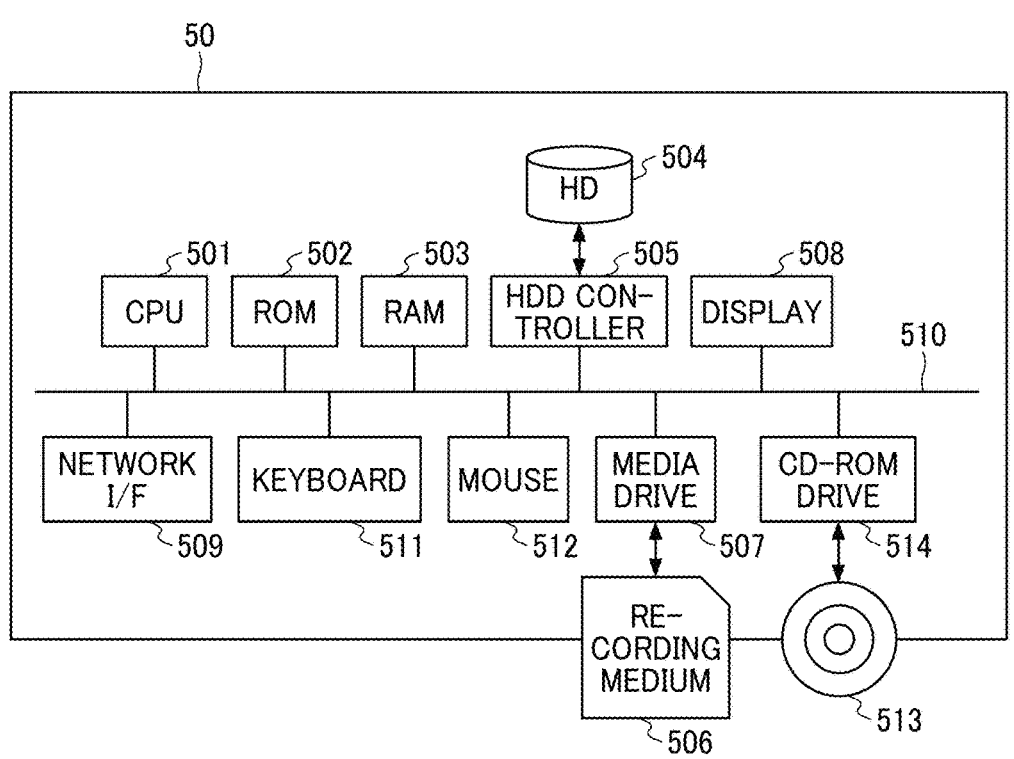
FIG. 5 is a diagram illustrating an example hardware configuration of a communication management system according to an embodiment of the present disclosure.

FIG. 5 is a diagram illustrating an example hardware configuration of the communication management system 50 according to an embodiment of the present disclosure. The communication management system 50 has the configuration of a typical computer and includes, for example, a CPU 501, a ROM 502, a RAM 503, a hard disk (HD) 504, a hard disk drive (HDD) controller 505, a media drive 507, and a display 508. The communication management system 50 further includes a network I/F 509, a keyboard 511, a mouse 512, a compact disc read-only memory (CD-ROM) drive 514, and a bus 510.

The CPU 501 is an arithmetic unit that reads a program or data stored in, for example, the ROM 502, the HD 504, or the like and executes a process to implement each function of the communication management system 50. The ROM 502 is a non-volatile memory that stores a program used to activate the CPU 501, such as an IPL. The RAM 503 is a volatile memory used as a work area or the like for the CPU 501.

The HD 504 is a storage device that stores, for example, an OS, a program of application software, and various data. The HDD controller 505 controls reading or writing of various data from or to the HD 504 under the control of the CPU 501. The display 508 is a display device that displays various types of information such as a cursor, a menu, a window, text, or an image, for example.

The network I/F 509 is a communication interface for performing data communication using the communication network 2. The keyboard 511 is an example of an input device for accepting an input operation of characters, numerical values, various instructions, or the like by a system administrator. The mouse 512 is an example of a pointing device that accepts operations performed by the system administrator, such as selection and execution of various instructions, selection of an object to be processed, and movement of the cursor being displayed.

In an example, the display 508, the keyboard 511, and the mouse 512 are not included in the communication management system 50 or the relay device 30. The display 508, the keyboard 511, and the mouse 512 may be connected to the communication management system 50 or the relay device 30, as necessary.

The media drive 507 controls reading and writing (storing) of data from and to a recording medium 506 such as a memory card, for example. The CD-ROM drive 514 controls reading or writing of data from or to a disc 513. The disc 513 is an example of a removable recording medium. The bus 510 electrically connects the components described above to each other and transmits an address signal, a data signal, various control signals, and the like. The hardware configuration of the communication management system 50 described above is an example.

Hardware Configuration of Relay Device

The relay device 30 has a hardware configuration similar to that of the communication management system 50. The programs for the communication terminal 10, the relay device 30, and the communication management system 50 may be each recorded and distributed on a computer-readable recording medium as a file in an installable or executable format. Examples of the recording medium include a compact disc recordable (CD-R), a digital versatile disc (DVD), Blu-ray Disc®, and a USB memory. The recording media such as CD-ROMs storing the programs, and the HD 504 storing the programs may be provided in the form of program products to domestic or foreign users.

Hardware Configuration of Moving Device

Figure 6:
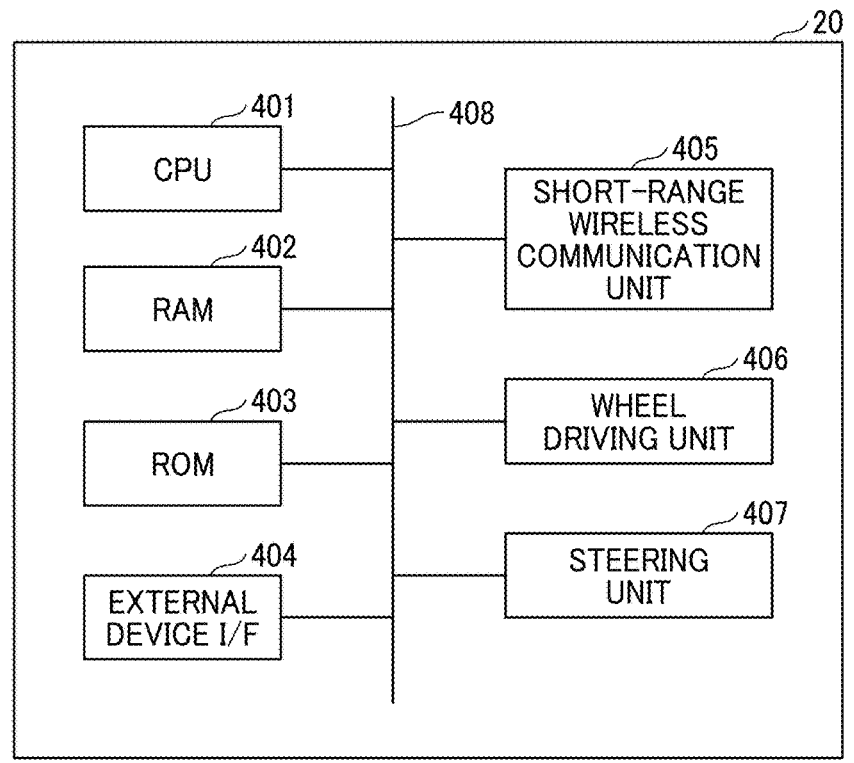
FIG. 6 is a diagram illustrating an example hardware configuration of a moving device according to an embodiment of the present disclosure.

FIG. 6 is a diagram illustrating an example hardware configuration of the moving device 20 according to an embodiment of the present disclosure. The moving device 20 includes, for example, a CPU 401, a RAM 402, a ROM 403, an external device I/F 404, a short-range wireless communication unit 405, a wheel driving unit 406, and a steering unit 407.

The CPU 401 is an arithmetic unit that executes a program stored in the ROM 403 or the like to implement each function of the moving device 20. The RAM 402 is a volatile memory used as a work area or the like for the CPU 401. The ROM 403 is a non-volatile memory that stores a program or the like for the moving device 20. In an example, the ROM 403 is a rewritable non-volatile memory such as a flash ROM.

The external device I/F 404 is a wired communication interface for communicating with the external device connection I/F 117 or the like of the communication terminal 10 via a wired connection.

The short-range wireless communication unit 405 is, for example, a wireless communication interface for performing wireless communication using the same wireless communication method as that for the short-range wireless communication unit 118 of the communication terminal 10. In an example, the moving device 20 communicates with the communication terminal 10 via the external device I/F 404 or the short-range wireless communication unit 405.

The wheel driving unit 406 is an example of a driving device that drives the wheels of the moving device 20 to move the moving device 20. The wheel driving unit 406 includes, for example, a motor.

The steering unit 407 is an example of a steering device that steers the moving device 20 that is moved by the wheel driving unit 406. In an example, the steering unit 407 may change the orientation or inclination of the wheels or control the revolutions per minute (RPM), the speed, or the like of the left and right wheels to change the orientation of the moving device 20.

Hardware Configuration of Wide-Angle Image Capturing Device

Figure 7:
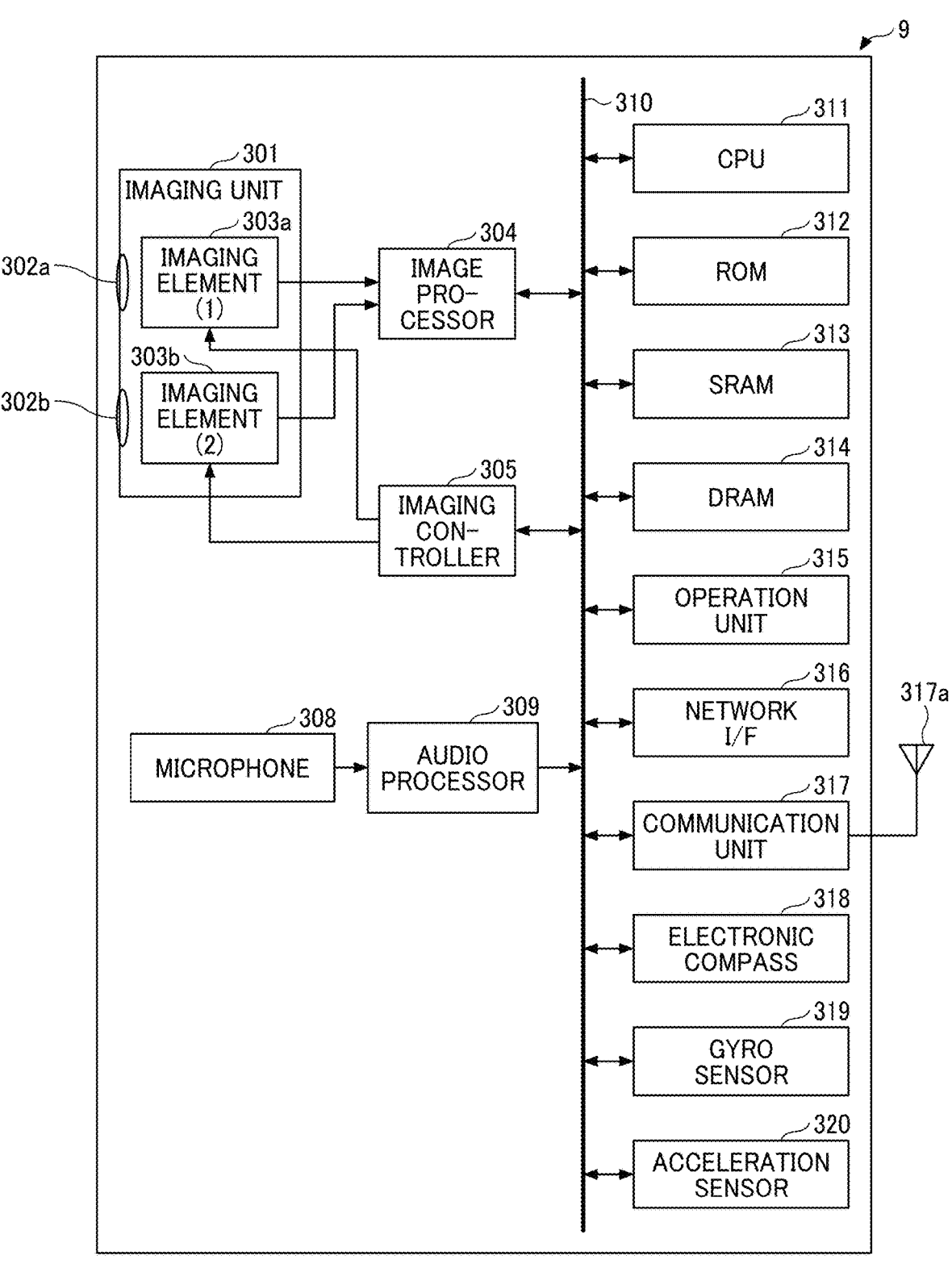
FIG. 7 is a diagram illustrating an example hardware configuration of the wide-angle image capturing device.

The hardware configuration of the wide-angle image capturing device 9 will be described with reference to FIG. 7. FIG. 7 is a diagram illustrating an example hardware configuration of the wide-angle image capturing device 9. In the following description, the wide-angle image capturing device 9 is a spherical (omnidirectional) wide-angle image capturing device having two imaging elements. The wide-angle image capturing device 9 may have any number of two or more imaging elements. In one example, the wide-angle image capturing device is not dedicated to omnidirectional image capturing, and an external omnidirectional imaging unit is attached to a general-purpose digital camera or a smartphone to implement functions that are substantially the same as those of the wide-angle image capturing device 9.

As illustrated in FIG. 7, the wide-angle image capturing device 9 also includes an imaging unit 301, an image processor 304, an imaging controller 305, a microphone 308, an audio processor 309, a CPU 311, a ROM 312, a static random access memory (SRAM) 313, a dynamic random access memory (DRAM) 314, an operation unit 315, a network I/F 316, a communication unit 317, an antenna 317a, an electronic compass 318, a gyro sensor 319, and an acceleration sensor 320.

The imaging unit 301 includes wide-angle lenses (so-called fish-eye lenses) 302a and 302b each having an angle of view of 180 degrees or more to form a hemispherical image. The imaging unit 301 further includes two imaging elements 303a and 303b corresponding to the wide-angle lenses 302a and 302b, respectively. Each of the imaging elements 303a and 303b includes an image sensor such as a complementary metal oxide semiconductor (CMOS) sensor or a charge-coupled device (CCD) sensor, a timing generation circuit, and a group of registers. The image sensor converts an optical image formed by the fish-eye lens 302a or 302b into an electric signal and outputs image data. The timing generation circuit generates horizontal or vertical synchronization signals, pixel clocks, and the like for the image sensor. In the group of registers, various commands, parameters, and the like for an operation of the imaging element 303a or 303b are set.

Each of the imaging elements 303a and 303b of the imaging unit 301 is connected to the image processor 304 via a parallel I/F bus. Each of the imaging elements 303a and 303b of the imaging unit 301 is also connected to the imaging controller 305 through a serial I/F bus such as an inter-integrated circuit (I2C) bus. The image processor 304, the imaging controller 305, and the audio processor 309 are connected to the CPU 311 via a bus 310. The ROM 312, the SRAM 313, the DRAM 314, the operation unit 315, the network I/F 316, the communication unit 317, and the electronic compass 318, and so on are also connected to the bus 310.

Figure 9A:
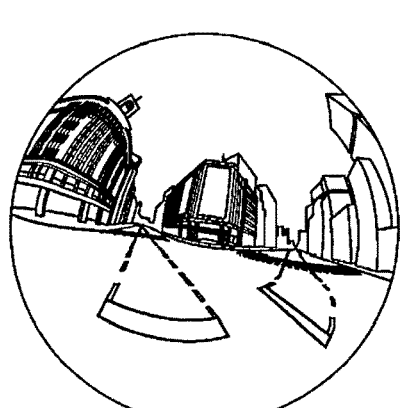
FIGS. 9A, 9B, and 9C are views illustrating an overview of a process for creating an equirectangular projection image and a spherical image from images captured by the wide-angle image capturing device, according to an embodiment of the present disclosure.
Figure 9B:
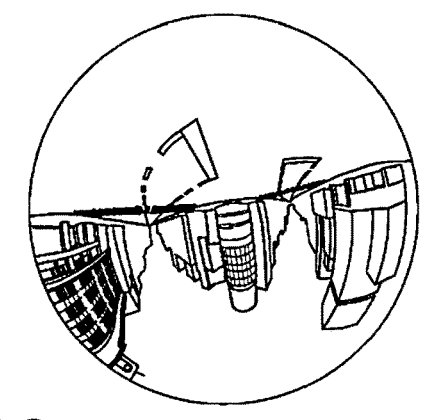
Figure 9C:
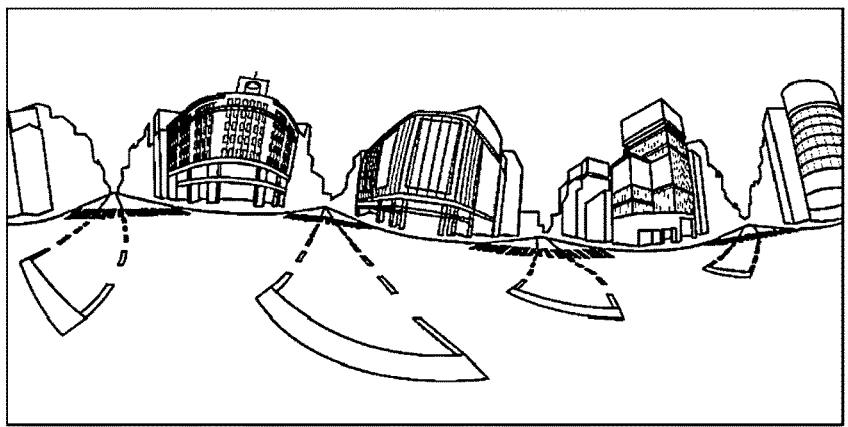

The image processor 304 acquires respective items of image data from the imaging elements 303a and 303b via the parallel I/F buses and performs predetermined processing on the items of image data. Thereafter, the image processor 304 combines the items of image data to generate data of an equirectangular projection image as illustrated in FIG. 9C.

The imaging controller 305 usually functions as a master device while each of the imaging elements 303a and 303b usually functions as a slave device. The imaging controller 305 sets commands and the like in the group of registers of each of the imaging elements 303a and 303b via the I2C bus. The imaging controller 305 receives various commands from the CPU 311. The imaging controller 305 further acquires status data and the like of the group of registers of each of the imaging elements 303a and 303b via the I2C bus. The imaging controller 305 sends the obtained status data and the like to the CPU 311.

The imaging controller 305 instructs the imaging elements 303a and 303b to output the image data at the time when a shutter button of the operation unit 315 is pressed. In one example, the ide-angle image capturing device 9 has a function of displaying a preview image on a display (e.g., the display of the communication terminal 10X) or a function of displaying a moving image. In the case of displaying a moving image, image data are continuously output from the imaging elements 303a and 303b at a predetermined frame rate (frames per minute).

The imaging controller 305 operates in cooperation with the CPU 311 to synchronize the time when the imaging element 303a outputs image data and the time when the imaging element 303b outputs the image data. In this embodiment, the wide-angle image capturing device 9 does not include a display. In an example, the wide-angle image capturing device 9 may include a display.

The microphone 308 converts a recorded sound into audio data. The audio processor 309 acquires the audio data output from the microphone 308 via an I/F bus and performs predetermined processing on the audio data.

The CPU 311 controls the overall operation of the wide-angle image capturing device 9 and performs processing. The ROM 312 stores various programs to be executed by the CPU 311. Each of the SRAM 313 and the DRAM 314 operates as a work memory to store programs to be executed by the CPU 311 or data being currently processed. More specifically, in one example, the DRAM 314 stores image data currently processed by the image processor 304 and data of the equirectangular projection image on which processing has been performed.

The operation unit 315 collectively refers to various operation buttons such as a shutter button. The operator operates the operation unit 315 to input various image capturing modes or image capturing conditions.

The network I/F 316 collectively refers to an interface circuit such as a USB I/F for interfacing with an external medium such as a Secure Digital (SD) card or a PC. The network I/F 316 may be either wired or wireless. The data of the equirectangular projection image, which is stored in the DRAM 314, is stored in the external medium via the network I/F 316 or transmitted to an external terminal (apparatus), such as the communication terminal 10X, via the network I/F 316, as desired.

The communication unit 317 communicates with the external terminal (apparatus) such as the communication terminal 10X via the antenna 317a of the wide-angle image capturing device 9 by short-range wireless communication such as Wireless Fidelity (Wi-Fi), near field communication (NFC), or Bluetooth®. The communication unit 317 can also transmit the data of the equirectangular projection image to the external terminal (apparatus) such as the communication terminal 10X.

The electronic compass 318 calculates an orientation of the wide-angle image capturing device 9 from the Earth's magnetism and outputs orientation information. The orientation information is an example of related information (metadata) in compliance with exchangeable image file format (Exif). The orientation information is used for image processing such as image correction of a captured image. The related information also includes data of a date and time when the image was captured, and data of a data size of image data.

The gyro sensor 319 detects a change in tilt (roll, pitch, and yaw) of the wide-angle image capturing device 9 with movement of the wide-angle image capturing device 9. The change in tilt is one example of related information (metadata) in compliance with Exif. This information is used for image processing such as image correction of a captured image.

The acceleration sensor 320 detects acceleration in three axial directions. The detected acceleration is used to detect the position of the wide-angle image capturing device 9 (e.g., the tilt of the wide-angle image capturing device 9 relative to the direction of gravity). The gyro sensor 319 and the acceleration sensor 320 improve the accuracy of image correction.

Spherical Video

Figure 8:
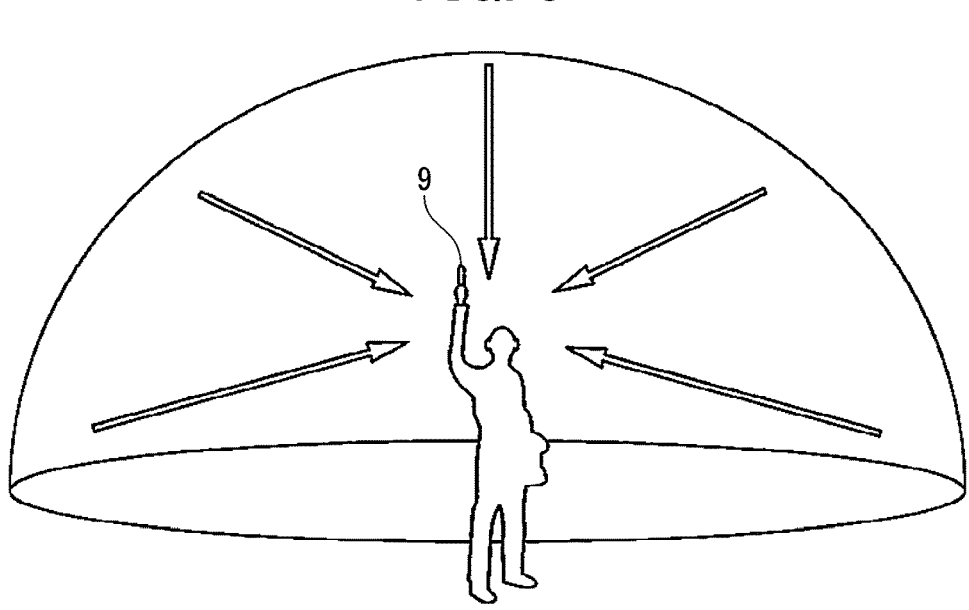
FIG. 8 is an illustration for explaining how the wide-angle image capturing device is used, according to an embodiment of the present disclosure.

Next, a situation in which the wide-angle image capturing device 9 is used will be described with reference to FIG. 8. FIG. 8 is an illustration for explaining how the wide-angle image capturing device 9 is used. As illustrated in FIG. 8, for example, a person uses the wide-angle image capturing device 9 to capture an image of an object or scenery around the person while holding the wide-angle image capturing device 9 with one hand. The imaging elements 303a and 303b illustrated in FIG. 7 capture the object or scenery around the person to obtain two hemispherical images.

Figures 10A, 10B:
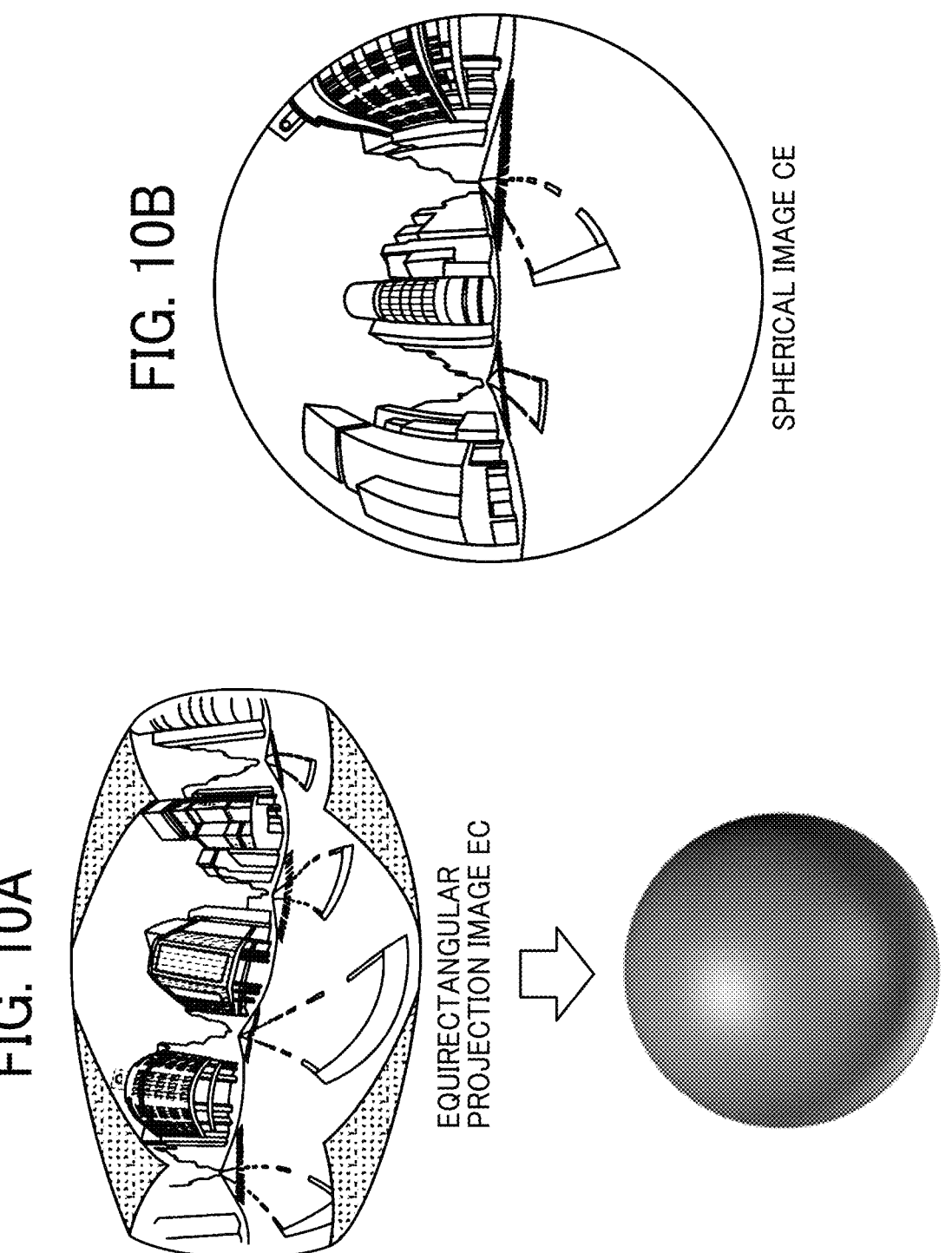
FIGS. 10A and 10B are views illustrating an overview of a process for creating an equirectangular projection image and a spherical image from images captured by the wide-angle image capturing device, according to an embodiment of the present disclosure.

Next, an overview of a process for generating an equirectangular projection image EC and a spherical image CE from the images captured by the wide-angle image capturing device 9 will be described with reference to FIGS. 9A to 9C and FIGS. 10A and 10B. FIG. 9A is a view illustrating a hemispherical image (front side) captured by the wide-angle image capturing device 9. FIG. 9B is a view illustrating a hemispherical image (back side) captured by the wide-angle image capturing device 9. FIG. 9C is a view illustrating an image in equirectangular projection (hereinafter referred to as an "equirectangular projection image" or an "equidistant cylindrical projection image"). FIG. 10A is a conceptual diagram illustrating how the equirectangular projection image is mapped to a surface of a sphere. FIG. 10B is a view illustrating a spherical image.

As illustrated in FIG. 9A, an image obtained by the imaging element 303a is a distorted hemispherical image (front side) captured through the fish-eye lens 302a described above. As illustrated in FIG. 9B, an image captured by the imaging element 303b is a distorted hemispherical image (back side) captured through the fish-eye lens 302b. The wide-angle image capturing device 9 combines the hemispherical image (front side) and the hemispherical image (back side), which are flipped by 180 degrees, to create the equirectangular projection image EC, as illustrated in FIG. 9C.

Open Graphics Library for Embedded Systems (OpenGL ES) is used to map the equirectangular projection image EC such that the equirectangular projection image EC covers a surface of a sphere, as illustrated in FIG. 10A. As illustrated in FIG. 10B, the spherical image CE is created. That is, the spherical image CE is represented as the equirectangular projection image EC, which corresponds to a surface facing the center of the sphere. OpenGL ES is a graphics library used for visualizing two-dimensional (2D) and three-dimensional (3D) data. The spherical image CE may be either a still image or a moving image.

Since the spherical image CE is an image mapped so as to cover the surface of the sphere, part of the image may look distorted when viewed by a user, providing a strange feeling. To overcome the strange feeling, an image of a predetermined area, which is part of the spherical image CE, is displayed as a flat image with less distortion to make the user feel comfortable when viewing the image. The image of the predetermined area corresponds to the predetermined-area video described above. The predetermined-area video will be described with reference to FIGS. 11 and 12A to 12D. The predetermined-area video may be either a still image or a moving image.

Figure 11:
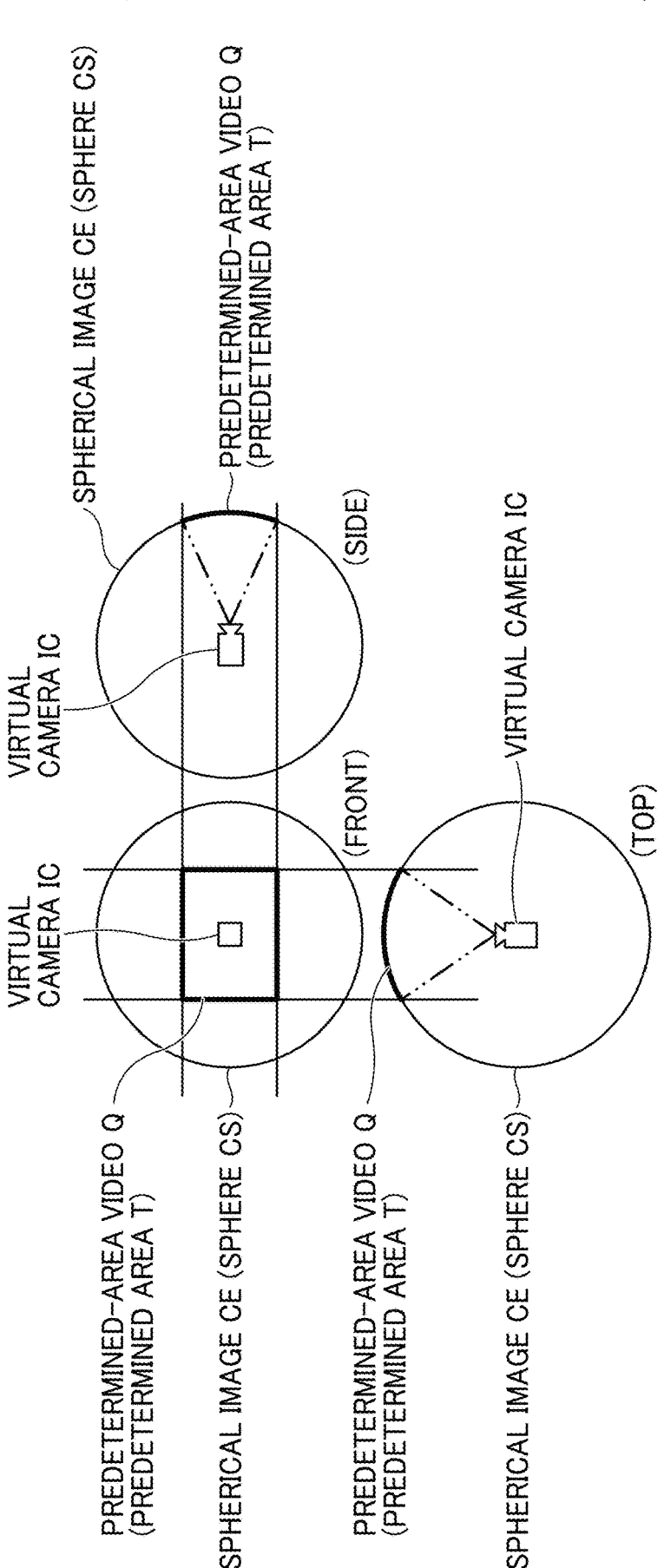
FIG. 11 is a view illustrating positions of a virtual camera and a predetermined area in a case where the spherical image is of a three-dimensional sphere according to an embodiment of the present disclosure.
Figure 12A:
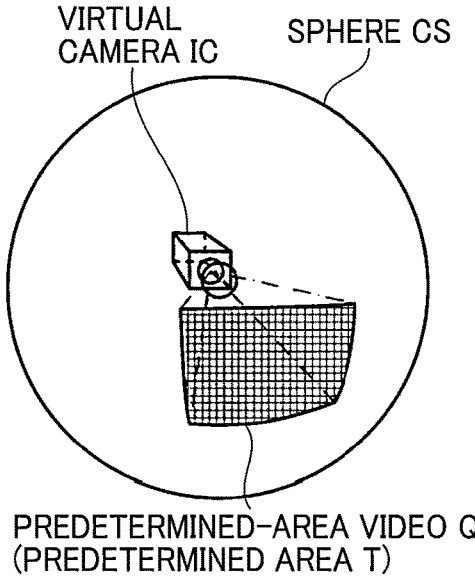
FIG. 12A is a perspective view of the virtual camera and the predetermined area illustrated in FIG. 11, according to an embodiment of the present disclosure.
Figure 12B:
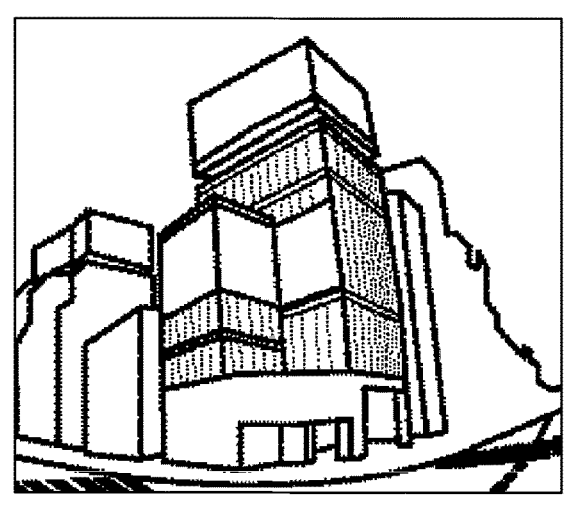
FIG. 12B is a view illustrating a predetermined-area video displayed on a display according to an embodiment of the present disclosure.

FIG. 11 is a view illustrating the position of a virtual camera IC and the position of a predetermined area T in a case where the spherical image CE is of a three-dimensional sphere CS. The position of the virtual camera IC corresponds to the position of a point of view of an operator who is viewing the spherical image CE represented as a surface area of the three-dimensional sphere CS. FIG. 12A is a perspective view of the virtual camera IC and the predetermined area T illustrated in FIG. 11, and FIG. 12B is a view illustrating a predetermined-area video displayed on a display. In FIG. 12A, the spherical image CE illustrated in FIG. 11 is represented by the three-dimensional sphere CS. Assuming that the spherical image CE generated in the way described above is a surface area of the sphere CS, the virtual camera IC is inside the spherical image CE as illustrated in FIG. 12A. The predetermined area T in the spherical image CE is an imaging area of the virtual camera IC. Specifically, the predetermined area T is identified by predetermined-area information indicating an imaging direction and an angle of view of the virtual camera IC in a three-dimensional virtual space containing the spherical image CE. Zooming in or out of the predetermined area T can be implemented by bringing the virtual camera IC closer to or farther away from the spherical image CE. A predetermined-area video Q is an image of the predetermined area T in the spherical image CE. The predetermined area T is defined by an angle of view $\alpha$ of the virtual camera IC and a distance f from the virtual camera IC to the spherical image CE (see FIG. 13).

The predetermined-area video Q illustrated in FIG. 12A is displayed on a predetermined display as an image of the imaging area of the virtual camera IC, as illustrated in FIG. 12B. The image illustrated in FIG. 12B is a predetermined-area video represented by predetermined-area information that is set by default. A description will be made using the imaging direction (ea, aa) and the angle of view ($\alpha$) of the virtual camera IC. In another example, the predetermined area T is identified by an imaging area (X, Y, Z) of the virtual camera IC, i.e., the predetermined area T, rather than by the angle of view α and the distance f.

Figure 12C:
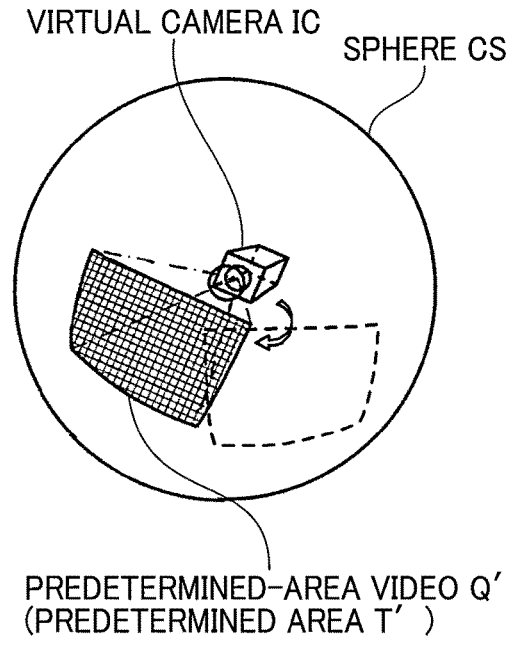
FIG. 12C is a perspective view of the virtual camera and the predetermined area after a virtual point of view is shifted from the state illustrated in FIG. 12A, according to an embodiment of the present disclosure.
Figure 12D:
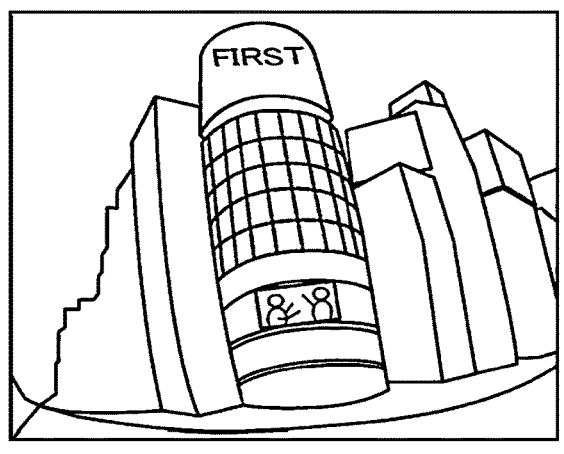
FIG. 12D is a view illustrating a predetermined-area video displayed on the display according to an embodiment of the present disclosure.

As illustrated in FIG. 12C, when the virtual point of view of the virtual camera IC is moved (also referred to as "changed") to the right side (the left side in FIG. 12C) from the state illustrated in FIG. 12A, the predetermined area T in the spherical image CE is moved to a predetermined area T' in accordance with the movement (also referred to as "change"), and the predetermined-area video Q displayed on the predetermined display is changed to a predetermined-area video Q'. As a result, the image illustrated in FIG. 12B is changed to the image illustrated in FIG. 12D and displayed on the display of the communication terminal 10.

Figure 13:
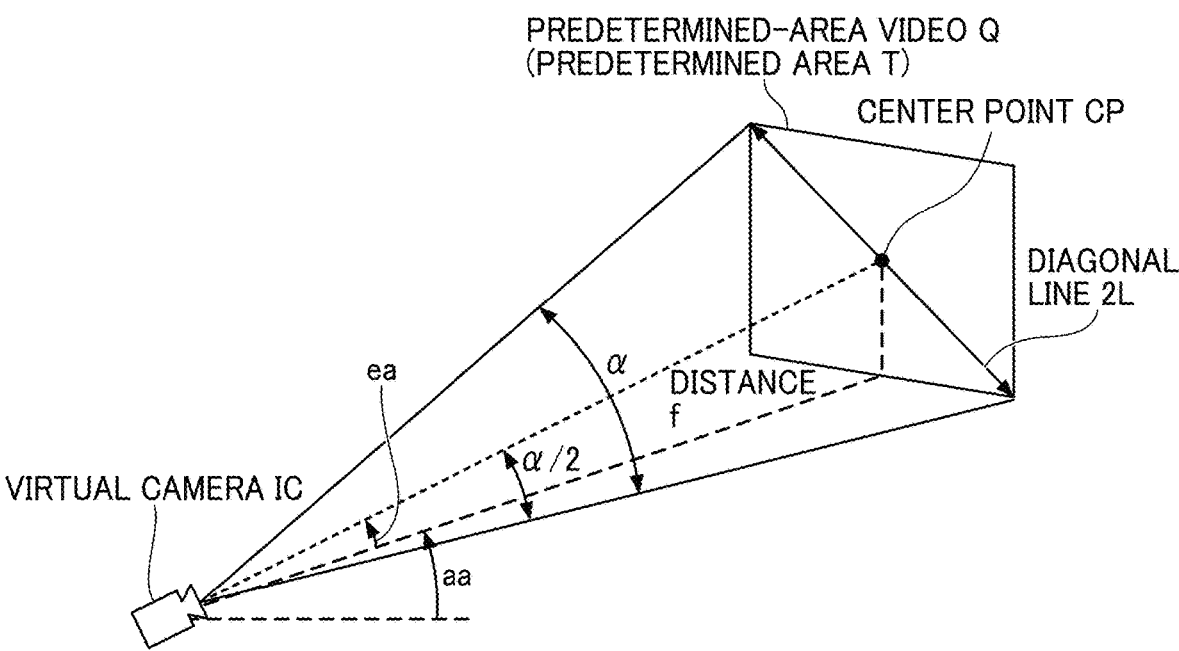
FIG. 13 is a view illustrating a relationship between predetermined-area information and an image of the predetermined area according to an embodiment of the present disclosure.

Next, a relationship between the predetermined-area information and the image of the predetermined area T will be described with reference to FIG. 13. FIG. 13 is a view illustrating a relationship between the predetermined-area information and the image of the predetermined area T. As illustrated in FIG. 13, "ea" denotes an elevation angle, "aa" denotes an azimuth angle, and "α" denotes an angle of view of the virtual camera IC. The position of the virtual camera IC is adjusted such that the point of gaze of the virtual camera IC, indicated by the imaging direction (ea, aa), matches a center point CP of the predetermined area T serving as the imaging area of the virtual camera IC. As illustrated in FIG. 13, the center point CP of the predetermined area T, whose diagonal angle of view is represented by the angle of view α of the virtual camera IC and is denoted by α, is used as a parameter (x, y) of the predetermined-area information. The distance from the virtual camera IC to the central point CP is denoted by "f". The distance between the center point CP and a given vertex of the predetermined area T is denoted by "L" (2 L is a diagonal line). In FIG. 13, a trigonometric function generally expressed by Equation (1) below holds.

$$(L/f) = \tan(\alpha/2) \qquad \text{Equation (1)}$$

Functions of Communication System

Figure 14:
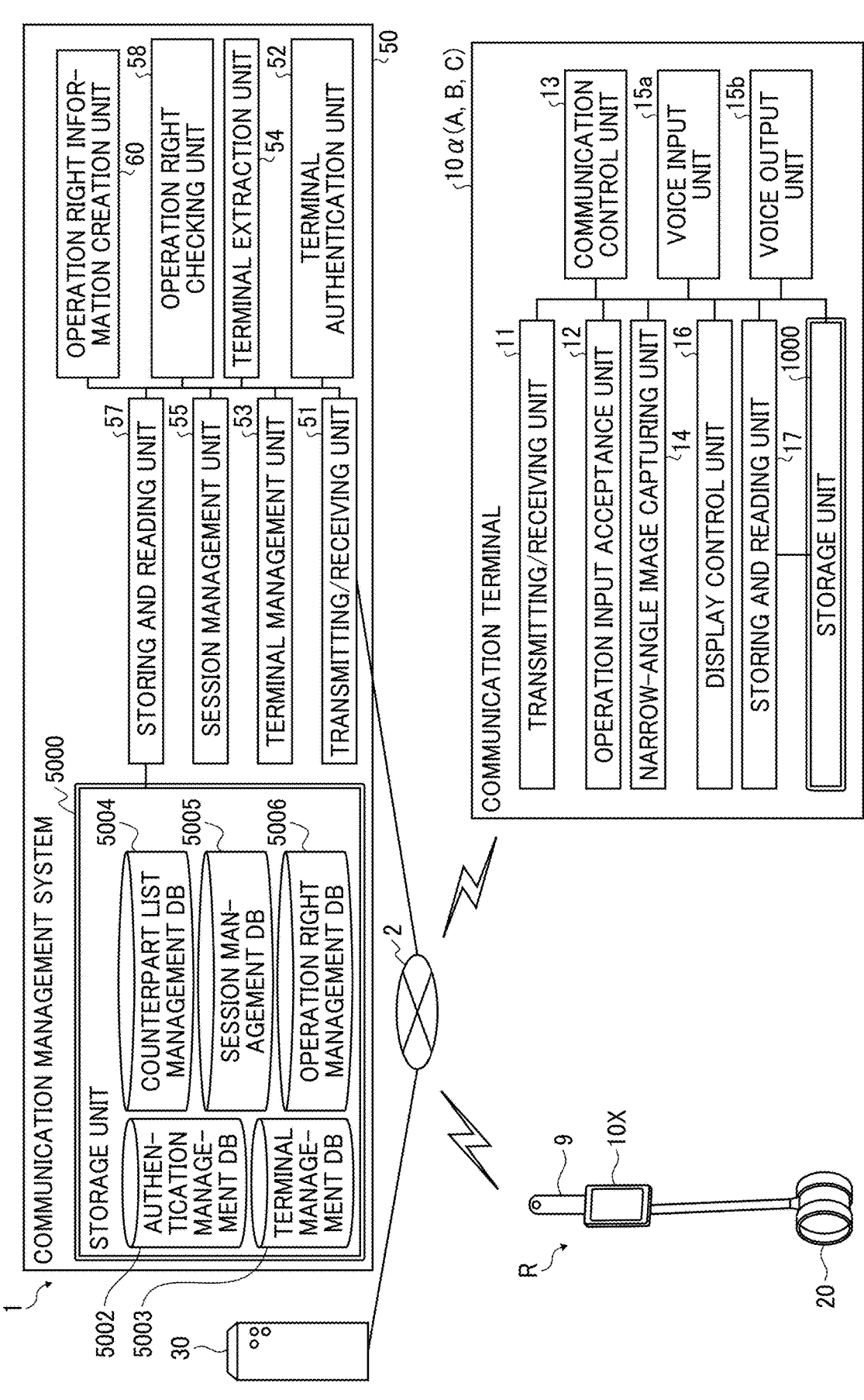
FIG. 14 is a functional block diagram of devices and a system of the communication system according to an embodiment of the present disclosure.
Figure 15:
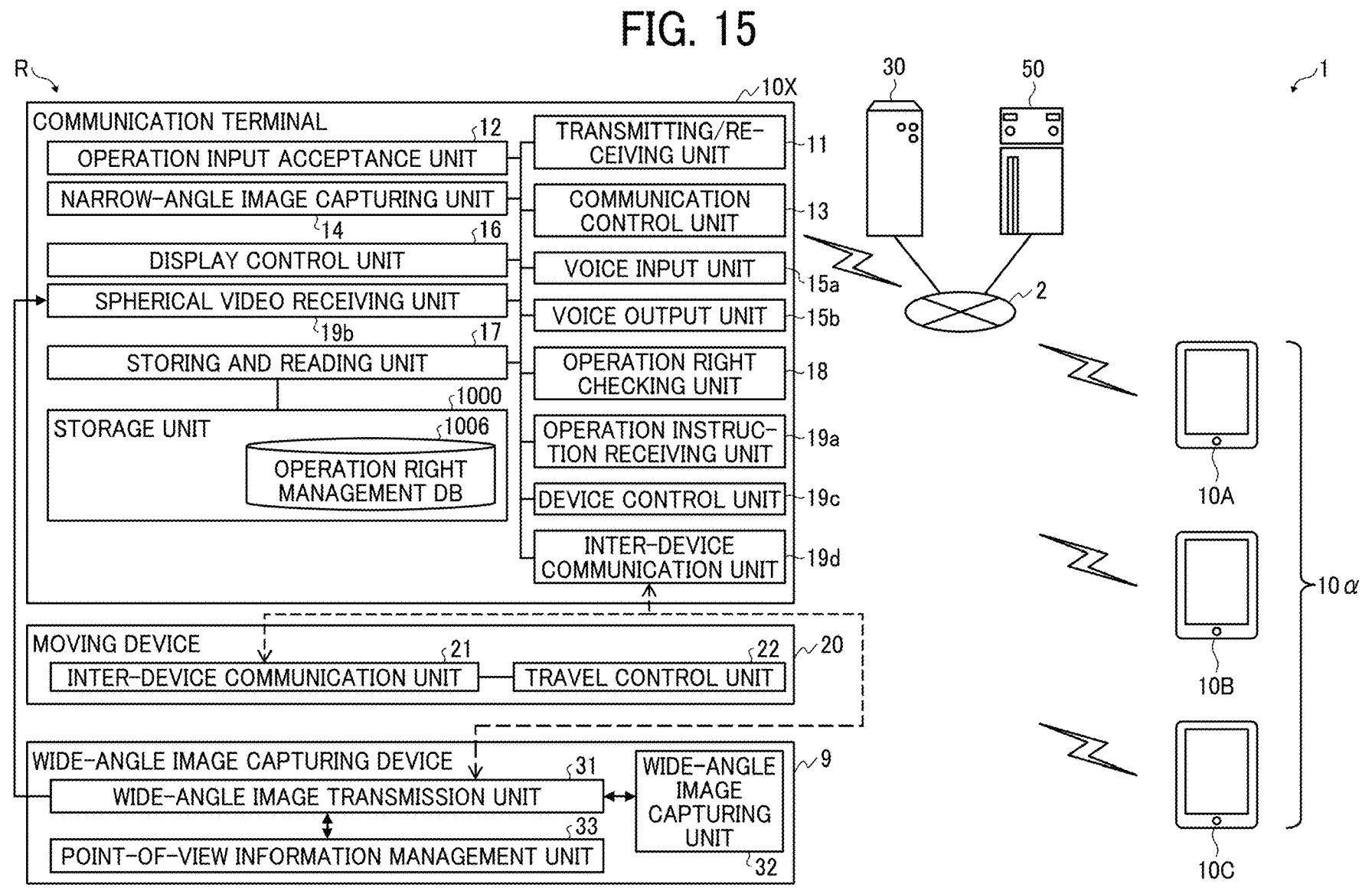

Next, the functions of the communication system 1 will be described with reference to FIGS. 14 and 15. FIGS. 14 and 15 are functional block diagrams of devices and a system of the communication system 1.

Functional Configuration of Communication Terminal 10α (A, B, C)

The communication terminal 10α is, for example, a communication terminal 10 that accepts an operation instruction for controlling a device such as the moving device 20 but does not have a function of controlling the device such as the moving device 20. The communication terminal 10α includes a transmitting/receiving unit 11, an operation input acceptance unit 12, a communication control unit 13, a narrow-angle image capturing unit 14, a voice input unit 15a, a voice output unit 15b, a display control unit 16, and a storing and reading unit 17. Each of these units is a function or means that is implemented by any one of the hardware elements illustrated in FIG. 4 operating in accordance with instructions from the CPU 101 according to a program for the communication terminal 10α loaded onto the RAM 103 from the flash memory 104. The communication terminal 10α further includes a storage unit 1000. The storage unit 1000 is implemented by the RAM 103 illustrated in FIG. 4 and the flash memory 104 illustrated in FIG. 4. The communication terminal 10M basically has functions similar to those of the communication terminal 10α, and the same functions are denoted by the same reference numerals and will not be described.

Functional Configuration of Communication Terminal 10X

The communication terminal 10X is a communication terminal mounted on the moving device 20. The communication terminal 10X is an example of a communication terminal having a function of controlling a device such as the moving device 20. The communication terminal 10X includes the functional configuration of the communication terminal 10A described above, and also includes an operation right checking unit 18, an operation instruction receiving unit 19a, a spherical video receiving unit 19b, a device control unit 19c, and an inter-device communication unit 19d.

Functional Configuration of Communication Terminal 10

Next, the functional configuration of the communication terminal 10 (the communication terminal 10α and the communication terminal 10X) will be described in detail. The transmitting/receiving unit 11 transmits and receives various data (or information) to and from another communication terminal, device, or system via the communication network 2. Before starting a voice conversation with a desired counterpart terminal, the transmitting/receiving unit 11 starts receiving, from the communication management system 50, state information indicating the states of communication terminals serving as candidate conversation counterparts. The state information indicates the operating state of each communication terminal 10 (whether the communication terminal 10 is online or offline). If the communication terminal 10 is online, the state information further indicates a detailed state such as information indicating whether the communication terminal 10 is allowed to make a voice conversation, and information indicating whether the communication terminal 10 is making a voice conversation.

The operation input acceptance unit 12 accepts various inputs to the communication terminal 10 by the operator. For example, in response to the operator performing an operation of turning on the power of the communication terminal 10, the operation input acceptance unit 12 accepts the operation and performs control to turn on the power.

For example, in response to receipt of the operation of turning on the power, the communication control unit 13 automatically transmits, from the transmitting/receiving unit 11, login request information indicating a request for login, and the current Internet protocol (IP) address of the request sender terminal to the communication management system 50 via the communication network 2. In response to the operator instructing to turn off the power of the communication terminal 10, the transmitting/receiving unit 11 transmits, to the communication management system 50, state information indicating turning off of the power of the communication terminal 10. After that, the operation input acceptance unit 12 turns off the power of the communication terminal 10. This enables the communication management system 50 to grasp that the power of the communication terminal 10 has been switched from on to off. Further, the communication control unit 13 performs various communication controls via the relay device 30. The communication controls include establishment of a session for transmitting and receiving content data to and from another communication terminal 10, and disconnection of a session for transmitting and receiving content data to and from another communication terminal 10. The communication control unit 13 according to this embodiment transmits control information of a session (e.g., start request information and start response information described below) to the communication management system 50. The control information to be transmitted to the communication management system 50 includes a communication identification (ID) of the communication terminal 10.

The communication ID is an example of identification information of an account with which the operator can participate in a session for transmitting and receiving content data using the communication terminal 10. The communication ID may be, for example, a user ID, which is identification information of the operator, an application ID, which is identification information of an application, or a contract ID, which is identification information of a contractor of the communication terminal 10. Examples of the communication ID include information obtained by combining at least two of a character, a number, a sign, and various types of symbols. In an example, the communication ID is an email address.

The narrow-angle image capturing unit 14 has a function similar to that of a camera mounted on a typical digital camera, smartphone, tablet terminal, notebook PC, or the like, and has a viewing angle up to 180 degrees. The narrow-angle image capturing unit 14 is different in viewing angle from the wide-angle image capturing device 9 having a viewing angle of 360 degrees. The narrow-angle image capturing unit 14 converts imaging data obtained by capturing an image of an object or the like into predetermined image (video) data and outputs the image (video) data. The narrow-angle image capturing unit 14 is disposed on each of the front and back sides of the communication terminal 10 such that the narrow-angle image capturing unit 14 on the front side of the communication terminal 10 captures a front video and the narrow-angle image capturing unit 14 on the back side of the communication terminal 10 captures a back video. The communication terminal 10 may include more image capturing units.

The voice input unit 15*a* converts the voice of the operator into an audio signal using the microphone 114, converts the audio signal into predetermined audio data, and outputs the audio data. The voice output unit 15*b* converts the audio data into an audio signal, outputs the audio signal to the speaker 115, and outputs a voice from the speaker 115.

For example, the display control unit 16 causes the display unit 109, the display input unit 110, or the like to display image data included in content data received by the communication terminal 10. Further, the display control unit 16 can transmit information on a counterpart list received from the communication management system 50 to the display unit 109 and cause the display unit 10) to display the counterpart list.

The storing and reading unit 17 performs a process for storing various data in the storage unit 1000 and reading various data stored in the storage unit 1000.

The storage unit 1000 stores, for example, the communication ID described above and authentication information such as a password corresponding to the communication ID. The storage unit 1000 stores image data and audio data, which are received during a voice conversation with the counterpart terminal, in such a manner that the image data and the audio data are overwritten each time image data and audio data are received. An image is displayed on the display unit 109 or the like in accordance with the image data before being overwritten, and a voice is output from the speaker 115 in accordance with the audio data before being overwritten.

Next, the functional components of the communication terminal 10X will be described.

The spherical video receiving unit 19*b* receives an equirectangular projection video from the wide-angle image capturing device 9 via wireless communication such as Bluetooth® or wired communication such as a USB cable. The equirectangular projection video is a moving image repeatedly transmitted with a frequency such that the equirectangular projection video can be regarded as a moving image. In an example, the equirectangular projection video may be a still image. In another example, the equirectangular projection video may be switched between a moving image and a still image.

The operation instruction receiving unit 19*a* receives operation information from the communication terminal 10A via the transmitting/receiving unit 11. The operation information is information for requesting the communication terminal 10X to control the device (the moving device 20). The operation information includes, for example, a communication ID of the communication terminal 10 from which the operation information is transmitted, an operation instruction indicating the content of the control to be requested, and the like.

The device control unit 19*c* controls the moving device 20 in accordance with the content of an operation included in the operation information received by the operation instruction receiving unit 19*a*. The operation information is information indicating an instruction for remotely operating each function of the robot R from the communication terminal 10α. Examples of the content of an operation included in the operation information include an operation of driving the moving device 20 of the robot R to rotationally move the robot R to the right, and an operation of causing the wide-angle image capturing device 9 to capture an image.

The inter-device communication unit 19*d* communicates with the moving device 20 and the wide-angle image capturing device 9 using the short-range wireless communication unit 118.

When the communication terminal 10X receives the operation information transmitted from the communication terminal 10α, the operation right checking unit 18 checks whether the communication terminal 10α (or user) from which the operation information is transmitted has the operation right for an operation target indicated by the operation information.

The storage unit 1000 stores an operation right management database (DB) 1006. The operation right information managed by the operation right management DB 1006 has the same content as the information managed in an operation right management DB 5006 of the communication management system 50. Each time the communication management system 50 updates the operation right information, the operation right information is transmitted to the communication terminal 10X. The operation right information will be described in detail below. In an example, the communication terminal 10X does not include the operation right checking unit 18. In this case, the communication terminal 10X does not include the operation right management DB 1006.

Functional Configuration of Moving Device

The moving device 20 includes, for example, an inter-device communication unit 21 and a travel control unit 22. The inter-device communication unit 21 is implemented by, for example, the external device I/F 404 or the short-range wireless communication unit 405, which operate in accordance with instructions from the CPU 401 illustrated in FIG. 6. In an example, the inter-device communication unit 21 communicates with the communication terminal 10X using the short-range wireless communication unit 405.

The travel control unit 22 controls, for example, the wheel driving unit 406 and the steering unit 407 illustrated in FIG. 6 in accordance with the content of control acquired from the communication terminal 10A to control the moving device 20 to move (travel). For example, the travel control unit 22 controls the moving device 20 to move forward, move backward, turn to the left, or turn to the right.

Functional Configuration of Wide-Angle Image Capturing Device

The wide-angle image capturing device 9 includes, for example, a wide-angle image transmission unit 31, a wide-angle image capturing unit 32, and a point-of-view information management unit 33. The wide-angle image capturing unit 32 captures a wide-angle equirectangular projection video of 360 degrees around the wide-angle image capturing device 9 at a predetermined frame rate. The wide-angle image capturing unit 32 may capture a still image. The wide-angle image transmission unit 31 is implemented by the communication unit 317 illustrated in FIG. 7. The wide-angle image transmission unit 31 transmits an equirectangular projection video, which is a moving image or a still image, to the communication terminal 10X.

The point-of-view information management unit 33 manages point-of-view information related to the point of view of the virtual camera IC illustrated in FIG. 12A or 12C. The point-of-view information is information for identifying the predetermined area T. The point-of-view information is transmitted to the communication terminal 10X together with the equirectangular projection video. The communication terminal 10X transmits the equirectangular projection video and the point-of-view information to each communication terminal 10α. Accordingly, each communication terminal 10α can display a normal image illustrated in FIG. 12B or 12D, instead of a distorted image illustrated in FIG. 9C, in accordance with an instruction (point-of-view information) from the communication terminal 10X.

Functional Configuration of Communication Management System

The communication management system 50 includes a transmitting/receiving unit 51, a terminal authentication unit 52, a terminal management unit 53, a terminal extraction unit 54, a session management unit 55, a storing and reading unit 57, an operation right checking unit 58, and an operation right information creation unit 60. Each of these units is a function or means that is implemented by any one of the hardware elements illustrated in FIG. 5 operating in accordance with instructions from the CPU 501 according to a program for the communication management system 50 loaded onto the RAM 503 from the HD 504. The communication management system 50 also includes a storage unit 5000. The storage unit 5000 is implemented by the HD 504 and the like illustrated in FIG. 5. First, management DBs stored in the storage unit 5000 of the communication management system 50 will be described.

Authentication Management DB

TABLE 1

| Authentication Management Table 602 | |
| --- | --- |
| Communication ID | Password |
| 01aa | aaaa |
| 01ab | abab |
| 01ba | baba |

The storage unit 5000 of the communication management system 50 stores an authentication management DB 5002. The authentication management DB 5002 includes an authentication management table 602 illustrated in Table 1. The authentication management table 602 manages a communication ID of the communication terminal 10, which is managed by the communication management system 50, and a password corresponding to the communication ID in association with each other. For example, the authentication management table 602 illustrated in Table 1 indicates that the password of the communication terminal 10 having the communication ID "01aa" is "aaaa".

Terminal Management DB

TABLE 2

| Terminal Management Table 603 | | | | |
| --- | --- | --- | --- | --- |
| Communi-cation ID | Counterpart Name | Operating State | Reception Date and Time | IP Add-ress of Terminal |
| 01aa | AA Terminal at Head Office in Japan | Online (Communicable) | 20xx.4.10 13:40 | 1.2.1.3 |
| 01b1 | AB Terminal at First Laboratory in U.S. | Online (Communicable) | 20xx.4.10 13:40 | 1.2.1.4 |
| 01b2 | AC Terminal at NY Flagship Store in U.S. | Online (Communicable) | 20xx.4.10 9:50 | 1.2.1.5 |
| 01b3 | AD Terminal at First Factory in China | Online (Communication in progress) | 20xx.4.10 11:42 | 1.2.1.5 |
| . . . | . . . | . . . | . . . | . . . |

The storage unit 5000 of the communication management system 50 further stores a terminal management DB 5003. The terminal management DB 5003 includes a terminal management table 603 illustrated in Table 2. The terminal management table 603 manages, for the communication ID of each communication terminal 10, a counterpart name indicating the name of a counterpart, which is each communication terminal 10, the operating state of the communication terminal 10, a reception date and time when login request information described below was received by the communication management system 50, and the IP address of the communication terminal 10 in association with each other. For example, the terminal management table 603 illustrated in Table 2 indicates that the communication terminal 10 having the communication ID "01aa" has the terminal name "Head Office in Japan" and the operating state "Online (communicable)". The terminal management table 603 also indicates that the communication terminal 10 having the communication ID "01aa" has the date and time of reception of login request information by the communication management system 50 "13:40 on April 10, 20xx" and the IP address "1.2.1.3".

Counterpart List Management DB

TABLE 3

| Counterpart List Management Table 701 | |
| --- | --- |
| Communication ID of Request Sender Terminal | Communication ID of Candidate Counterpart Terminal |
| 01aa | 01b1, 01b2, 01b3 |
| 01b1 | 01aa |
| 01b2 | 01aa |
| 01b3 | 01aa |
| . . . | . . . |
| 01db | 01ab, 01ba, . . . 01da, 01ca, 01cb, . . . , 01da |

The storage unit 5000 of the communication management system 50 further stores a counterpart list management DB

5004. The counterpart list management DB 5004 includes a counterpart list management table 701 as illustrated in Table 3. The counterpart list management table 701 manages the communication ID of a request sender terminal from which a request for starting communication in a teleconference is transmitted, in association with the communication IDs of counterpart terminals registered as candidate counterpart terminals. The communication ID of a request sender terminal may also be referred to as the "request-sender-terminal communication ID". The communication ID of a counterpart terminal may also be referred to as the "counterpart-terminal communication ID". For example, in the counterpart list management table 701 illustrated in Table 3, the candidate counterpart terminals that the request sender terminal having the communication ID "01aa" can request to start communication are the communication terminals having the communication IDs "01b1", "01b2", and "01b3". The candidate counterpart terminals are updated upon addition or deletion by the communication management system 50 in response to a request for addition or deletion being given from any request sender terminal to the communication management system 50.

This configuration allows the request sender terminal (e.g., the terminal with the communication ID "01aa") to start communication with only a candidate counterpart terminal (e.g., the communication terminal with the communication ID "01b1") registered in advance. The counterpart terminal (for example, the communication terminal with the communication ID "01b1") is also not allowed to communicate with the request sender terminal (for example, the terminal with the communication ID "01aa") unless the request sender terminal is registered in the counterpart list management table 701 as a counterpart terminal. The mechanism described above is preferable in that unintended communication terminals 10 are less likely to communicate with each other. In an example, any communication terminals 10 communicate with each other without being registered in the counterpart list management table 701.
Session Management DB

TABLE 4

| | | Session management table 702 | | |
|---|---|---|---|---|
| Session ID | Relay Device ID | Communication ID of Request Sender Terminal | Communication ID of Counterpart Terminal | Session Participation Date and Time |
| Se1 | 111a | 01aa | 01b1 | 20xx/04/10 13:45:30 |
| | | | 01b2 | 20xx/04/10 13:50:30 |
| Se2 | 111b | 01ad | 01ca | 20xx/04/10 13:11:11 |
| . . . | . . . | . . . | . . . | . . . |

The storage unit 5000 of the communication management system 50 further stores a session management DB 5005. The session management DB 5005 includes a session management table 702 illustrated in Table 4. The session management table 702 manages, for each session ID, which is identification information of a session, information such as a relay device ID of a relay device 30 used for relaying, a communication ID of a request sender terminal, a communication ID of a counterpart terminal, and a session participation date and time. For example, the session management table 702 illustrated in Table 4 indicates that the session having the session ID "se2" is performed between the request sender terminal with the communication ID "01ad" and the counterpart terminal with the communication ID "01ca". The session management table 702 also indicates that the session having the session ID "se2" was started at 13:11:11 on April 10, 20xx ("20xx/4/10 13:11:11") via the relay device 30 having the relay device ID "111b".

Operation Right Management Table

TABLE 5A

| | | Operation Right Management Table 703 | | |
|---|---|---|---|
| Operation-Right Application Target (User's Operation Target) ID | Operation-Right Application Target (User's Operation Target) | Communication ID of Operation-Right-Set Terminal (Operation-Right-Set User) | Elapsed Time of Application of Operation Right |
| r1 | Moving device | 01aa | 10:00 |
| r2 | Narrow-angle image capturing unit | 01ca | 10:00 |
| r3 | Wide-angle image capturing device | 01aa | 10:00 |
| r4 | Microphone (Voice input unit) | 01ca | 10:00 |
| | Temperature sensor | 01da | 10:00 |
| r6 | Robot conditions | 02aa | 1:00:00 |
| r7 | Basic settings | 02aa | 1:00:00 |

The storage unit 5000 of the communication management system 50 further stores the operation right management DB 5006. The operation right management DB 5006 includes an operation right management table 703 illustrated in table 5A. The operation right management table 703 manages, for each operation-right application target (user's operation target) ID, the name of the operation-right application target (i.e., the operation target), a communication ID of an operation-right-set terminal (or operation-right-set user), and information indicating the elapsed time of application of the operation right, in association with each other. The operation-right application target is the target to which the operation right is to be applied. The operation-right-set terminal is the terminal to which the operation right is set. The operation-right-set user is the user to whom the operation right is set.

The operation-right application target is also an object to be operated by the user and indicates each function of the robot R or each device of the robot R. In other words, the term "application target" may be used in terms of a right or privilege called an operation right, and the term "operation target" may be used in terms of an operation performed by the user.

The operation-right application target ID is an example of application-target identification information for identifying an operation-right application target. A user's operation target ID is an example of operation-target identification information for identifying an operation target to be remotely operated by the user.

The communication ID of an operation-right-set terminal (operation-right-set user) is identification information for identifying a specific communication terminal 10 or a specific user to which the operation right is set. The elapsed time of application of the operation right indicates the amount of time that elapses from the time point at which the operation right was set.

In the operation right management table 703 described above, no operation right may be set for a specific device or the like. For example, an operation right management table in which no operation right is set for the narrow-angle image capturing unit and the temperature sensor is illustrated in Table 5B.

TABLE 5B

| Operation Right Management Table 703 | | | |
| --- | --- | --- | --- |
| Operation-Right Application Target (User's Operation Target) ID | Operation-Right Application Target (User's Operation Target) | Communication ID of Operation-Right-Set Terminal (Operation-Right-Set User) | Elapsed Time of Application of Operation Right |
| r1 | Moving device | 01aa | |
| r2 | Narrow-angle image capturing unit | | 10:00 |
| r3 | Wide-angle image capturing device | 01aa | 10:00 |
| r4 | Microphone (Voice input unit) | 01ca | 10:00 |
| r5 | Temperature sensor | | |
| r6 | Robot conditions | 02aa | 1:00:00 |
| r7 | Basic settings | 02aa | 1:00:00 |

Functional Configuration of Communication Management System

Next, the functional configuration of the communication management system 50 will be described in detail. The transmitting/receiving unit 51 transmits and receives various data (or information) to and from another communication terminal, device, or system via the communication network 2.

The terminal authentication unit 52 determines whether the authentication management DB 5002 includes a combination of a communication ID and a password included in the login request information received via the transmitting/receiving unit 51 to authenticate the communication terminal 10.

The terminal management unit 53 stores and manages, for each communication ID, a counterpart name, an operating state, a reception date and time of request information and the like, and an IP address of a request sender terminal in the terminal management DB 5003 in association with each other. For example, in response to the user switching the power of the communication terminal 10 from on to off, the terminal management unit 53 changes the operating state of the terminal management DB 5003 from online to offline, based on state information transmitted from the communication terminal 10 and indicating turning off of the power.

The terminal extraction unit 54 searches the counterpart list management DB 5004 by using, as a search key, the communication ID of the request sender terminal from which the login request is transmitted, and extracts the communication ID of a counterpart terminal allowed to communicate with the request sender terminal. The terminal extraction unit 54 further searches the counterpart list management DB 5004 and also extracts the communication ID of another communication terminal for which the communication ID of the request sender terminal is registered as a candidate counterpart terminal.

Further, the terminal extraction unit 54 searches the terminal management DB 5003 described above by using the extracted communication ID of the candidate counterpart terminal as a search key, and reads the operating state for each extracted communication ID. As a result, the terminal management unit 53 can acquire the operating states of candidate counterpart terminals allowed to communicate with the request sender terminal from which the login request is transmitted. The terminal management unit 53 further searches the terminal management DB 5003 described above by using the communication ID of the request sender as a search key, and also acquires the operating state of the request sender terminal from which the login request is transmitted.

The session management unit 55 controls a session managed by the communication management system 50. The control of a session includes, for example, control for establishing a session, control for causing the communication terminal 10 to participate in the established session, control for disconnecting the session, and generation of a session ID. Further, the session management unit 55 stores and manages the communication ID of the communication terminal 10 from which a request for starting the session is transmitted, the communication ID of the counterpart terminal 10, and the like in the session management DB 5005 in association with the session ID serving as identification information of the session.

The storing and reading unit 57 is implemented by the HDD controller 505 operating in accordance with the instructions from the CPU 501 illustrated in FIG. 5 and is implemented in accordance with the instructions from the CPU 501. The storing and reading unit 57 stores various data in the storage unit 5000 and reads various data from the storage unit 5000.

When the communication terminal 10X receives the operation information transmitted from the communication terminal 10α, the operation right checking unit 58 checks whether the communication terminal 10α (or user) from which the operation information is transmitted has the operation right for an operation target indicated by the operation information.

Figure 18:
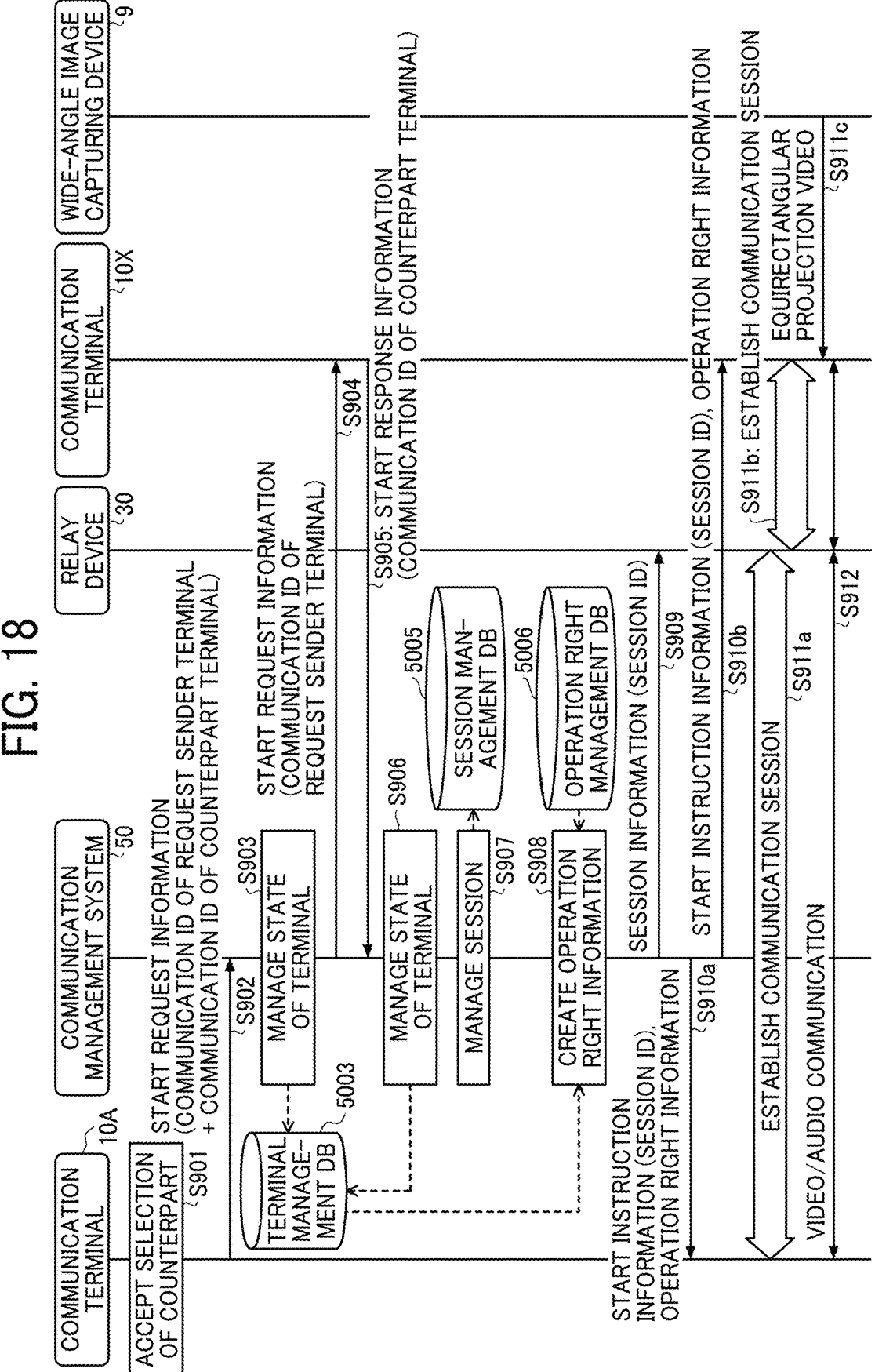
FIG. 18 is a sequence diagram illustrating an example communication process of the communication system according to an embodiment of the present disclosure.

The operation right information creation unit 60 creates operation right information, based on the counterpart name managed in the terminal management DB 5003 and the information managed in the operation right management DB 5006, namely, the operation-right application target (operation target) ID, the operation-right application target (operation target), and the elapsed time of application of the operation right (see step S908 in FIG. 18).

Process Flow of Communication System

Next, the process flow of the communication system 1 will be described.

Process in Preparation Stage

Figure 16:
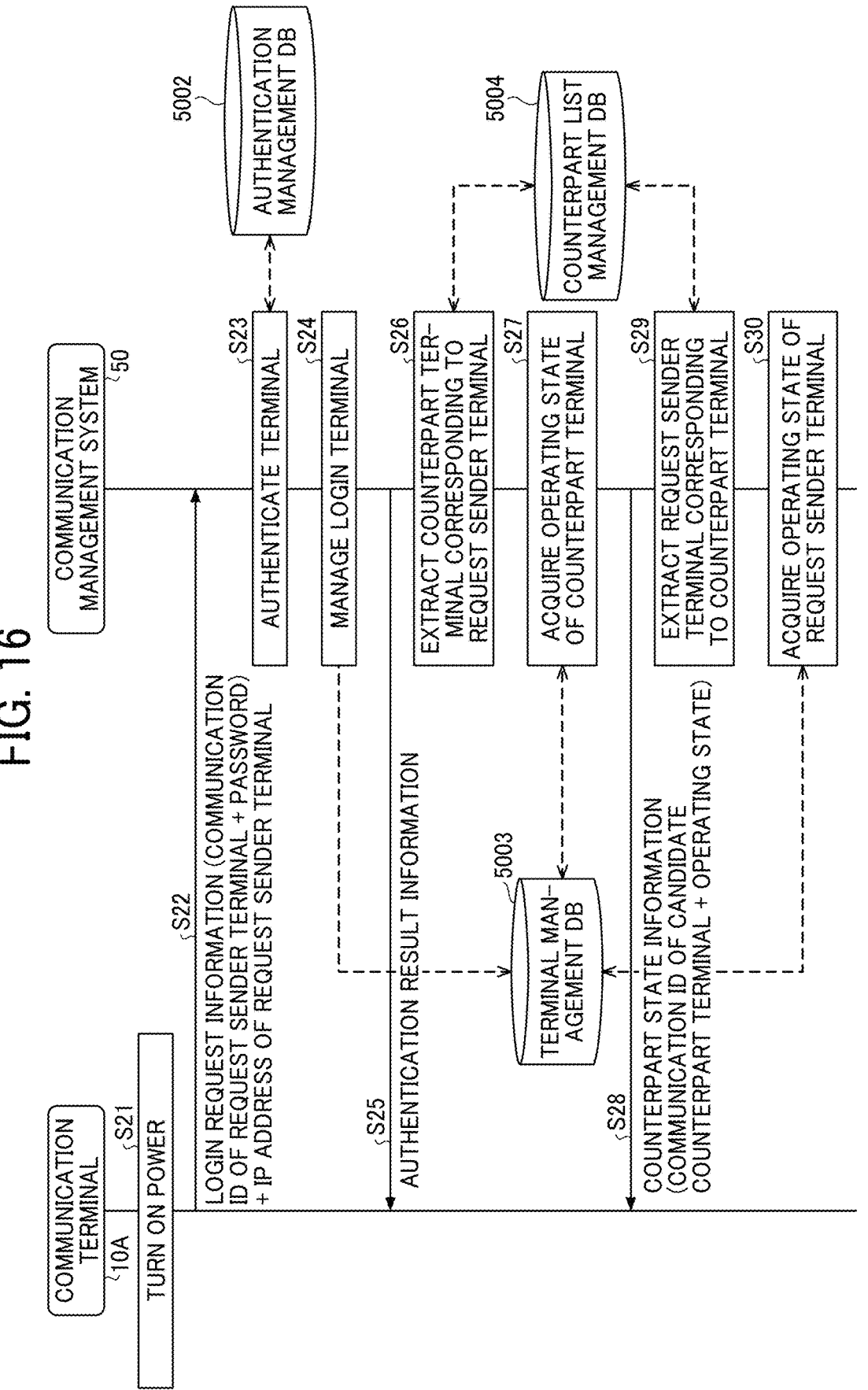
FIG. 16 is a sequence diagram illustrating an example process in a preparation stage of communication in the communication system according to an embodiment of the present disclosure.

FIG. 16 is a sequence diagram illustrating an example process in a preparation stage of communication in the communication system 1. In one example, a process in a preparation stage before the communication terminals 10A and 10X start a session will be described. In the following description, in an example, the communication terminal 10A has the communication ID "01aa", and the communication terminal 10X has the communication ID "01b".

First, for example, the user a, who is the operator of the communication terminal 10A serving as a request sender terminal, performs an operation of turning on the power of the communication terminal 10A. In response to the operation performed by the user a, the operation input acceptance unit 12 accepts the operation of turning on the power and turns on the power of the communication terminal 10A (step S21).

Then, in response to the power being turned on, the communication control unit 13 transmits login request information from the transmitting/receiving unit 11 to the communication management system 50 via the communication network 2 to request a login (step S22). The login request information is transmitted in response to an operation of turning on the power of the communication terminal 10A, by way of example. In another example, the login request information may be transmitted in response to the user operating the input unit 108 or in response to activation of an application.

The login request information includes a communication ID (communication ID of the request sender terminal) for identifying the communication terminal 10A from which the login request information is transmitted, and a password. The communication ID and the password are, for example, information read from the storage unit 1000 via the storing and reading unit 17. When the login request information is transmitted from the communication terminal 10A to the communication management system 50, the communication management system 50, which is a receiver, can grasp the IP address of the communication terminal 10A, which is a transmitter.

Then, the terminal authentication unit 52 of the communication management system 50 searches the authentication management table 602 described above by using, as a search key, the communication ID and the password included in the login request information received via the transmitting/receiving unit 51. The terminal authentication unit 52 performs authentication in accordance with whether the combination of the communication ID and the password included in the login request information received from the communication terminal 10A matches a combination of a communication ID and a password included in the authentication management table 602 (step S23).

If the terminal authentication unit 52 determines that the login request is transmitted from the communication terminal 10A granted use privileges, the terminal management unit 53 changes the operating state corresponding to the communication ID "01aa" of the communication terminal 10A, which is recorded in the terminal management table 603, to "online (communicable)". At this time, the terminal management unit 53 updates the reception date and time and updates the IP address of the communication terminal 10 as necessary (step S24). As a result, in the terminal management table 603, the operating state "online (communicable)", the reception date and time "20xx.4.10.13:40", and the IP address "1.2.1.3" of the communication terminal 10A are managed in association with the communication ID "01aa" of the communication terminal 10A.

Then, the transmitting/receiving unit 51 of the communication management system 50 transmits authentication result information indicating an authentication result obtained by the terminal authentication unit 52 described above to the communication terminal 10A from which the login request is transmitted, via the communication network 2 (step S25). In the following description, it is assumed that the terminal authentication unit 52 determines that the communication terminal 10A is a communication terminal granted use privileges.

The terminal extraction unit 54 of the communication management system 50 searches the counterpart list management table 701 by using, as a search key, the communication ID "01aa" of the request sender terminal (i.e., the communication terminal 10A) from which the login request is transmitted. As a result, the terminal management unit 53 extracts the communication ID of a candidate counterpart terminal allowed to communicate with the request sender terminal (i.e., the communication terminal 10A) (step S26). In one example, the communication IDs "01b1", "01b2", and "01b3" are extracted as the communication IDs of counterpart terminals associated with the communication ID "01aa" of the request sender terminal (i.e., the communication terminal 10A).

Then, the terminal extraction unit 54 searches the terminal management table 603 by using the extracted communication IDs ("01b1", "01b2", and "01b3") of the candidate counterpart terminals as search keys. Accordingly, an operating state is read for each of the extracted communication IDs ("01b1", "01b2", and "01b3") to acquire the operating states of the candidate destination terminals with the communication IDs ("01b1". "01b2", and "01b3") (step S27).

Then, the transmitting/receiving unit 51 transmits counterpart state information to the request sender terminal (i.e., the communication terminal 10A) (step S28). The counterpart state information includes the operating states corresponding to the communication IDs ("01b1", "01b2", and "01b3") of the candidate counterpart terminals. As a result, the request sender terminal (i.e., the communication terminal 10A) can grasp the current operating states of the candidate counterpart terminals with the communication IDs ("01b1", "01b2", and "01b3"), which may communicate with the request sender terminal (i.e., the communication terminal 10A). The communication terminal 10A displays a counterpart selection screen illustrated in FIG. 17.

Further, the terminal extraction unit 54 of the communication management system 50 searches the counterpart list management table 701 by using, as a search key, the communication ID "01aa" of the request sender terminal (i.e., the communication terminal 10A) from which the login request is transmitted. As a result, the terminal extraction unit 54 extracts the communication ID of another request sender terminal for which the communication ID "01aa" of the request sender terminal (i.e., the communication terminal 10A) is registered as a candidate counterpart terminal (step S29). In the counterpart list management table 701 illustrated in Table 3, the communication IDs of the other request sender terminals to be extracted are "01b1", "01b2", and "01b3".

Then, the terminal management unit 53 of the communication management system 50 searches the terminal management table 603 by using, as a search key, the communication ID "01aa" of the request sender terminal (i.e., the communication terminal 10A) from which the login request is transmitted. As a result, the terminal management unit 53 acquires the operating state of the request sender terminal (i.e., the communication terminal 10A) from which the login request is transmitted (step S30).

Then, the terminal management unit 53 of the communication management system 50 extracts the communication IDs ("01b1", "01b2", and "01b3") for which the operating states are set to "Online (communicable)" in the terminal management table 603 from among the communication IDs ("01b1", "01b2", and "01b3") extracted in step S29 described above.

Further, the transmitting/receiving unit 51 transmits counterpart state information to the communication terminal 10X corresponding to the extracted communication IDs ("01b1", "01b2", and "01b3"). The counterpart state information includes the communication ID "01aa" of the request sender terminal (i.e., the communication terminal 10A), and the operating state "Online (communicable)".

The other communication terminal, namely, the communication terminal 10X, also performs processing similar to the processing of steps S22 to S31 described above in accordance with, for example, an operation such as turning on the power. The power of the communication terminal 10X is turned on by, for example, the administrator of the moving device 20.

Counterpart Selection Screen

Figure 17:
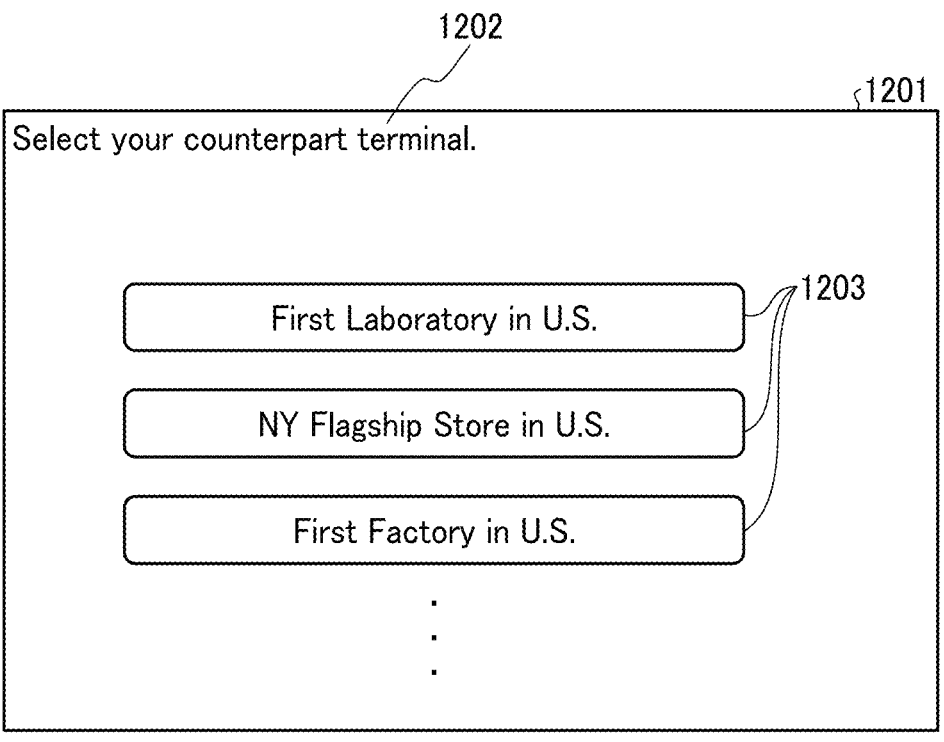
FIG. 17 is a view illustrating an example of a counterpart selection screen displayed on the communication terminal according to an embodiment of the present disclosure.

FIG. 17 is a view illustrating an example of a counterpart selection screen displayed on the communication terminal 10A. A counterpart selection screen 1201 illustrated in FIG. 17 displays a message 1202 that prompts the operator to select a counterpart communication terminal 10, and a plurality of buttons 1203 for selecting the counterpart communication terminal 10. For example, the operator of the communication terminal 10A selects one of the plurality of displayed buttons 1203 to select a counterpart terminal to be requested to participate in the session. In other words, the operator of the communication terminal 10A selects which moving device 20 to control. As illustrated in FIG. 17, a plurality of communication terminals 10X are selectable to the operator, and the operator can grasp situations of different sites from the same location.

Communication Process

FIG. 18 is a sequence diagram illustrating an example communication process of the communication system 1. An example of a communication management method for starting communication between the communication terminal 10A and the communication terminal 10X, which is a device control terminal capable of controlling the moving device 20, will be described.

The operation input acceptance unit 12 of the communication terminal 10A accepts an operation of selecting the counterpart terminal (communication terminal 10X) by the user of the communication terminal 10A (step S901).

The transmitting/receiving unit 11 of the communication terminal 10A transmits, to the communication management system 50, start request information for requesting the start of a session (step S902). In an example, the start request information includes the request-sender-terminal communication ID, which is the communication ID of the communication terminal 10A serving as the request sender terminal, and the counterpart-terminal communication ID, which is the communication ID of the communication terminal 10X, which is the counterpart terminal. The start request information also includes information such as the IP address of the communication terminal 10A (the request sender IP address).

Upon receipt of the start request information from the communication terminal 10A, the terminal management unit 53 of the communication management system 50 updates the terminal management DB 5003, based on the communication ID "01 aa" of the request sender terminal (i.e., the communication terminal 10A) included in the start request information (step S903). For example, the terminal management unit 53 changes the information on the operating state corresponding to the communication ID "01aa" of the communication terminal 10A to "Online (communication in progress)" and also updates the information on the reception date and time.

The session management unit 55 of the communication management system 50 transmits, to the communication terminal 10X, which is the counterpart terminal, start request information for requesting the start of a session (step S904). In an example, the start request information includes the request-sender-terminal communication ID of the communication terminal 10A, which is the request sender terminal.

Upon receipt of the start request information from the communication management system 50, the communication terminal 10X transmits start response information to the communication management system 50 (step S905). In an example, the start response information includes the counterpart-terminal communication ID of the communication terminal 10X. In this embodiment, in an example, the start response information is transmitted without an operation on the communication terminal 10X. In another example, the start response information may be transmitted on the condition that the administrator operates the communication terminal 10X.

Upon receipt of the start response information from the communication terminal 10X, the terminal management unit 53 of the communication management system 50 updates the terminal management DB 5003, based on the communication ID "01b1" of the communication terminal 10X included in the start response information (step S906). For example, the terminal management unit 53 changes the information on the operating state corresponding to the communication ID "01b1" of the communication terminal 10X to "Online (communication in progress)" and updates the information on the reception date and time.

The session management unit 55 of the communication management system 50 assigns a number to a session ID, which is identification information for identifying the session (step S907). Further, the session management unit 55 stores the created session ID in the session management DB 5005 in association with the request-sender-terminal communication ID (i.e., the communication ID of the communication terminal 10A) and the counterpart-terminal communication ID (i.e., the communication ID of the communication terminal 10X) (step S907).

The storing and reading unit 57 searches the operation right management DB 5006 by using the communication IDs stored in the session management DB 5005 in step S907 as search keys and reads the items of operation right management information (records) including the communication IDs (step S908). Further, the storing and reading unit 57 searches the terminal management DB 5003 by using the communication IDs stored in the session management DB 5005 in step S907 as search keys and reads the corresponding counterpart name (step S908). Then, the operation right information creation unit 60 creates operation right information, based on the operation right management information and the counterpart name (step S908).

The session management unit 55 of the communication management system 50 transmits session information to the relay device 30 (step S909). In an example, the session information includes information such as the session ID created in step S907. The relay device 30 can acquire session information from the session management DB 5005, based on the session ID.

The session management unit 55 of the communication management system 50 transmits, to the communication terminal 10A, start instruction information indicating an instruction to start a session and the operation right information created in step S908 (step S910a). The session management unit 55 of the communication management system 50 also transmits, to the communication terminal 10X, start instruction information indicating an instruction to start a session and the operation right information created in step S908 (step S910b). The start instruction information includes a session ID, and the communication terminal 10 can acquire session information from the session management DB 5005, based on the session ID. As a result, in the communication terminal 10A, the display control unit 16 causes the display unit 109 to display an operation right information screen 900 illustrated in FIG. 19A.

The operation right information screen 900 displays the current setting states of operation rights. The operation right information screen 900 displays, for each operation-right application target (user's operation target) ID, an operation-right-set terminal (operation-right-set user) and the elapsed time of application of the operation right. The operation right information screen 900 also serves as a screen for starting video distribution. The operation right information screen 900 displays a "start" button 910 for starting video distribution, and a "stop" button 920 for stopping the start of video distribution. FIG. 19B illustrates an operation right information screen 900 based on the operation right management table in Table 5B. Specifically, the operation right information screen 900 illustrated in FIG. 19B does not include the operation right for the narrow-angle image capturing unit or the operation right for the temperature sensor. In an example, the user a presses the "start" button 910.

In response to the operation input acceptance unit 12 accepting pressing of the "start" button 910, the transmitting/receiving unit 11 of the communication terminal 10A establishes a video and audio session with the relay device 30 (step S911a). In an example, the transmitting/receiving unit 11 of the communication terminal 10A may establish a session with the relay device 30 in response to receipt of the start instruction information, rather than in response to pressing of the "start" button 910. In this case, the operation right information illustrated in FIG. 19A or 19B is displayed immediately after the video distribution is started or in response to a predetermined operation during the video distribution. Likewise, the transmitting/receiving unit 11 of the communication terminal 10X establishes a session with the relay device 30 in accordance with the received start instruction information (step S911b). As a result, the communication terminals 10A and 10X participate in remote communication (video distribution) in the same session. The communication terminals 10B and 10C can also participate in remote communication (video distribution) in the same session through a process similar to that for the communication terminal 10A.

The wide-angle image transmission unit 31 of the wide-angle image capturing device 9 transmits an equirectangular projection video to the communication terminal 10X (step S911c). In an example, when the communication terminal 10X establishes a session, the communication terminal 10X instructs the wide-angle image capturing device 9 to start capturing and transmitting an equirectangular projection video. In another example, the wide-angle image capturing device 9 may constantly transmit an equirectangular projection video to the communication terminal 10X while the power of the wide-angle image capturing device 9 is on. In another example, an equirectangular projection video may be transmitted before the establishment of a session.

The communication terminals 10A and 10X participate in a session having the same session ID and transmit and receive content data such as image data and audio data to and from each other to have, for example, a teleconference (step S912).

Process for Remote Operation

Figure 20:
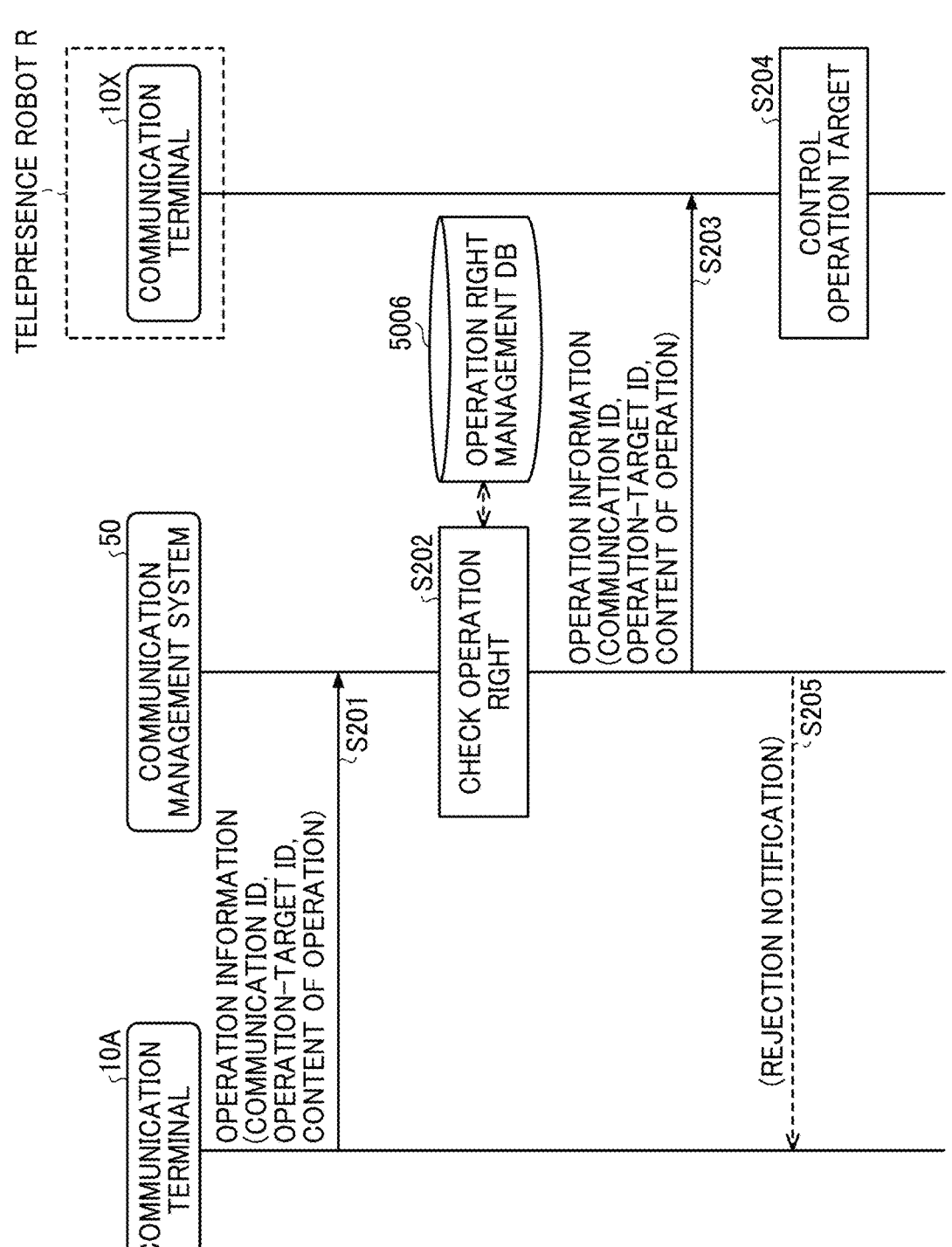
FIG. 20 is a sequence diagram illustrating a process for remotely operating a telepresence robot according to an embodiment of the present disclosure.
Figure 21:
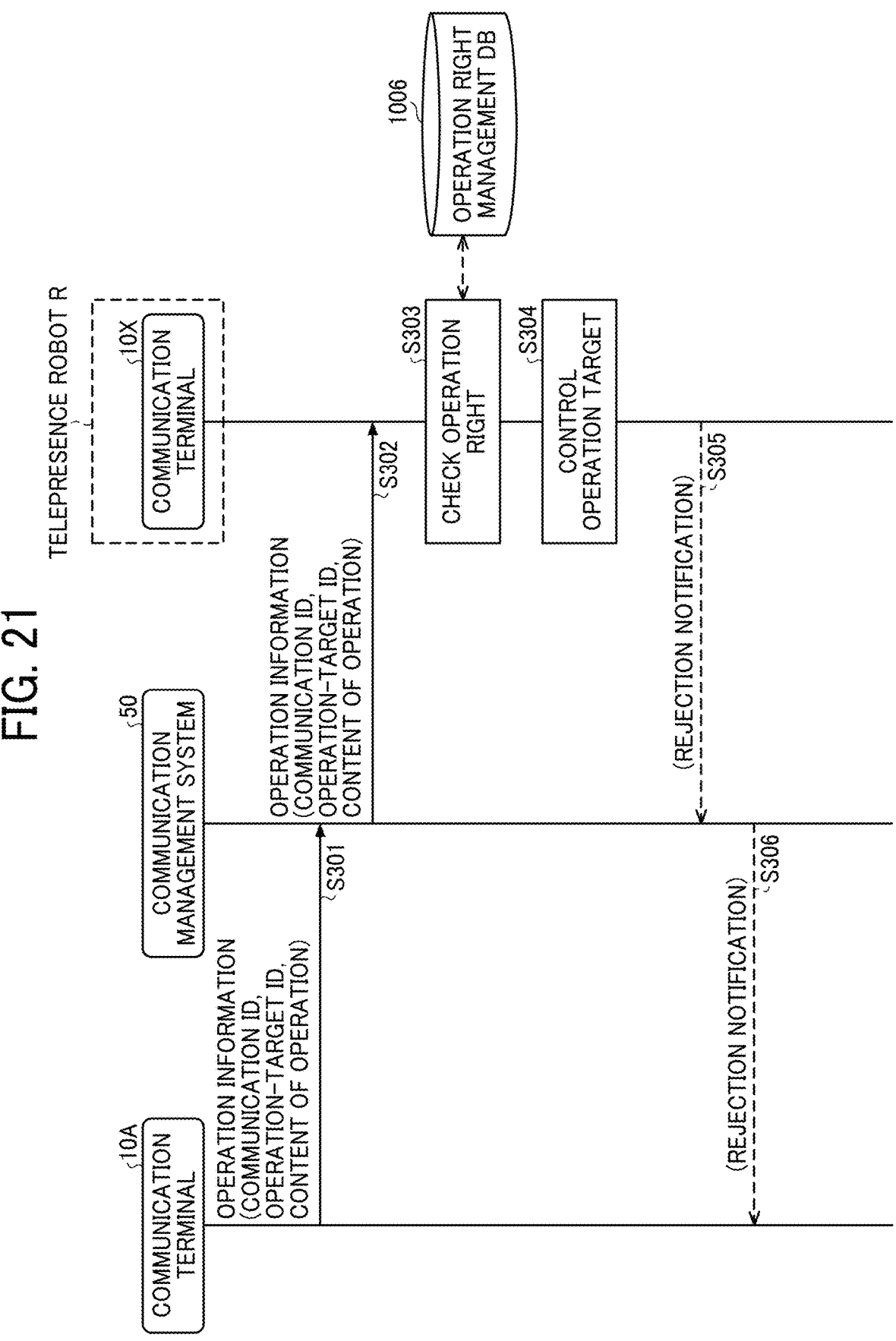
FIG. 21 is a sequence diagram illustrating a process for remotely operating a telepresence robot according to an embodiment of the present disclosure.

Next, a process in which the user a remotely operates the robot R by using the communication terminal 10A during video distribution will be described with reference to FIGS. 20 and 21. While video and audio are transmitted and received via the relay device 30, remote operation is performed by a control session via the communication management system 50. The user a has an operation right for exclusively performing a remote operation on a predetermined operation target (in an example, the wide-angle image capturing device 9 and the moving device 20) of the robot R. While the communication terminal 10A, instead of the user a, may have an operation right, the following description will be given assuming that the user a has an operation right.

Remote Operation (1)

First, a process (1) for remotely operating a telepresence robot will be described with reference to FIG. 20. FIG. 20 is a sequence diagram illustrating a process (1) for remotely operating a telepresence robot.

In the communication terminal OA, in response to the operation input acceptance unit 12 accepting a remote operation by the user a, the transmitting/receiving unit 11 transmits operation information to the communication management system 50 (step S201). The operation information includes the communication ID of the user a, an operation-target ID for identifying a target to be remotely operated, and the content of the operation. The content of the operation includes driving the moving device 20 to cause the robot R to move straight, and causing the wide-angle image capturing device 9 to start capturing an image, for example. Then, the transmitting/receiving unit 51 of the communication management system 50 receives the operation information.

In the communication management system 50, the operation right checking unit 58 checks whether the user a indicated by the communication ID received in step S201 has the operation right for the operation target indicated by the operation-target ID received in step S201 (step S202). More specifically, the operation right checking unit 58 checks whether the pair of IDs including the communication ID and the operation-target ID received in step S201 matches a pair of IDs managed in the operation right management DB 5006.

If the user a has the operation right, the transmitting/receiving unit 51 transfers the operation information to the communication terminal 10X of the robot R (step S203). Then, the transmitting/receiving unit 11 of the communication terminal 10X receives the operation information. The inter-device communication unit 19d transmits a control instruction to the operation target (i.e., the wide-angle image capturing device 9 and the moving device 20) in accordance with the content of the operation (step S204).

On the other hand, if the user a does not have the operation right, the transmitting/receiving unit 51 transmits a notification indicating rejection of the remote operation to the communication terminal 10A from which the operation information is transmitted (step S205). The transmitting/receiving unit 11 of the communication terminal 10A receives the notification indicating the rejection. The display control unit 16 of the communication terminal 10A causes the display unit 109 to display a notification that the remote operation is rejected. In an example, the processing of step S205 is not performed, and the communication management system 50 leaves the remote operation rejected.

Then, the process (1) for remote operation using the operation right ends.

Remote Operation (2)

Subsequently, a process (2) for remotely operating a telepresence robot will be described with reference to FIG. 21. FIG. 21 is a sequence diagram illustrating a process (2) for remotely operating a telepresence robot.

In the communication terminal 10A, in response to the operation input acceptance unit 12 accepting a remote operation by the user a, the transmitting/receiving unit 11 transmits operation information to the communication management system 50 (step S301). The operation information includes the communication ID of the user a, an operation-target ID for identifying a target to be remotely operated, and the content of the operation. The content of the operation includes driving the moving device 20 to cause the robot R to move straight, and causing the wide-angle image capturing device 9 to start capturing an image, for example.

Then, the transmitting/receiving unit 51 of the communication management system 50 receives the operation information.

The transmitting/receiving unit 51 of the communication management system 50 transfers the operation information to the communication terminal 10X of the robot R (step S302). Then, the transmitting/receiving unit 11 of the communication terminal 10X receives the operation information.

In the communication terminal 10X, the operation right checking unit 18 checks whether the user a indicated by the communication ID received in step S302 has the operation right for the operation target indicated by the operation-target ID received in step S302 (step S303). More specifically, the operation right checking unit 18 checks whether the pair of IDs including the communication ID and the operation-target ID received in step S302 matches a pair of IDs managed in the operation right management DB 1006.

If the user a does not have the operation right, the transmitting/receiving unit 11 of the communication terminal 10X transmits a notification indicating rejection of the remote operation to the communication management system 50 (step S305). Then, the transmitting/receiving unit 51 of the communication management system 50 receives the notification indicating the rejection. Further, the transmitting/receiving unit 51 transfers the notification indicating the rejection to the communication terminal 10A (step S306). In the communication terminal 10A, the display control unit 16 causes the display unit 109 to display a notification that the remote operation is rejected. In an example, the processing of steps S305 and S306 is not performed, and the communication terminal 10X leaves the remote operation rejected.

On the other hand, if the user a does not have the operation right in step S303, the processing of steps S305 and S306 is not performed. The inter-device communication unit 19d of the communication terminal 10X transmits a control instruction to the operation target (i.e., the wide-angle image capturing device 9 and the moving device 20) in accordance with the content of the operation (step S304).

Then, the process (2) for remote operation using the operation right ends.

As described below, operation rights may be transferred or set. A process for transferring an operation right and a process for setting an operation right according to a modification will be described.

Operation Right Transfer Process

Figure 26:
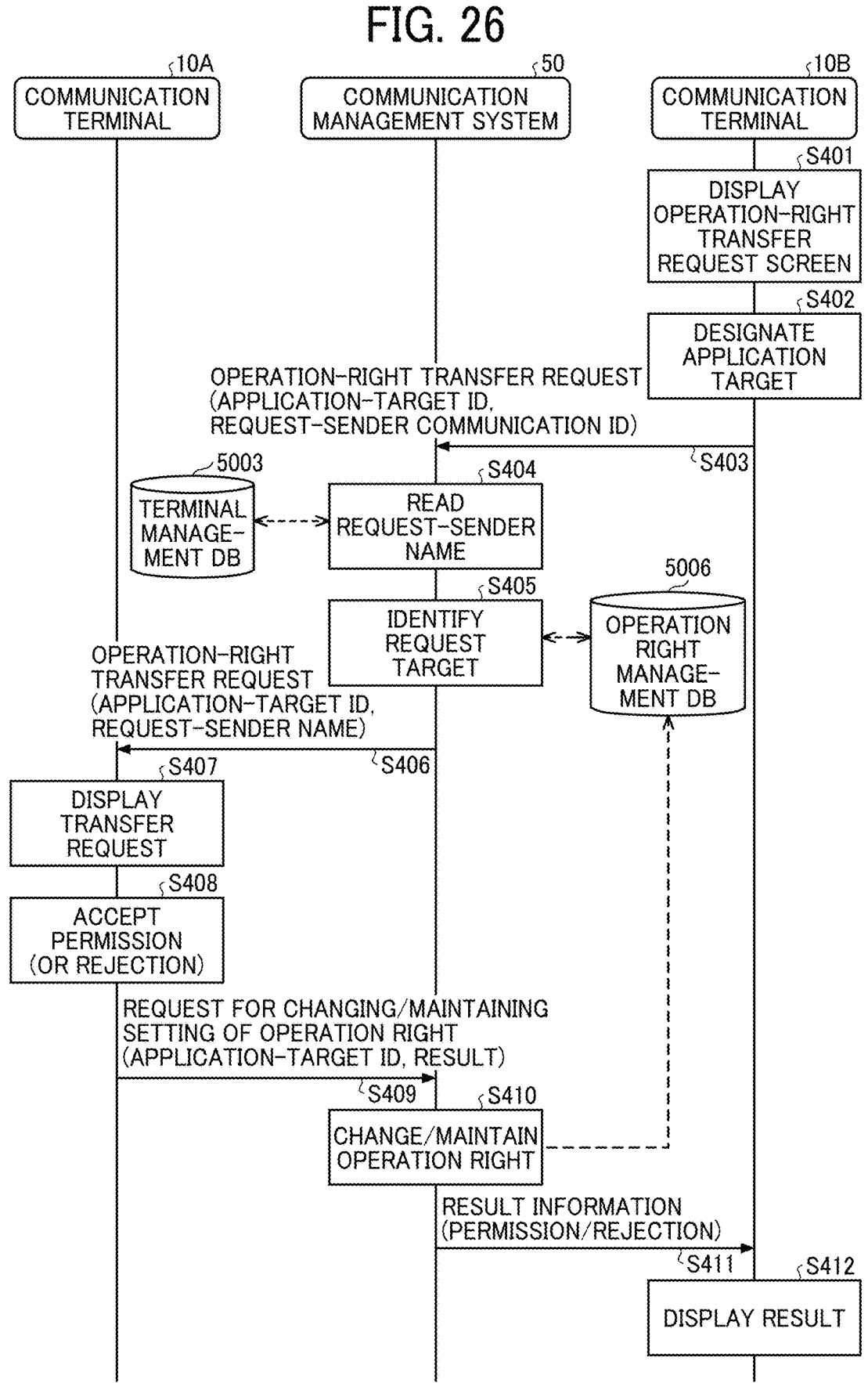
FIG. 26 is a sequence diagram illustrating a process for transferring an operation right according to an embodiment of the present disclosure.

Next, a process for transferring an operation right during video distribution will be described with reference to FIGS. 26 to 30. FIG. 26 is a sequence diagram illustrating a process for transferring an operation right. The process for transferring an operation right may be performed when video distribution is not in progress.

While video and audio are transmitted and received via the relay device 30, the process for transferring an operation right is performed by a control session via the communication management system 50. The user a has an operation right for exclusively performing a remote operation on a predetermined operation target (in an example, the wide-angle image capturing device 9 and the moving device 20) of the robot R. While the communication terminal 10A, instead of the user a, may have an operation right, the following description will be given assuming that the user a has an operation right. A case where the user b requests the user a to transfer the operation right set to the user a will be described.

Figure 30:
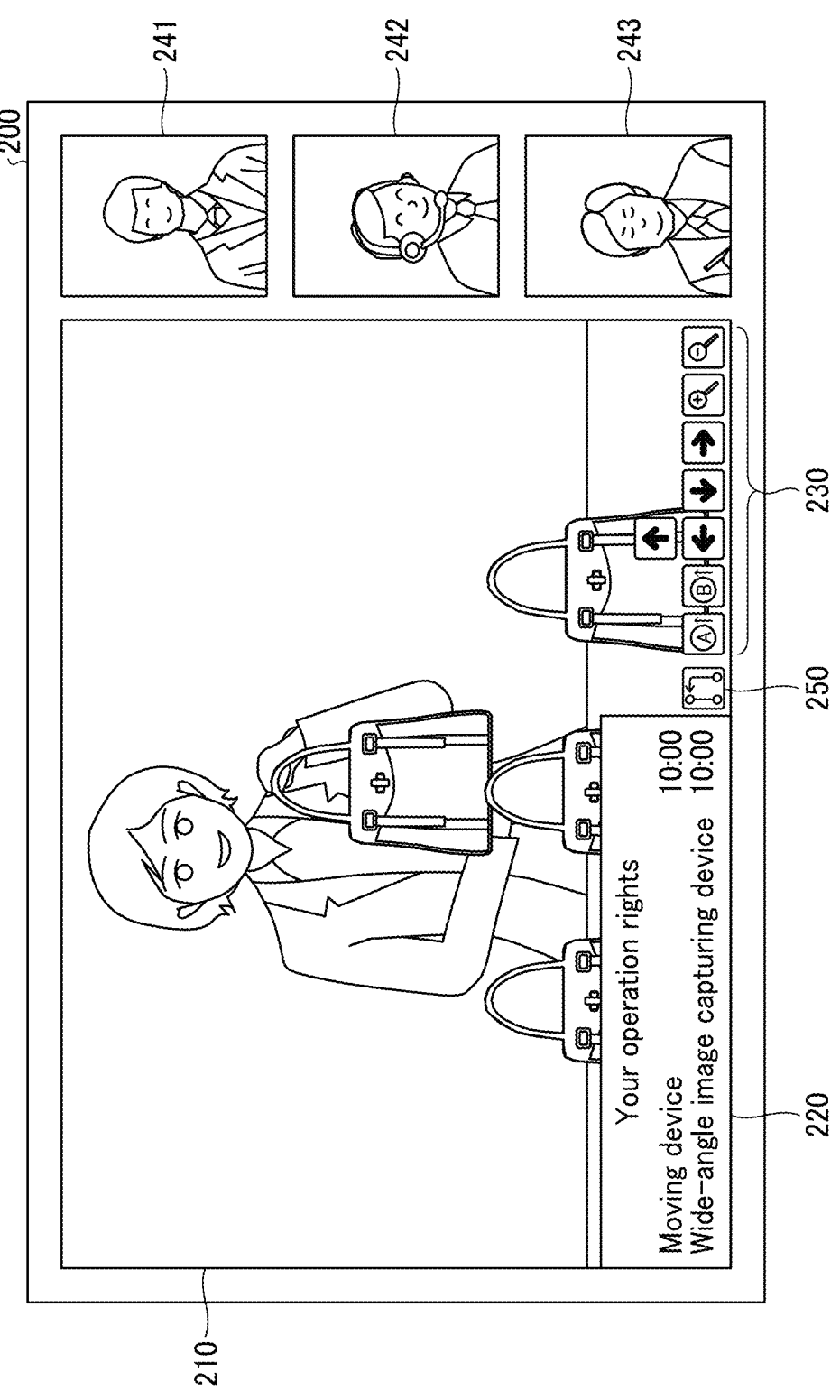
FIG. 30 is a view illustrating an example screen displayed on a communication terminal during the remote shopping according to an embodiment of the present disclosure.

First, the user b presses a "transfer request" button 250 illustrated in FIG. 30 during video distribution. The operation input acceptance unit 12 accepts pressing of the "transfer request" button 250, and the display control unit 16 causes the display unit 109 of the communication terminal 10B to display a screen 400 for an "operation-right transfer request" illustrated in FIG. 27 (step S401). The screen 400 displays the operation right information illustrated in FIG. 19A. The screen 400 also displays a designation field for designating an application target for which the operation right is requested to be transferred. The designation field is provided for each operation-right application target. The screen 400 also displays a "request" button 410 for making a transfer request, and a "stop" button 420 for stopping the transfer request.

In response to the user b designating (or selecting) a desired operation-right application target, the operation input acceptance unit 12 accepts the designation (step S402). In FIG. 27, operation-right application targets for which the operation rights are set to the user a (e.g., the moving device and the wide-angle image capturing device) are designated.

In response to the user b pressing the "request" button 410, the operation input acceptance unit 12 accepts pressing of the "request" button 410. The transmitting/receiving unit 11 of the communication terminal 10B transmits an operation-right transfer request to the communication management system 50 (step S403). The operation-right transfer request includes an application-target ID of the operation-right application target designated by the user b, and the communication ID of the user b from which the operation-right transfer request is sent. Then, the transmitting/receiving unit 51 of the communication management system 50 receives the operation-right transfer request.

In the communication management system 50, the storing and reading unit 57 searches the terminal management DB 5003 by using the communication ID received in step S403 as a search key and reads the corresponding counterpart name (step S404). In other words, the storing and reading unit 57 reads the name of the user b from which the operation-right transfer request is sent. Further, the storing and reading unit 57 searches the operation right management DB 5006 by using the application-target ID received in step S403 as a search key and reads the communication ID of the corresponding operation-right-set user to identify the request target (step S405).

Then, the transmitting/receiving unit 51 transmits an operation-right transfer request to the communication terminal that is the identified request target (in the illustrated example, the communication terminal 10A) (step S406). The operation-right transfer request includes the application-target ID received in step S403 and the request sender name, which is the counterpart name read in step S404. Then, the transmitting/receiving unit 11 of the communication terminal 10A receives the operation-right transfer request.

In the communication terminal 10A, the display control unit 16 extracts the information (record) related to the application-target ID received in step S406 from within operation right information that has already been acquired in step S910a. Further, the display control unit 16 also creates a message using the request sender name received in step S406, and causes the display unit 109 to display a screen 450 for the "transferability of operation rights" illustrated in FIG. 28 (step S407).

FIG. 28 is a view illustrating a screen for the transferability of operation rights. The screen 450 displays a message including the request sender name, and information (records) including targets to which the operation-right transfer request is applied, which are extracted from the operation right information. The screen 450 also displays a designation field for designating the transferability of the operation right of each operation-right application target. The screen 450 also displays a "set" button 460 for setting whether the transfer request is accepted for an item for which designation is set in the designation field, and a "cancel all" button 470 for canceling all designations.

Then, the operation input acceptance unit 12 accepts, from the user a, permission or rejection of the operation-right transfer request for each operation-right application target, and accepts pressing of the "set" button 460 (step S408). In FIG. 28, the operation-right application target "moving device" is rejected, and the operation-right application target "wide-angle image capturing device" is permitted.

Then, the transmitting/receiving unit 11 of the communication terminal 10A transmits, to the communication management system 50, a request for changing (or maintaining) the setting of the operation right (step S409). The request includes, for each application-target ID, a result indicating a change or maintenance of the setting of the operation right. Then, the transmitting/receiving unit 51 of the communication management system 50 receives a request for changing (or maintaining) the setting of the operation right.

The communication management system 50 changes (or maintains) the operation right (step S410). More specifically, to change the setting of the operation right, the storing and reading unit 57 changes, in the operation right management DB 5006, the value in the "communication ID of operation-right-set terminal (operation-right-set user)" field corresponding to the application-target ID indicated in the request from the communication ID of the request target to the communication ID of the request sender. At this time, the storing and reading unit 57 resets the value for the elapsed time of application of the operation right to change the value to "00:00". By contrast, to maintain the setting of the operation right, the storing and reading unit 57 does not change the operation right management DB 5006. Even a communication ID indicating the terminal ID of a communication terminal may be changed to a user ID instead of a terminal ID. Even a communication ID indicating a user ID may be changed to a terminal ID instead of a user ID.

Then, the transmitting/receiving unit 51 transmits result information to the communication terminal 10B as a response to the operation-right transfer request transmitted in step S403 (step S411). The result information includes a request result (permission or rejection) for each operation-right application target for which the operation-right transfer request has been made. Then, the transmitting/receiving unit 11 of the communication terminal 10B receives the result information.

Then, in the communication terminal 10B, the display control unit 16 causes the display unit 109 to display a screen 480 for "result of operation-right transfer request" illustrated in FIG. 29 (step S412). FIG. 29 is a view illustrating a screen for a result of the operation-right transfer request. The screen 480 displays a request result (permission or rejection) for each operation-right application target for which the operation-right transfer request has been made by the user b. In FIG. 29, the operation-right transfer request for the moving device is rejected, and the operation-right transfer request for the wide-angle image capturing device is permitted. The "operation-right-set terminal (operation-right-set user)" field indicates the latest user after the change of the setting.

In the "elapsed time of application of operation right" field, the value for the application target for which the operation-right transfer request is permitted is reset to "00: 00", and the value for the application target for which the operation-right transfer request is rejected remains unchanged because the setting is not changed.

The screen 480 also displays a "confirm" button 490 for the user b to close the screen 480 and return to the screen for video distribution (see FIG. 30) after confirming the result. When the user b presses the "confirm" button 490, the operation input acceptance unit 12 accepts pressing of the "confirm" button 490, and the display control unit 16 switches the screen to the screen for video distribution (see FIG. 30).

Then, the process for transferring an operation right ends.

Process for Setting Operation Right

Figure 31:
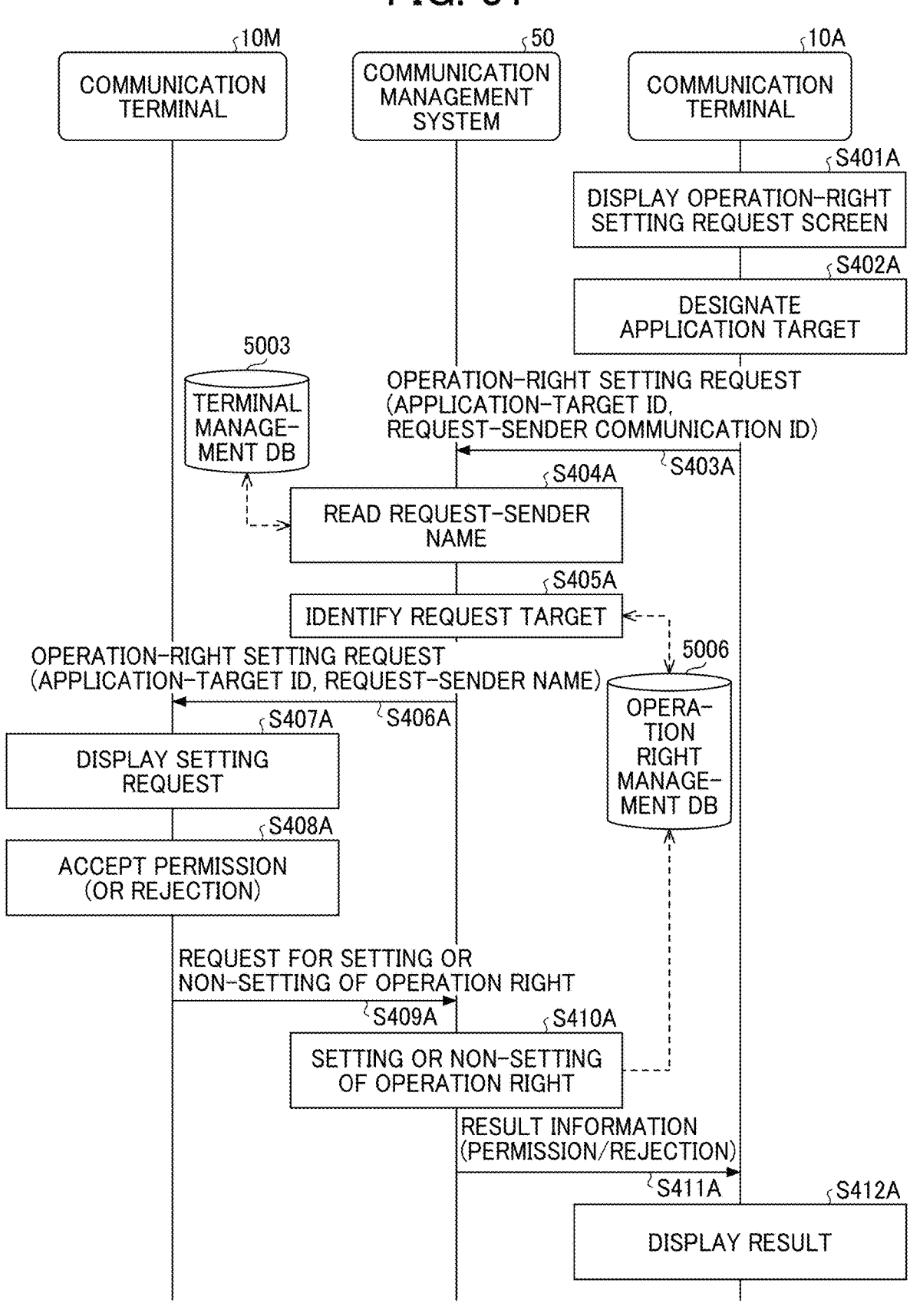
FIG. 31 is a sequence diagram illustrating a process for setting an operation right according to an embodiment of the present disclosure.

Next, a process for setting an operation right will be described with reference to FIGS. 31 to 35. The process for setting an operation right is performed during video distribution such as a teleconference. FIG. 31 is a sequence diagram illustrating a process for setting an operation right. The process for setting an operation right may be performed when video distribution is not in progress. In this modification, as illustrated in FIG. 1C, the explainer m is present.

While video and audio are transmitted and received via the relay device 30, the process for setting an operation right is performed by a control session via the communication management system 50. The user a has an operation right for exclusively performing a remote operation on a predetermined operation target (in an example, the wide-angle image capturing device 9 and the moving device 20) of the robot R. While the communication terminal 10A, instead of the user a, may have an operation right, the following description will be given assuming that the user a has an operation right. A case where the user a requests the explainer m to set the operation right will be described.

First, the user a presses a "setting request" button 250 illustrated in FIG. 35 described below during video distribution. The operation input acceptance unit 12 accepts pressing of the "setting request" button 250, and the display control unit 16 causes the display unit 109 of the communication terminal 10A to display a screen 400A for an "operation-right setting request" illustrated in FIG. 32 (step S401A). The screen 400A displays the operation right information illustrated in FIG. 19B. The screen 400A also displays a designation field for designating an application target for which the operation right is requested to be set. The designation field is provided for each operation-right application target. The screen 400A also displays a "request" button 410A for making a setting request, and a "stop" button 420A for stopping the setting request. In FIG. 32, neither the operation right for the narrow-angle image capturing unit nor the operation right for the temperature sensor is set. Thus, the user a can set the operation right for the narrow-angle image capturing unit and the operation right for the temperature sensor.

In response to the user a designating (or selecting) a desired operation-right application target, the operation input acceptance unit 12 accepts the designation (step S402A). In FIG. 32, the designation field is marked with a check for the operation-right application target for which the operation right has not been set (i.e., the narrow-angle image capturing unit and the moving device) to designate the operation-right application target.

In response to the user a pressing the "request" button 410A, the operation input acceptance unit 12 accepts pressing of the "request" button 410A. The transmitting/receiving unit 11 of the communication terminal 10A transmits an operation-right setting request to the communication management system 50 (step S403A). The operation-right setting request includes an application-target ID of the operation-right application target designated by the user a, and the communication ID of the user a from which the operation-right setting request is sent. Then, the transmitting/receiving unit 51 of the communication management system 50 receives the operation-right setting request. The display control unit 16 causes the display unit 109 to display an indication that the operation-right setting request is being made for a period of time from when the transmitting/receiving unit 11 transmits the operation-right setting request to when the transmitting/receiving unit 11 receives result information that is a response to the request in step S411A described below.

Then, in the communication management system 50, the storing and reading unit 57 searches the terminal management DB 5003 by using the communication ID received in step S403A as a search key and reads the corresponding counterpart name (step S404A). In other words, the storing and reading unit 57 reads the name of the user a from which the operation-right setting request is sent. Further, the storing and reading unit 57 searches the operation right management DB 5006 by using the application-target ID received in step S403A as a search key and reads the communication ID of the corresponding operation-right-set user to identify the request target (step S405A). If the reading of the communication ID of the operation-right-set user is not successful, it is determined in advance that the request target is the explainer m.

Then, the transmitting/receiving unit 51 transmits an operation-right setting request to the communication terminal that is the identified request target (in an example, the communication terminal 10M) (step S406A). The operation-right setting request includes the application-target ID received in step S403A and the request sender name, which is the counterpart name read in step S404A. Then, the transmitting/receiving unit 11 of the communication terminal 10M receives the operation-right setting request.

In the communication terminal 10M, the display control unit 16 extracts the information (record) related to the application-target ID received in step S406A from within the operation right information that has already been acquired in step S910*a*. Further, the display control unit 16 also creates a message using the request sender name received in step S406A, and causes the display unit 109 to display a screen 450A for the "permissibility to set operation rights" illustrated in FIG. 33 (step S407A).

FIG. 33 is a view illustrating a screen for the permissibility to set operation rights. The screen 450A displays a message including the request sender name, and information (records) including targets to which the operation-right setting request is applied, which are extracted from the operation right information. The screen 450A also displays a designation field for designating the permissibility to set an operation right for an operation-right application target for which the operation right has not been set. In the screen 450A, as in the screen 400A illustrated in FIG. 32, the designation field for an item for which the operation-right setting request has been issued is initially marked with a check mark. The display of the check mark enables the explainer m to grasp the application target for which the operation-right setting request has been issued.

The screen 450A also displays a "set" button 460A for setting whether the operation-right setting request is accepted for an item for which designation is set in the designation field, and a "cancel all" button 470A for canceling all designations.

Then, the operation input acceptance unit 12 accepts, from the explainer m, permission or rejection of the operation-right setting request for each operation-right application target, and accepts pressing of the "set" button 460A (step S408A). In FIG. 33, the operation-right application target "moving device" is unchecked by the explainer m to reject the setting of the operation right for the moving device, and the operation-right application target "wide-angle image capturing device" is left checked to permit the setting the operation right for the wide-angle image capturing device.

Then, the transmitting/receiving unit 11 of the communication terminal 10M transmits, to the communication management system 50, a request for setting or non-setting of the operation right (step S409A). The request includes, for each application-target ID, a result indicating setting or non-setting of the operation right. Then, the transmitting/receiving unit 51 of the communication management system 50 receives the request for setting or non-setting of the operation right.

The communication management system 50 sets (or leaves) the operation right (step S410A). More specifically, for setting of the operation right, the storing and reading unit 57 manages, in the operation right management DB 5006, the communication ID of the request target in the "communication ID of operation-right-set terminal (operation-right-set user)" field corresponding to the application-target ID indicated in the request. At this time, the storing and reading unit 57 starts counting the elapsed time of application of the operation right. By contrast, for non-setting of the operation right, the storing and reading unit 57 does not perform setting on the operation right management DB 5006 (leaves the operation right management DB 5006 unchanged).

Then, the transmitting/receiving unit 51 transmits result information to the communication terminal 10A as a response to the operation-right setting request transmitted in step S403 (step S411A). The result information includes a request result (permission or rejection) for each operation-right application target for which the operation-right setting request has been made. Then, the transmitting/receiving unit 11 of the communication terminal 10A receives the result information.

Then, in the communication terminal 10A, the display control unit 16 causes the display unit 109 to display a screen 480A for "results of operation-right setting request" illustrated in FIG. 34 (step S412A). FIG. 34 is a view illustrating a screen that displays a result of the operation-right setting request. The screen 480A displays a request result (permission or rejection) for each operation-right application target for which the operation-right setting request has been made by the user a. In FIG. 34, the operation-right setting request for the narrow-angle imaging device is permitted, and the operation-right setting request for the temperature sensor is rejected. The "operation-right-set terminal (operation-right-set user)" field indicates the latest user after the setting. In the "elapsed time of application of operation right" field, the value for the application target for which the operation-right setting request is permitted is set to "00:00" because counting is started, and no value is presented for the application target for which the operation-right setting request is rejected.

The screen 480A also displays a "confirm" button 490A for the user a to close the screen 480A and return to the screen for video distribution (see FIG. 35) after confirming the result. When the user a presses the "confirm" button 490A, the operation input acceptance unit 12 accepts pressing of the "confirm" button 490A, and the display control unit 16 switches the screen to the screen for video distribution (see FIG. 35).

Then, the process for setting an operation right ends.

Application Examples

Next, application examples of this embodiment will be described with reference to FIGS. 22 to 25.

Online Tour of Art Museum

Figure 22:
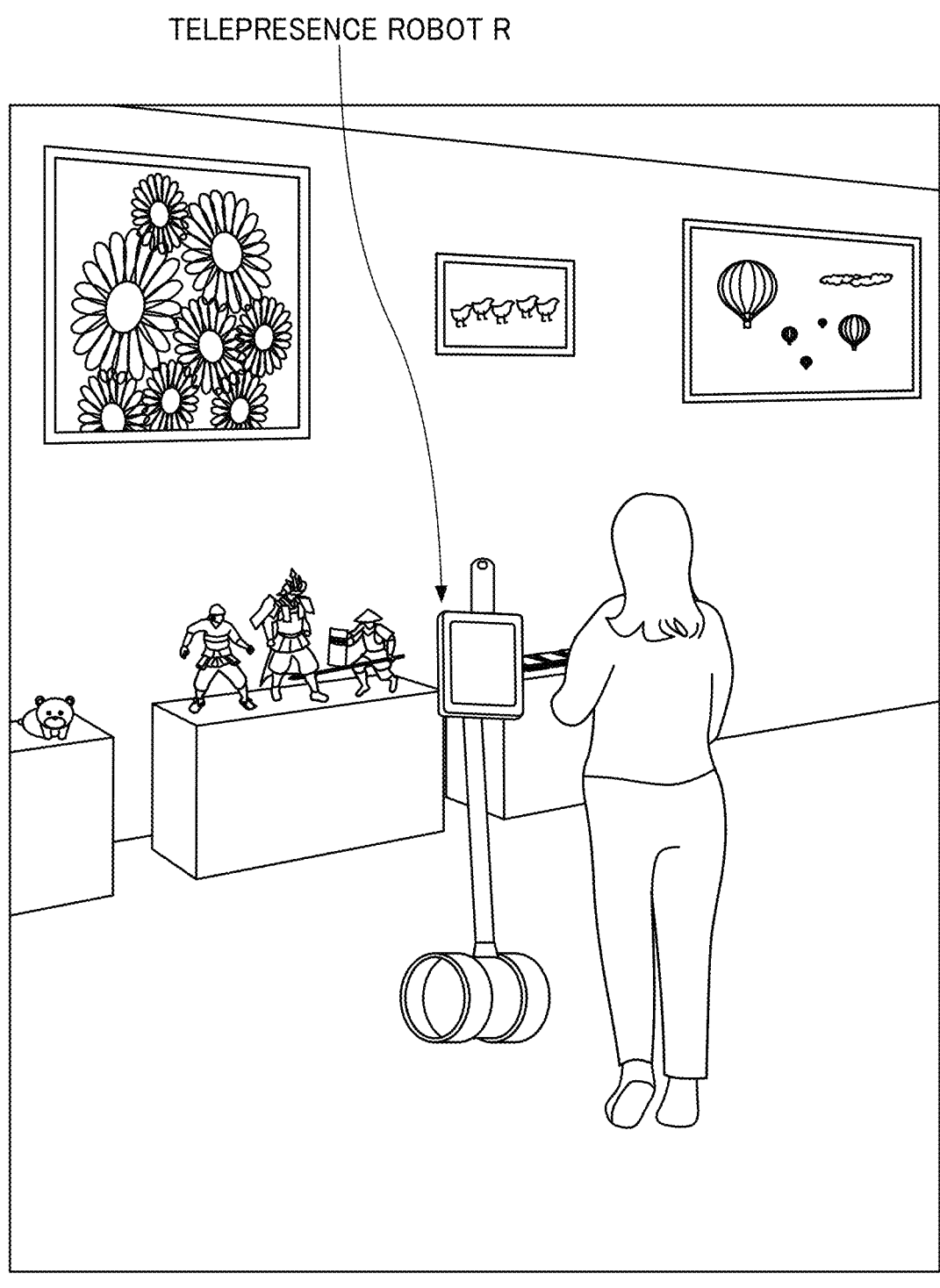
FIG. 22 is an illustration of an application of a technique according to an embodiment of the present disclosure to an online tour of an art museum.
Figure 23:
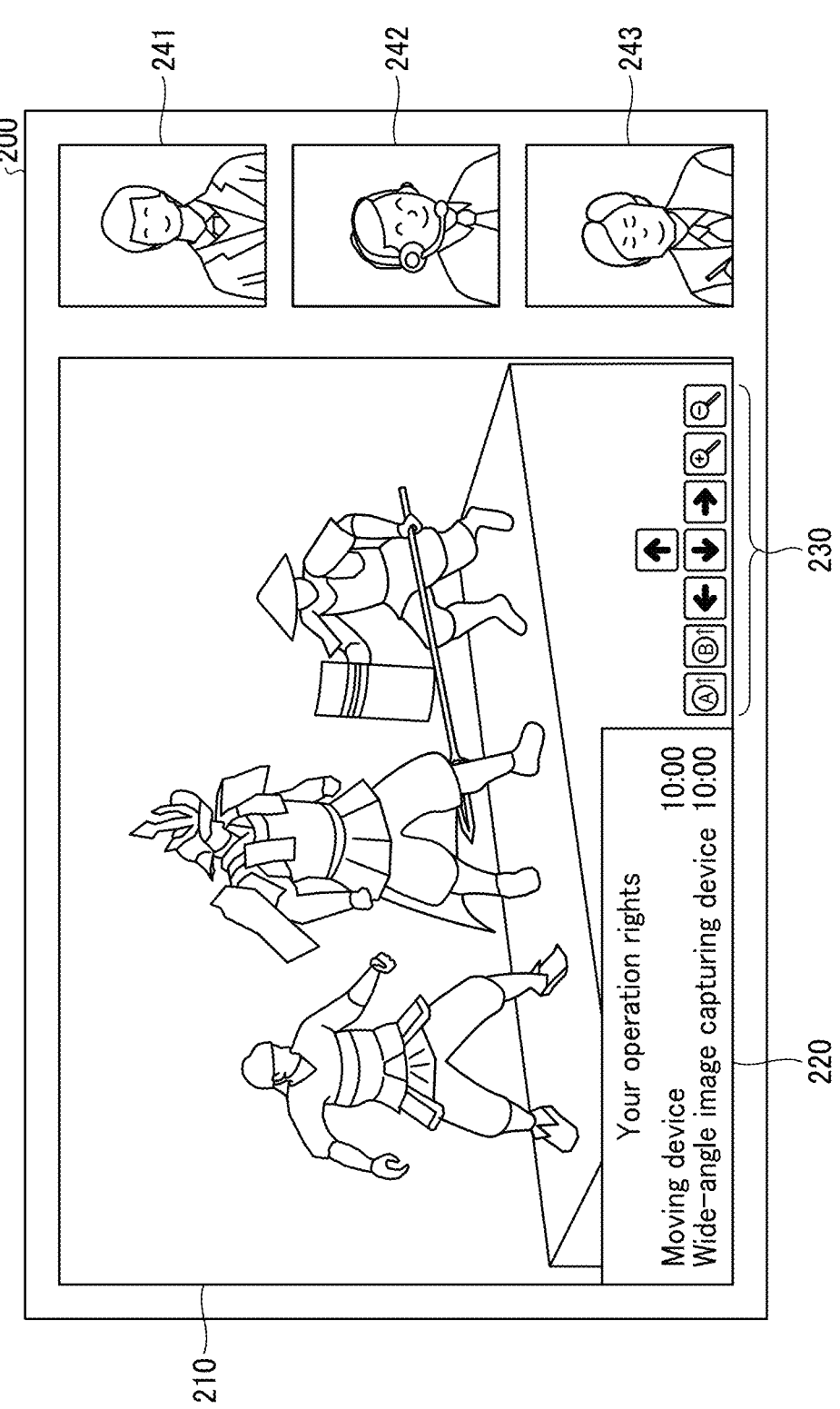
FIG. 23 is a view illustrating an example screen displayed on a communication terminal during the online tour of the art museum according to an embodiment of the present disclosure.

FIG. 22 is an illustration of an application of the technique according to this embodiment to an online tour of an art museum. FIG. 23 is a view illustrating an example screen displayed on the communication terminal 10A during the online tour of the art museum.

As illustrated in FIG. 22, the robot R is located in the art museum. The robot R can move while capturing images of the inside of the art museum by remote operation. An explainer may accompany the robot R.

The display control unit 16 of the communication terminal 10A causes the display unit 109 of the communication terminal 10A to display a display screen 200 illustrated in FIG. 23. The display screen 200 displays a display area 210 for displaying a video of the inside of the art museum. The video is sent from the communication terminal 10X of the robot R. The display area 210 also displays information 220 related to the operation right of the user a of the communication terminal 10A. Examples of the information related to the operation right include an operation-right application target, such as the moving device 20, and the elapsed time of application. The elapsed time of application is the amount of time that elapses from the application of the operation right to the operation target corresponding to the application target. The display of the information related to the operation right enables the user a to grasp, even during video distribution, an operation target on which the user a is allowed to exclusively perform a remote operation and the elapsed time of application of the operation right.

The display area 210 also displays a plurality of operation icons 230 for remotely operating the robot R. The user a performs an operation (screen operation) on the operation icons 230 to remotely operate the robot R in the art museum. The information 220 related to the operation right and the operation icons 230 may be displayed at positions other than those illustrated in FIG. 23. In an example, the information 220 and the operation icons 230 may be displayed outside the display area 210.

Figure 35:
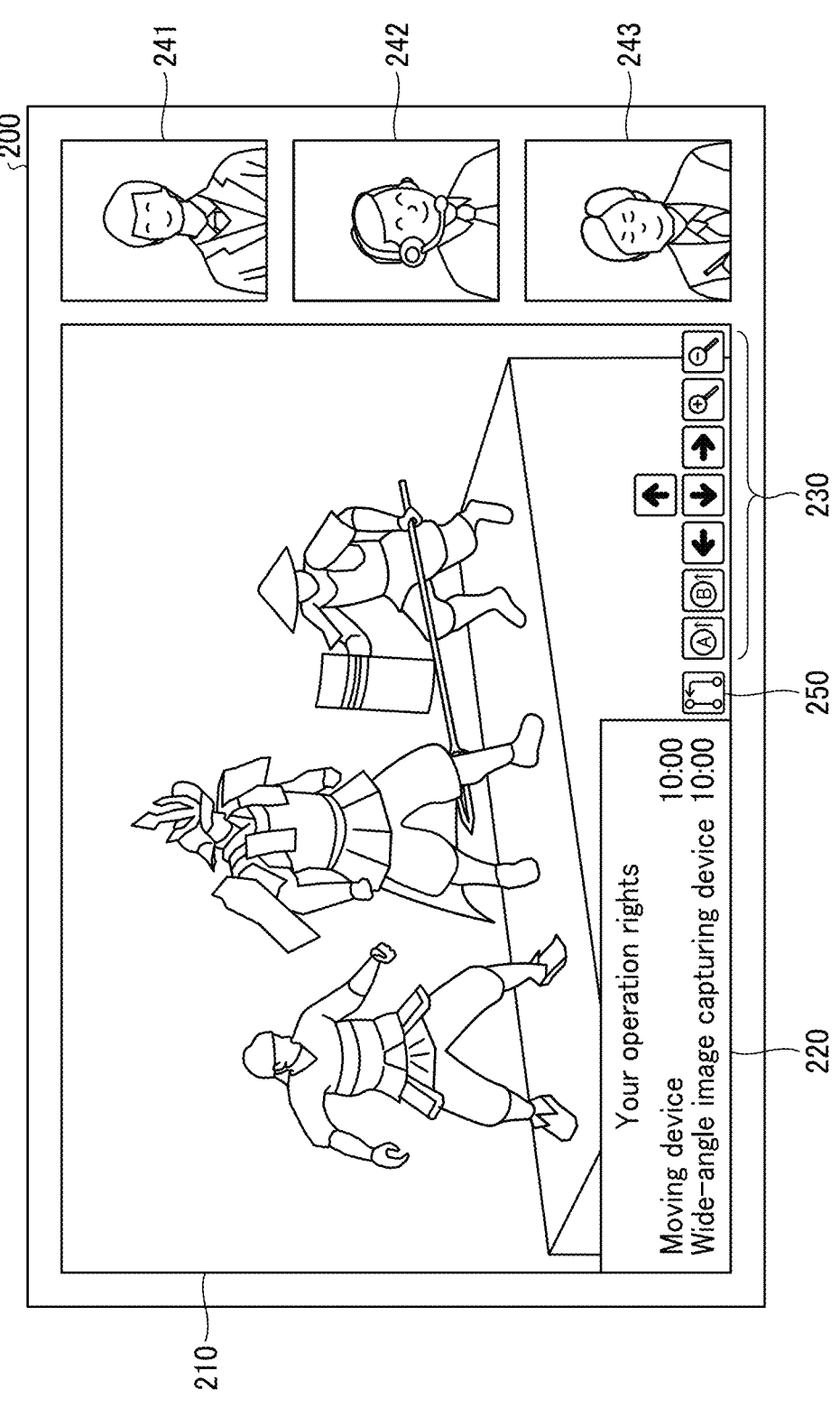
FIG. 35 is a view illustrating an example screen displayed on a communication terminal during the online tour of the art museum according to an embodiment of the present disclosure.

The display screen 200 may display the button 250, as illustrated in FIG. 35. In one example, the button 250 is the "transfer request" button 250 for displaying the screen 400 for an "operation-right transfer request" illustrated in FIG. 27. In another example, the button 250 is the "setting request" button 250 for displaying the screen 400A for an "operation-right setting request" illustrated in FIG. 32.

The display screen 200 further displays videos 241, 242, and 243 in the right part thereof. The video 241 is a video of the site A at which the communication terminal 10A is located. The videos 242 and 243 are transmitted from other sites. For example, the videos 241, 242, and 243 are videos of the users a, b, and c, respectively. The user a can perform video distribution in consideration of the facial expression of the user a and the facial expressions of the other persons.

Remote Shopping

Figure 24:
FIG. 24 is an illustration of an application of a technique according to an embodiment of the present disclosure to remote shopping.
Figure 25:
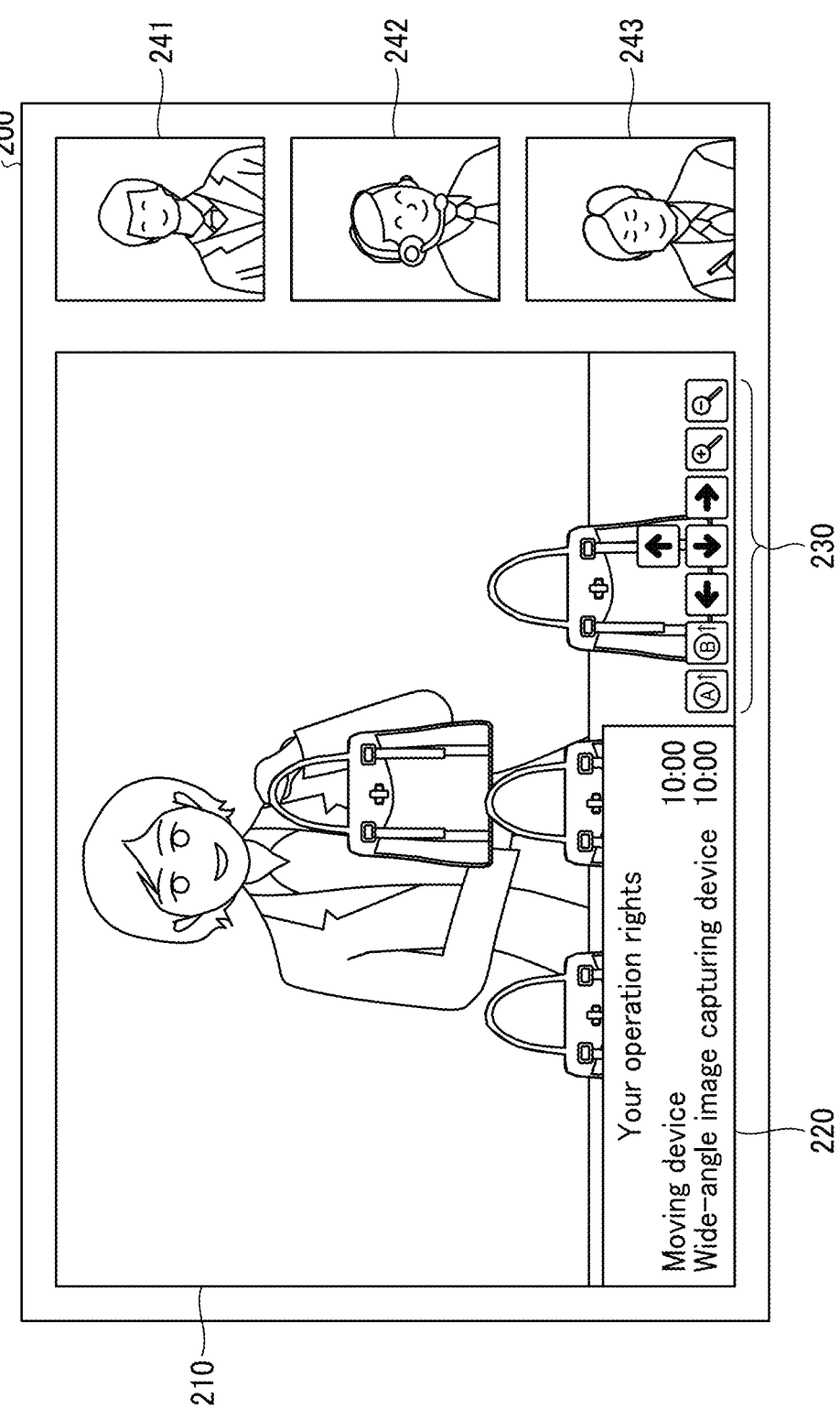
FIG. 25 is a view illustrating an example screen displayed on a communication terminal during the remote shopping according to an embodiment of the present disclosure.

FIG. 24 is an illustration of an application of the technique according to this embodiment to remote shopping. FIG. 25 is a view illustrating an example screen displayed on the communication terminal 10A during the remote shopping. The example illustrated in FIG. 25 presents a display form that is basically the same as the display form in the example illustrated in FIG. 23, and components denoted by the same reference numerals indicate the same content and will not be described.

In remote shopping, as illustrated in FIG. 24, as the robot R approaches a store clerk, as illustrated in FIG. 25, the display unit 109 of the communication terminal 10A displays the store clerk and products on the display screen 200. The user a can decide on a product to purchase through a transaction with the store clerk via video distribution. In an example, the user a receives advice from the other users b and c.

Other Application Examples

In this embodiment, the moving device 20 that travels on land has been described as an example. In some embodiments, the moving device 20 may be a drone and fly in the air. In some embodiments, the moving device 20 may travel on the sea or move in water. In some embodiments, the moving device 20 may move underground, on a narrow road, or in the ground. In an example, the moving device 20 travels on land. The moving device 20 may move using wheels, move using multiple legs such as two legs, three legs, or four legs, or move using Caterpillar® tracks.

In this embodiment, the communication terminals 10 communicate with each other via the relay device 30. In some embodiments, the communication terminals 10 may communicate with each other without the intervention of the relay device 30. Such communication is performed via a communication protocol such as web real-time communication (WebRTC).

In this embodiment, for convenience of description, the communication management system 50 and the relay device 30 are described as separate devices. In some embodiments, a device having integrated functions of the communication management system 50 and the relay device 30 may provide the functions of the communication management system 50 and the functions of the relay device 30.

The communication system 1 may include a plurality of communication management systems 50. The functions of the communication management system 50 may be installed in a plurality of servers in a distributed manner. One or more of the databases included in the storage unit 5000 of the communication management system 50 may reside on the communication network 2.

As described above, in a case where a plurality of users are viewing a video captured by a remotely-operable mobile apparatus, it is desirable to appropriately manage control of remote operations to be performed on the remotely-operable mobile apparatus. Currently, a user who attempts to operate a remotely-operable mobile apparatus can access the remotely-operable mobile apparatus even if another user is operating the remotely-operable mobile apparatus. Accordingly, the remotely-operable mobile apparatus can be operated by various users in a random manner.

As a result, for example, the remotely-operable mobile apparatus that is moving to the right to travel to the destination under remote operation by a certain user may be remotely operated by a different user and move to the left, thereby changing the destination to a different place.

According to at least one embodiment described above, the use of the operation right allows smooth manipulation of a remotely-operable mobile apparatus such as the robot R even if a plurality of users remotely operate the remotely-operable mobile apparatus.

If a specific user is allowed to operate the robot R by remote control, no other user can operate the robot R by remote control. According to at least one embodiment described above, even if a specific user is allowed to exclusively operate a remotely-operable mobile apparatus such as the robot R by remote control, other users can also operate the remotely-operable mobile apparatus by remote control, based on the premise that various users are not allowed to remotely operate the remotely-operable mobile apparatus in a random manner.

For example, some users who view a video after the start of video distribution desire to exclusively operate the remotely-operable mobile apparatus by remote control. According to at least one embodiment described above, even after the start of video distribution, a specific user is allowed to remotely operate the remotely-operable mobile apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

According to Aspect 1, a communication terminal capable of remotely operating a remotely-operable mobile apparatus (mobile apparatus) includes an acceptance unit and a transmission unit. The acceptance unit receives a remote operation to be performed on an operation target of the remotely-operable mobile apparatus. The transmission unit transmits operation information indicating the remote operation to be performed on the operation target to remotely operate the operation target, the operation target being a target to which an operation right that is exclusive is to be applied.

According to Aspect 2, in the communication terminal of Aspect 1, the acceptance unit receives a remote operation to be performed on a plurality of operation targets of the remotely-operable mobile apparatus. The transmission unit transmits operation information indicating the remote operation to be performed on the plurality of operation targets to remotely operate the plurality of operation targets, the plurality of operation targets being targets to which different operation rights are to be applied.

According to Aspect 3, the communication terminal of Aspect 1 or 2 further includes a display control unit. The display control unit displays on a screen during video distribution, information related to the operation right that is set to the communication terminal or to a user of the communication terminal.

According to Aspect 4, in the communication terminal of Aspect 3, the display control unit displays, on the screen, information related to the operation right that is set to another communication terminal or to a user of said another communication terminal.

According to Aspect 5, in the communication terminal of Aspect 4, the information related to the operation right includes an elapsed time of application, the elapsed time of application being an amount of time that elapses from a time when the operation right is applied to the operation target to which the operation right is to be applied.

According to Aspect 6, in the communication terminal of any one of Aspects 1 to 5, the remotely-operable mobile apparatus includes a telepresence robot.

According to Aspect 7, a remote operation method is performed by a communication terminal capable of remotely operating a remotely-operable mobile apparatus. The remote operation method includes, by the communication terminal, receiving a remote operation to be performed on an operation target of the remotely-operable mobile apparatus; and transmitting operation information indicating the remote operation to be performed on the operation target to remotely operate the operation target, the operation target being a target to which an operation right that is exclusive is to be applied.

According to Aspect 8, a recording medium stores a program for causing a computer capable of remotely operating a remotely-operable mobile apparatus to receive a remote operation to be performed on an operation target of the remotely-operable mobile apparatus; and transmit operation information indicating the remote operation to be performed on the operation target to remotely operate the operation target, the operation target being a target to which an operation right that is exclusive is to be applied.

According to Aspect 9, a communication management system for causing a communication terminal to remotely operate a remotely-operable mobile apparatus in response to receipt of a remote operation to be performed on the remotely-operable mobile apparatus from the communication terminal includes a reception unit and a transmission unit. The reception unit receives operation information transmitted from the communication terminal, the operation information indicating a remote operation to be performed on an operation target of the remotely-operable mobile apparatus. The transmission unit transmits the operation information to the remotely-operable mobile apparatus in response to the operation target indicated by the operation information being a target to which an operation right that is exclusive and set to the communication terminal or to a user of the communication terminal is to be applied.

According to Aspect 10, a communication management method is performed by a communication management system for causing a communication terminal to remotely operate a remotely-operable mobile apparatus in response to receipt of a remote operation to be performed on the remotely-operable mobile apparatus from the communication terminal. The communication management method includes, by the communication management system, receiving operation information transmitted from the communication terminal, the operation information indicating a remote operation to be performed on an operation target of the remotely-operable mobile apparatus; and transmitting the operation information to the remotely-operable mobile apparatus in response to the operation target indicated by the operation information being a target to which an operation right that is exclusive and set to the communication terminal or to a user of the communication terminal is to be applied.

According to Aspect 11, a recording medium stores a program for causing a computer for allowing a communication terminal to remotely operate a remotely-operable mobile apparatus in response to receipt of a remote operation to be performed on the remotely-operable mobile apparatus from the communication terminal to receive operation information transmitted from the communication terminal, the operation information indicating a remote operation to be performed on an operation target of the remotely-operable mobile apparatus; and transmit the operation information to the remotely-operable mobile apparatus in response to the operation target indicated by the operation information being a target to which an operation right that is exclusive and set to the communication terminal or to a user of the communication terminal is to be applied.

According to Aspect 12, a remotely-operable mobile apparatus for performing control based on a remote operation by a communication terminal receives operation information transmitted from the communication terminal, the operation information indicating a remote operation to be performed on an operation target of the remotely-operable mobile apparatus, and performs control based on the remote operation in response to the operation target indicated by the operation information being a target to which an operation right that is exclusive and set to the communication terminal or to a user of the communication terminal is to be applied.

According to Aspect 13, a control method is performed by a remotely-operable mobile apparatus for performing control based on a remote operation by a communication terminal. The control method includes, by the remotely-operable mobile apparatus, receiving operation information transmitted from the communication terminal, the operation information indicating a remote operation to be performed on an operation target of the remotely-operable mobile apparatus; and performing control based on the remote operation in response to the operation target indicated by the operation information being a target to which an operation right that is exclusive and set to the communication terminal or to a user of the communication terminal is to be applied.

According to Aspect 14, a recording medium stores a program for causing a computer for performing control based on a remote operation by a communication terminal to receive operation information transmitted from the communication terminal, the operation information indicating a remote operation to be performed on an operation target of a remotely-operable mobile apparatus; and perform control based on the remote operation in response to the operation target indicated by the operation information being a target to which an operation right that is exclusive and set to the communication terminal or to a user of the communication terminal is to be applied.

According to Aspect 15, a communication system includes a remotely-operable mobile apparatus, a communication terminal that remotely operates the remotely-operable mobile apparatus, and a communication management system that allows the communication terminal to remotely operate the remotely-operable mobile apparatus in response to receipt of a remote operation to be performed on the remotely-operable mobile apparatus from the communication terminal. The communication terminal accepts a remote operation to be performed on an operation target of the remotely-operable mobile apparatus, and transmits operation information indicating the remote operation to the communication management system. The communication management system receives the operation information transmitted from the communication terminal, and transmits the operation information to the remotely-operable mobile apparatus in response to the operation target indicated by the operation information being a target to which an operation right that is exclusive and set to the communication terminal or to a user of the communication terminal is to be applied. The remotely-operable mobile apparatus receives the operation information transmitted from the communication management system, and performs control based on the remote operation indicated by the operation information.

According to Aspect 16, a communication method is performed by a communication system. The communication system includes a remotely-operable mobile apparatus, a communication terminal that remotely operates the remotely-operable mobile apparatus, and a communication management system that allows the communication terminal to remotely operate the remotely-operable mobile apparatus in response to receipt of a remote operation to be performed on the remotely-operable mobile apparatus from the communication terminal. The communication method includes accepting, by the communication terminal, a remote operation to be performed on an operation target of the remotely-operable mobile apparatus; transmitting, by the communication terminal, operation information indicating the remote operation to the communication management system; receiving, by the communication management system, the operation information transmitted from the communication terminal, transmitting, by the communication management system, the operation information to the remotely-operable mobile apparatus in response to the operation target indicated by the operation information being a target to which an operation right that is exclusive and set to the communication terminal or to a user of the communication terminal is to be applied; receiving, by the remotely-operable mobile apparatus, the operation information transmitted from the communication management system; and performing, by the remotely-operable mobile apparatus, control based on the remote operation indicated by the operation information.

According to Aspect 17, a communication system includes a remotely-operable mobile apparatus, a communication terminal that remotely operates the remotely-operable mobile apparatus, and a communication management system that allows the communication terminal to remotely operate the remotely-operable mobile apparatus in response to receipt of a remote operation to be performed on the remotely-operable mobile apparatus from the communication terminal. The communication terminal accepts a remote operation to be performed on an operation target of the remotely-operable mobile apparatus, and transmits operation information indicating the remote operation to the communication management system. The communication management system receives the operation information transmitted from the communication terminal, transmits the operation information to the remotely-operable mobile apparatus, and performs control based on the remote operation in response to the operation target indicated by the operation information being a target to which an operation right that is exclusive and set to the communication terminal or to a user of the communication terminal is to be applied.

According to Aspect 18, a communication method is performed by a communication system. The communication system includes a remotely-operable mobile apparatus, a communication terminal that remotely operates the remotely-operable mobile apparatus, and a communication management system that allows the communication terminal to remotely operate the remotely-operable mobile apparatus in response to receipt of a remote operation to be performed on the remotely-operable mobile apparatus from the communication terminal. The communication method includes accepting, by the communication terminal, a remote operation to be performed on an operation target of the remotely-operable mobile apparatus; transmitting, by the communication terminal, operation information indicating the remote operation to the communication management system; receiving, by the communication management system, the operation information transmitted from the communication terminal; transmitting, by the communication management system, the operation information to the remotely-operable mobile apparatus; and performing, by the communication management system, control based on the remote operation in response to the operation target indicated by the operation information being a target to which an operation right that is exclusive and set to the communication terminal or to a user of the communication terminal is to be applied.

According to Aspect 19, a remotely-operable mobile apparatus for performing control based on a remote operation by a communication terminal receives operation information transmitted from the communication terminal, the operation information indicating a remote operation to be performed on an operation target of the remotely-operable mobile apparatus. The remotely-operable mobile apparatus performs control based on the remote operation in response to the operation target indicated by the operation information being a target to which an operation right that is exclusive and set to the communication terminal or to a user of the communication terminal is to be applied.

According to Aspect 20, a control method is performed by a remotely-operable mobile apparatus for performing control based on a remote operation by a communication terminal. The control method includes, by the remotely-operable mobile apparatus, receiving operation information transmitted from the communication terminal, the operation information indicating a remote operation to be performed on an operation target of the remotely-operable mobile apparatus; and performing control based on the remote operation in response to the operation target indicated by the operation information being a target to which an operation right that is exclusive and set to the communication terminal or to a user of the communication terminal is to be applied.

According to Aspect 21, a communication terminal capable of remotely operating an operation target of a remotely-operable mobile apparatus set as a target to which an operation right that is exclusive is to be applied includes an acceptance unit and a transmission unit. The acceptance unit receives designation of a target to which a predetermined operation right set to another communication terminal or to another user operating said another communication terminal is to be applied. The transmission unit transmits a request for transferring the predetermined operation right from said another communication terminal or said another user to the communication terminal or to a user operating the communication terminal.

According to Aspect 22, in the communication terminal of Aspect 21, the acceptance unit accepts designation of a plurality of targets to which a plurality of predetermined operation rights set to said another communication terminal or to said another user are to be applied, the plurality of targets being a plurality of operation targets of the remotely-operable mobile apparatus. The transmission unit transmits a request for transferring the plurality of predetermined operation rights from said another communication terminal or said another user to the communication terminal or to the user operating the communication terminal.

According to Aspect 23, the communication terminal of Aspect 21 or 22 further includes a display control unit. The display control unit causes a display unit to display, on a screen during video distribution, information related to the operation right that is set to the communication terminal or to the user operating the communication terminal. The acceptance unit receives designation of a target to which the predetermined operation right is to be applied among operation-right application targets displayed on the display unit.

According to Aspect 24, in the communication terminal of Aspect 23, the display control unit causes the display unit to display information related to the operation right that is set to said another communication terminal or to said another user.

According to Aspect 25, in the communication terminal of Aspect 24, the information related to the operation right includes an elapsed time of application, the elapsed time of application being an amount of time that elapses from a time when the operation right is applied to an operation target to which the operation right is to be applied.

According to Aspect 26, in the communication terminal of any one of Aspects 21 to 25, the remotely-operable mobile apparatus includes a telepresence robot.

According to Aspect 27, a processing method is performed by a communication terminal capable of remotely operating an operation target of a remotely-operable mobile apparatus set as a target to which an operation right that is exclusive is to be applied. The processing method includes, by the communication terminal, receiving designation of a target to which a predetermined operation right set to another communication terminal or to another user operating said another communication terminal is to be applied; and transmitting a request for transferring the predetermined operation right from said another communication terminal or said another user to the communication terminal or to a user operating the communication terminal.

According to Aspect 28, a recording medium stores a program for causing a computer capable of remotely operating an operation target of a remotely-operable mobile apparatus set as a target to which an operation right that is exclusive is to be applied to receive designation of a target to which a predetermined operation right set to another communication terminal or to another user operating said another communication terminal is to be applied; and transmit a request for transferring the predetermined operation right from said another communication terminal or said another user to the communication terminal or to a user operating the communication terminal.

According to Aspect 29, a communication terminal capable of remotely operating an operation target of a remotely-operable mobile apparatus set as a target to which an operation right that is exclusive is to be applied includes an acceptance unit and a transmission unit. The acceptance unit receives designation of a particular-operation-right application target among predetermined-operation-right application targets to which predetermined operation rights requested to be transferred from another communication terminal are to be applied, the particular-operation-right application target being a target to which a particular operation right among the predetermined operation rights is to be applied. The transmission unit transmits, to a communication management system that changes a setting of the predetermined operation right, a request for changing a setting of the particular operation right from the communication terminal or a user of the communication terminal to said another communication terminal or another user operating said another communication terminal.

According to Aspect 30, in the communication terminal of Aspect 29, the acceptance unit receives designation of a plurality of particular-operation-right application targets to which a plurality of particular operation rights among the predetermined operation rights are to be applied, the plurality of particular-operation-right application targets being a plurality of operation targets of the remotely-operable mobile apparatus. The transmission unit transmits a request for changing a setting of the plurality of particular operation rights from the communication terminal or the user of the communication terminal to said another communication terminal or said another user operating said another communication terminal.

According to Aspect 31, the communication terminal of Aspect 29 or 30 further includes a display control unit. The display control unit causes a display unit to display the predetermined-operation-right application targets to which predetermined operation rights requested to be transferred from said another communication terminal are to be applied among operation-right application targets to which operation rights set to the communication terminal or to the user of the communication terminal are to be applied. The acceptance unit receives designation of a particular-operation-right application target among the predetermined-operation-right application targets displayed on the display unit, the particular-operation-right application target being a target to which a particular operation right among the predetermined operation rights is to be applied.

According to Aspect 32, a processing method is performed by a communication terminal capable of remotely operating an operation target of a remotely-operable mobile apparatus set as a target to which an operation right that is exclusive is to be applied. The processing method includes, by the communication terminal, receiving designation of a particular-operation-right application target among predetermined-operation-right application targets to which predetermined operation rights requested to be transferred from another communication terminal are to be applied, the particular-operation-right application target being a target to which a particular operation right among the predetermined operation rights is to be applied; and transmitting, to a communication management system that changes a setting of the predetermined operation right, a request for changing a setting of the particular operation right from the communication terminal or a user of the communication terminal to said another communication terminal or another user operating said another communication terminal.

According to Aspect 33, a recording medium stores a program for causing a computer capable of remotely operating an operation target of a remotely-operable mobile apparatus set as a target to which an operation right that is exclusive is to be applied to accept designation of a particular-operation-right application target among predetermined-operation-right application targets to which predetermined operation rights requested to be transferred from another communication terminal are to be applied, the particular-operation-right application target being a target to which a particular operation right among the predetermined operation rights is to be applied; and transmit, to a communication management system that changes a setting of the predetermined operation right, a request for changing a setting of the particular operation right from the communication terminal or a user of the communication terminal to said another communication terminal or another user operating said another communication terminal.

According to Aspect 34, a communication management system for communication with a first communication terminal and a second communication terminal, each of the first communication terminal and the second communication terminal being capable of remotely operating an operation target of a remotely-operable mobile apparatus set as a target to which an operation right that is exclusive is to be applied, includes a first reception unit, a first transmission unit, a second reception unit, a change unit, and a second transmission unit. The first reception unit receives, from the first communication terminal, a transfer request for transferring one or more predetermined operation rights from the second communication terminal or a second user of the second communication terminal to the first communication terminal or a first user of the first communication terminal. The first transmission unit transmits the transfer request to the second communication terminal. The second reception unit receives, from the second communication terminal, a change request for changing a setting of a particular operation right among the one or more predetermined operation rights from the second communication terminal or the second user to the first communication terminal or the first user. The change unit changes the setting of the particular operation right from the second communication terminal or the second user to the first communication terminal or the first user. The second transmission unit transmits a result information indicating a result of a change made by the change unit to the first communication terminal.

According to Aspect 35, in the communication management system of Aspect 34, the one or more predetermined operation rights are to be applied to a plurality of targets.

According to Aspect 36, a communication management method is performed by a communication management system for communication with a first communication terminal and a second communication terminal, each of the first communication terminal and the second communication terminal being capable of remotely operating an operation target of a remotely-operable mobile apparatus set as a target to which an operation right that is exclusive is to be applied. The communication management method includes, by the communication management system, receiving, from the first communication terminal, a transfer request for transferring one or more predetermined operation rights from the second communication terminal or a second user of the second communication terminal to the first communication terminal or a first user of the first communication terminal; transmitting the transfer request to the second communication terminal; receiving, from the second communication terminal, a change request for changing a setting of a particular operation right among the one or more predetermined operation rights from the second communication terminal or the second user to the first communication terminal or the first user; changing the setting of the particular operation right from the second communication terminal or the second user to the first communication terminal or the first user; and transmitting a result information indicating a result of the changed setting to the first communication terminal.

According to Aspect 37, a recording medium stores a program for causing a computer for communication with a first communication terminal and a second communication terminal, each of the first communication terminal and the second communication terminal being capable of remotely operating an operation target of a remotely-operable mobile apparatus set as a target to which an operation right that is exclusive is to be applied to receive, from the first communication terminal, a transfer request for transferring one or more predetermined operation rights from the second communication terminal or a second user of the second communication terminal to the first communication terminal or a first user of the first communication terminal, transmit the transfer request to the second communication terminal; receive, from the second communication terminal, a change request for changing a setting of a particular operation right among the one or more predetermined operation rights from the second communication terminal or the second user to the first communication terminal or the first user; change the setting of the particular operation right from the second communication terminal or the second user to the first communication terminal or the first user; and transmit a result information indicating a result of the changed setting to the first communication terminal.

According to Aspect 38, a communication system includes a first communication terminal and a second communication terminal, each of the first communication terminal and the second communication terminal being capable of remotely operating an operation target of a remotely-operable mobile apparatus set as a target to which an operation right that is exclusive is to be applied, and a communication management system that communicates with the first communication terminal and the second communication terminal. The first communication terminal transmits a transfer request for transferring one or more predetermined operation rights from the second communication terminal or a second user of the second communication terminal to the first communication terminal or a first user of the first communication terminal. The communication management system receives the transfer request from the first communication terminal, and transmits the transfer request to the second communication terminal. The second communication terminal receives the transfer request from the communication management system, and transmits, to the communication management system, a change request for changing a setting of a particular operation right among the one or more predetermined operation rights from the second communication terminal or the second user to the first communication terminal or the first user. The communication management system receives the change request from the second communication terminal, changes the setting of the particular operation right from the second communication terminal or the second user to the first communication terminal or the first user, and transmits a result information indicating a result of the changed setting to the first communication terminal.

According to Aspect 39, in the communication system of Aspect 38, the one or more predetermined operation rights are to be applied to a plurality of targets.

According to Aspect 40, a communication method is performed by a communication system. The communication system includes a first communication terminal and a second communication terminal, each of the first communication terminal and the second communication terminal being capable of remotely operating an operation target of a remotely-operable mobile apparatus set as a target to which an operation right that is exclusive is to be applied, and a communication management system that communicates with the first communication terminal and the second communication terminal. The communication method includes, transmitting, by the first communication terminal, a transfer request for transferring one or more predetermined operation rights from the second communication terminal or a second user of the second communication terminal to the first communication terminal or a first user of the first communication terminal; receiving, by the communication management system, the transfer request from the first communication terminal; transmitting, by the communication management system, the transfer request to the second communication terminal; receiving, by the second communication terminal, the transfer request from the communication management system; transmitting, by the second communication terminal, to the communication management system, a change request for changing a setting of a particular operation right among the one or more predetermined operation rights from the second communication terminal or the second user to the first communication terminal or the first user; receiving, by the communication management system, the change request from the second communication terminal; changing, by the communication management system, the setting of the particular operation right from the second communication terminal or the second user to the first communication terminal or the first user; and transmitting, by the communication management system, a result information indicating a result of the changed setting to the first communication terminal.

According to Aspect 41, a communication terminal capable of remotely operating an operation target of a remotely-operable mobile apparatus set as a target to which an operation right that is exclusive is to be applied includes an acceptance unit, a transmission unit, and a reception unit. The acceptance unit accepts designation of a predetermined-operation-right application target during video distribution, the predetermined-operation-right application target being a target to which a predetermined operation right is to be applied. The transmission unit transmits a request for setting the predetermined operation right to the communication terminal or to a user operating the communication terminal. The reception unit receives a result information indicating a result of the request.

According to Aspect 42, in the communication terminal of Aspect 41, the acceptance unit receives designation of a plurality of targets to which a plurality of predetermined operation rights are to be applied, the plurality of targets being a plurality of operation targets of the remotely-operable mobile apparatus. The transmission unit transmits a request for setting the plurality of predetermined operation rights.

According to Aspect 43, the communication terminal of Aspect 41 or 42 further includes a display control unit. The display control unit causes a display unit to display, on a screen during video distribution, information related to the operation right that is set to the communication terminal or to the user operating the communication terminal. The acceptance (A unit receives designation of a target to which the predetermined operation right is to be applied among operation-right application targets displayed on the display unit.

According to Aspect 44, in the communication terminal of Aspect 43, the display control unit causes the display unit to display an indication that the request is being made for a period of time from transmission of the request from the transmission unit to reception of the result information at the reception unit.

According to Aspect 45, in the communication terminal of Aspect 43, the display control unit causes the display unit to display information related to the operation right that is set to another communication terminal or to another user operating said another communication terminal.

According to Aspect 46, in the communication terminal of Aspect 45, the information related to the operation right includes an elapsed time of application, the elapsed time of application being an amount of time that elapses from application of the operation right to an operation target to which the operation right is to be applied.

According to Aspect 47, in the communication terminal of any one of Aspects 41 to 46, the remotely-operable mobile apparatus includes a telepresence robot.

According to Aspect 48, a processing method is performed by a communication terminal capable of remotely operating an operation target of a remotely-operable mobile apparatus set as a target to which an operation right that is exclusive is to be applied. The processing method includes, by the communication terminal, receiving designation of a predetermined-operation-right application target during video distribution, the predetermined-operation-right application target being a target to which a predetermined operation right is to be applied; and transmitting a request for setting the predetermined operation right to the communication terminal or to a user operating the communication terminal.

According to Aspect 49, a recording medium stores a program for causing a computer capable of remotely operating an operation target of a remotely-operable mobile apparatus set as a target to which an operation right that is exclusive is to be applied to receive designation of a predetermined-operation-right application target during video distribution, the predetermined-operation-right application target being a target to which a predetermined operation right is to be applied; and transmit a request for setting the predetermined operation right to a communication terminal or to a user operating the communication terminal.

According to Aspect 50, a communication terminal for performing processing to determine whether to set an operation target of a remotely-operable mobile apparatus, the remotely-operable mobile apparatus being a target to which an operation right that is exclusive is to be applied and being remotely operable by another communication terminal, includes an acceptance unit and a transmission unit. The acceptance unit receives designation of a particular-operation-right application target among predetermined-operation-right application targets to which predetermined operation rights requested to be set from said another communication terminal during video distribution are to be applied, the particular-operation-right application target being a target to which a particular operation right among the predetermined operation rights is to be applied. The transmission unit transmits, to a communication management system that performs setting of the operation right, a request for setting the particular operation right to said another communication terminal or another user operating said another communication terminal.

According to Aspect 51, in the communication terminal of Aspect 50, the acceptance unit receives designation of a plurality of particular-operation-right application targets to which a plurality of particular operation rights among the predetermined operation rights are to be applied, the plurality of particular-operation-right application targets being a plurality of operation targets of the remotely-operable mobile apparatus. The transmission unit transmits a request for setting the plurality of particular operation rights.

According to Aspect 52, the communication terminal of Aspect 50 or 51 further includes a display control unit. The display control unit causes a display unit to display the predetermined-operation-right application targets to which the predetermined operation rights requested to be set from said another communication terminal are to be applied. The acceptance unit receives designation of a particular-operation-right application target among the predetermined-operation-right application targets displayed on the display unit, the particular-operation-right application target being a target to which a particular operation right among the predetermined operation rights is to be applied.

According to Aspect 53, a processing method is performed by a communication terminal for performing processing to determine whether to set an operation target of a remotely-operable mobile apparatus, the remotely-operable mobile apparatus being a target to which an operation right that is exclusive is to be applied and being remotely operable by another communication terminal. The processing method includes, by the communication terminal, receiving designation of a particular-operation-right application target among predetermined-operation-right application targets to which predetermined operation rights requested to be set from said another communication terminal during video distribution are to be applied, the particular-operation-right application target being a target to which a particular operation right among the predetermined operation rights is to be applied; and transmitting, to a communication management system that performs setting of the operation right, a request for setting the particular operation right to said another communication terminal or another user operating said another communication terminal.

According to Aspect 54, a recording medium stores a program for causing a computer for performing processing to determine whether to set an operation target of a remotely-operable mobile apparatus, the remotely-operable mobile apparatus being a target to which an operation right that is exclusive is to be applied and being remotely operable by another communication terminal, to receive designation of a particular-operation-right application target among predetermined-operation-right application targets to which predetermined operation rights requested to be set from said another communication terminal during video distribution are to be applied, the particular-operation-right application target being a target to which a particular operation right among the predetermined operation rights is to be applied; and transmit, to a communication management system that performs setting of the operation right, a request for setting the particular operation right to said another communication terminal or another user operating said another communication terminal.

According to Aspect 55, a communication management system for communication with a first communication terminal and a second communication terminal, the first communication terminal being capable of remotely operating an operation target of a remotely-operable mobile apparatus set as an exclusive-operation-right application target, the exclusive-operation-right application target being a target to which an operation right that is exclusive is to be applied, the second communication terminal being for performing processing to determine whether to set the operation target of the remotely-operable mobile apparatus remotely operable by the first communication terminal as the exclusive-operation-right application target, includes a first reception unit, a first transmission unit, a second reception unit, a setting unit, and a second transmission unit. The first reception unit receives, from the first communication terminal, a setting request for setting one or more predetermined operation rights to the first communication terminal or a first user of the first communication terminal. The first transmission unit transmits the setting request to the second communication terminal. The second reception unit receives, from the second communication terminal, a setting request for setting a particular operation right among the one or more predetermined operation rights to the first communication terminal or the first user. The setting unit sets the particular operation right to the first communication terminal or the first user. The second transmission unit transmits a result information indicating a result of setting performed by the setting unit to the first communication terminal.

According to Aspect 56, in the communication management system of Aspect 55, the one or more predetermined operation rights are to be applied to a plurality of targets.

According to Aspect 57, a communication management method is performed by a communication management system for communication with a first communication terminal and a second communication terminal, the first communication terminal being capable of remotely operating an operation target of a remotely-operable mobile apparatus set as an exclusive-operation-right application target, the exclusive-operation-right application target being a target to which an operation right that is exclusive is to be applied, the second communication terminal being for performing processing to determine whether to set the operation target of the remotely-operable mobile apparatus remotely operable by the first communication terminal as the exclusive-operation-right application target. The communication management method includes, by the communication management system, receiving, from the first communication terminal, a first setting request for setting one or more predetermined operation rights to the first communication terminal or a first user of the first communication terminal; transmitting the first setting request to the second communication terminal; receiving, from the second communication terminal, a second setting request for setting a particular operation right among the one or more predetermined operation rights to the first communication terminal or the first user; setting the particular operation right to the first communication terminal or the first user; and transmitting a result information indicating a result of the setting of the particular operation right to the first communication terminal.

According to Aspect 58, a recording medium stores a program for causing a computer for communication with a first communication terminal and a second communication terminal, the first communication terminal being capable of remotely operating an operation target of a remotely-operable mobile apparatus set as an exclusive-operation-right application target, the exclusive-operation-right application target being a target to which an operation right that is exclusive is to be applied, the second communication terminal being for performing processing to determine whether to set the operation target of the remotely-operable mobile apparatus remotely operable by the first communication terminal as the exclusive-operation-right application target, to receive, from the first communication terminal, a setting request for setting one or more predetermined operation rights to the first communication terminal or a first user of the first communication terminal; transmit the setting request to the second communication terminal; receive, from the second communication terminal, a setting request for setting a particular operation right among the one or more predetermined operation rights to the first communication terminal or the first user; set the particular operation right to the first communication terminal or the first user; and transmit a result information indicating a result of the setting of the particular operation right to the first communication terminal.

According to Aspect 59, a communication system includes a first communication terminal capable of remotely operating an operation target of a remotely-operable mobile apparatus set as an exclusive-operation-right application target, the exclusive-operation-right application target being a target to which an operation right that is exclusive is to be applied, a second communication terminal for performing processing to determine whether to set the operation target of the remotely-operable mobile apparatus remotely operable by the first communication terminal as the exclusive-operation-right application target, and a communication management system that communicates with the first communication terminal and the second communication terminal. The first communication terminal receives designation of a predetermined-operation-right application target during video distribution, the predetermined-operation-right application target being a target to which a predetermined operation right is to be applied, and transmits a first setting request, the first setting request being a request for setting the predetermined operation right to the first communication terminal or to a user operating the first communication terminal. The communication management system receives the first setting request from the first communication terminal, and transmits the first setting request to the second communication terminal. The second communication terminal receives designation of a particular-operation-right application target among one or more predetermined-operation-right application targets to which one or more predetermined operation rights requested to be set from another communication terminal during video distribution are to be applied, the particular-operation-right application target being a target to which a particular operation right among the one or more predetermined operation rights is to be applied, and transmits a second setting request to the communication management system, the second setting request being a request for setting the particular operation right to said another communication terminal or another user operating said another communication terminal. The communication management system receives the second setting request from the second communication terminal, sets the particular operation right to the first communication terminal or the user operating the first communication terminal, and transmits a result information indicating a result of the setting of the particular operation right to the first communication terminal.

According to Aspect 60, in the communication system of Aspect 59, the one or more predetermined operation rights are to be applied to a plurality of targets.

According to Aspect 61, a communication method is performed by a communication system. The communication system includes a first communication terminal capable of remotely operating an operation target of a remotely-operable mobile apparatus set as an exclusive-operation-right application target, the exclusive-operation-right application target being a target to which an operation right that is exclusive is to be applied, a second communication terminal for performing processing to determine whether to set the operation target of the remotely-operable mobile apparatus remotely operable by the first communication terminal as the exclusive-operation-right application target, and a communication management system that communicates with the first communication terminal and the second communication terminal. The communication method includes receiving, by the first communication terminal, designation of a predetermined-operation-right application target during video distribution, the predetermined-operation-right application target being a target to which a predetermined operation right is to be applied; transmitting, by the first communication terminal, a first setting request, the first setting request being a request for setting the predetermined operation right to the first communication terminal or to a user operating the first communication terminal; receiving, by the communication management system, the first setting request from the first communication terminal; transmitting, by the communication management system, the first setting request to the second communication terminal; receiving, by the second communication terminal, designation of a particular-operation-right application target among one or more predetermined-operation-right application targets to which one or more predetermined operation rights requested to be set from another communication terminal during video distribution are to be applied, the particular-operation-right application target being a target to which a particular operation right among the one or more predetermined operation rights is to be applied; transmitting, by the second communication terminal, a second setting request to the communication management system, the second setting request being a request for setting the particular operation right to said another communication terminal or another user operating said another communication terminal; receiving, by the communication management system, the second setting request from the second communication terminal; setting, by the communication management system, the particular operation right to the first communication terminal or the user operating the first communication terminal; and transmitting, by the communication management system, a result information indicating a result of the setting of the particular operation right to the first communication terminal.

The invention claimed is:

1. A communication terminal, comprising:
a display; and
circuitry configured to:
control the display to display a user interface indicating a plurality of operation targets of a mobile apparatus and including an operation right information list, wherein for a user, different operation rights are set for each operation target of the plurality of operation targets, and the operation right information list displays, in association with each of the plurality of operation targets, (i) a user name of a holder of a current operation right and (ii) an elapsed time since the operation right was applied;
receive an operation instruction input by the user, the operation instruction indicating a remote operation to be performed by a particular operation target of the plurality of operation targets;
check whether the user has an appropriate operation right to remotely operate the particular operation target according to the operation instruction before transmitting the operation information;
transmit, in a case that the circuitry determines that the user has the appropriate operation right, operation information to remotely operate the particular operation target of the mobile apparatus, wherein the operation information includes a device identifier of the operation target, a user identifier of the user, and information corresponding to the operation instruction; and
transmit, in a case that the circuitry determines that the user does not have the appropriate operation right, a notification indicating that the user does not have the appropriate operation right to remotely operate the particular operation target.

2. The communication terminal of claim 1, wherein the remote operation is to be performed on the plurality of operation targets of the mobile apparatus, the operation information indicates the remote operation to be performed on the plurality of operation targets to remotely operate the plurality of operation targets,
the operation information further includes a device identifier for each operation target of the plurality of operation targets, and
the plurality of operation targets identified by the operation information are targets to which different operation rights are to be applied.

3. The communication terminal of claim 1, wherein the circuitry is further configured to control the display to display, during video distribution, information related to the operation right.

4. The communication terminal of claim 3, wherein the operation right is set to another communication terminal or to a user of the another communication terminal.

5. The communication terminal of claim 4, wherein the information related to the operation right includes an elapsed time of application, the elapsed time of application being an amount of time that elapses from a time when the operation right is applied to the operation target.

6. The communication terminal of claim 1, wherein the operation right is exclusive to the user of a plurality of users.

7. A method, comprising:
displaying a user interface indicating a plurality of operation targets of a mobile apparatus and including an operation right information list, wherein for a user, different operation rights are set for each operation target of the plurality of operation targets, and each operation right indicates operation thresholds and time limitations of a corresponding operation target the operation right information list displays, in association with each of the plurality of operation targets, (i) a user name of a holder of a current operation right and (ii) an elapsed time since the operation right was applied;
receiving an operation instruction input by the user, the operation instruction indicating a remote operation to be performed by a particular operation target of the plurality of operation targets; checking whether the user has an appropriate operation right to remotely operate the particular operation target according to the operation instruction before transmitting the operation information;
transmitting, in a case that the checking indicates that the user has the appropriate operation right, operation information to remotely operate the particular operation target of the mobile apparatus according to the operation right set to the operation target, wherein the operation information includes a device identifier of the operation target, a user identifier of the user, and information corresponding to the operation instruction; and
transmitting, in a case that the checking indicates that the user does not have the appropriate operation right, a notification indicating that the user does not have the appropriate operation right to remotely operate the particular operation target.

8. A communication system, comprising:
a communication terminal including first circuitry; and
a communication management system including second circuitry, wherein
the first circuitry is configured to:
control a display to display a user interface indicating a plurality of operation targets of a mobile apparatus and including an operation right information list, wherein for a user, different operation rights are set for each operation target of the plurality of operation targets, and each operation right indicates operation thresholds and time limitations of a corresponding operation target the operation right information list displays, in association with each of the plurality of operation targets, (i) a user name of a holder of a current operation right and (ii) an elapsed time since the operation right was applied;

receive an operation instruction input by the user, the operation instruction indicating a remote operation to be performed by a particular operation target of the plurality of operation targets;

check whether the user has an appropriate operation right to remotely operate the particular operation target according to the operation instruction before transmitting the operation information;

transmit, in a case that the first circuitry determines that the user has the appropriate operation right, operation information to the communication management system, wherein the operation information includes a device identifier of the operation target, a user identifier of the user, and information corresponding to the operation instruction; and transmit, in a case that the first circuitry determines that the user does not have the appropriate operation right, a notification to the communication management system indicating that the user does not have the appropriate operation right to remotely operate the particular operation target, and the second circuitry is configured to, in the case that the user has the appropriate operation right:

receive the operation information transmitted from the communication terminal; and transmit the operation information to the mobile apparatus to remotely operate the particular operation target according to the operation right set to the particular operation target.

9. The communication management system according to claim 8, wherein the circuitry is further configured to check, in response to reception of the operation information, whether the user corresponding to the user identifier has an appropriate operation right to remotely operate the operation target according to the operation instruction, and transmit the operation instruction to the mobile apparatus to remotely operate the operation target in response to a determination that the user has the appropriate operation right.

10. A communication terminal, comprising:

a display; and circuitry configured to:

control the display to display a user interface indicating a plurality of operation targets of a mobile apparatus and including an operation right information list, wherein for a user, different operation rights are set for each operation target of the plurality of operation targets, and each operation right indicates operation thresholds and time limitations of a corresponding operation target the operation right information list displays, in association with each of the plurality of operation targets, (i) a user name of a holder of a current operation right and (ii) an elapsed time since the operation right was applied;

receive a designation of a particular operation target of the plurality of operation targets from the user, wherein the particular operation target to which an operation right is set to another communication terminal or to another user operating the another communication terminal is to be applied;

check whether the user has an appropriate operation right to remotely operate the particular operation target according to the operation instruction before transmitting the operation information;

transmit, in a case that the circuitry determines that the user does not have the appropriate operation right, a request to transfer the operation right from the another communication terminal or the another user to the communication terminal or to the user;

transmit, after the operation right to the particular operation target is set to the communication terminal or the user, operation information to remotely operate the particular operation target, wherein the operation information includes a device identifier of the operation target, a user identifier of the user, and information corresponding to an operation instruction input to the communication terminal by the user; and transmit, in a case that the circuitry determines that the user does not have the appropriate operation right and that the appropriate operation right cannot be transferred, a notification indicating that the user does not have the appropriate operation right to remotely operate the particular operation target.

11. The communication terminal of claim 10, wherein the designation is of the plurality of operation targets to which a plurality of operation rights set to the another communication terminal or to the another user are to be applied, and the request is to transfer the plurality of operation rights from the another communication terminal or the another user to the communication terminal or to the user operating the communication terminal.

12. The communication terminal of claim 10, wherein the circuitry is further configured to display, on the display during video distribution, information related to the operation right that is set to the communication terminal or to the user operating the communication terminal, and receive the designation of the particular operation target to which the operation right is to be applied among operation right application targets being displayed.

13. The communication terminal of claim 10, wherein the operation right is exclusive to the user of a plurality of users.

14. A processing method, comprising:

displaying a user interface indicating a plurality of operation targets of a mobile apparatus and including an operation right information list, wherein for a user, different operation rights are set for each operation target of the plurality of operation targets, and each operation right indicates operation thresholds and time limitations of a corresponding operation target the operation right information list displays, in association with each of the plurality of operation targets, (i) a user name of a holder of a current operation right and (ii) an elapsed time since the operation right was applied;

receiving a designation of a particular operation target of the plurality of operation targets from the user, wherein the particular operation target to which an operation right is set to another communication terminal or to another user operating the another communication terminal is to be applied; checking whether the user has an appropriate operation right to remotely operate the particular operation target according to the operation instruction before transmitting the operation information;

transmitting, in a case that the checking indicates that the user does not have the appropriate operation right, a request to transfer the operation right from the another communication terminal or the another user to the communication terminal or to the user;

transmitting, after the operation right to the particular operation target is set to the communication terminal or the user, operation information to remotely operate the particular operation target, wherein the operation information includes a device identifier of the operation target, a user identifier of the user, and information corresponding to an operation instruction input to the communication terminal by the user; and transmitting, in a case that the checking indicates that the user does not have the appropriate operation right and that the appropriate operation right cannot be transferred, a notification indicating that the user does not have the appropriate operation right to remotely operate the particular operation target.

\*  \*  \*  \*  \*